United States Patent
Tanaka et al.

(10) Patent No.: US 12,061,960 B2
(45) Date of Patent: Aug. 13, 2024

(54) LEARNING DEVICE AND LEARNING METHOD

(71) Applicant: Ricoh Company, Ltd., Tokyo (JP)

(72) Inventors: Takuya Tanaka, Tokyo (JP); Ryosuke Kasahara, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 1391 days.

(21) Appl. No.: 16/527,755

(22) Filed: Jul. 31, 2019

(65) Prior Publication Data

US 2020/0050970 A1 Feb. 13, 2020

(30) Foreign Application Priority Data

Aug. 10, 2018 (JP) ................. 2018-152114

(51) Int. Cl.
*G06N 5/01* (2023.01)
*G06N 20/00* (2019.01)
*G06N 20/20* (2019.01)

(52) U.S. Cl.
CPC ............... *G06N 20/20* (2019.01); *G06N 5/01* (2023.01); *G06N 20/00* (2019.01)

(58) Field of Classification Search
CPC ........... G06N 20/20; G06N 5/01; G06N 20/00
See application file for complete search history.

(56) References Cited

U.S. PATENT DOCUMENTS

2019/0042922 A1* 2/2019 Pillai ...................... G06N 3/084
2020/0042288 A1* 2/2020 Lesso ................. H03K 19/1772

FOREIGN PATENT DOCUMENTS

JP 2007-240326 A 9/2007
JP 2014-241060 A 12/2014

OTHER PUBLICATIONS

Chen, Tianqi, and Carlos Guestrin. "Xgboost: A scalable tree boosting system." Proceedings of the 22nd acm sigkdd international conference on knowledge discovery and data mining. 2016. (Year: 2016).*
Raileanu, Laura Elena, and Kilian Stoffel. "Theoretical comparison between the gini index and information gain criteria." Annals of Mathematics and Artificial Intelligence 41 (2004): 77-93. (Year: 2004).*
Gutierrez, Roberto, and Javier Valls. "Low cost hardware implementation of logarithm approximation." IEEE Transactions on Very Large Scale Integration (VLSI) Systems 19.12 (2010): 2326-2330. (Year: 2010).*
Keck, Thomas. "FastBDT: a speed-optimized multivariate classification algorithm for the Belle II experiment." Computing and Software for Big Science 1 (2017): 1-11. (Year: 2017).*

(Continued)

*Primary Examiner* — Michael J Huntley
*Assistant Examiner* — Sehwan Kim
(74) *Attorney, Agent, or Firm* — XSENSUS LLP

(57) ABSTRACT

A learning device is configured to perform learning of a decision tree. The learning device includes a gradient output unit and a branch score calculator. The gradient output unit is configured to output a cumulative sum of gradient information corresponding to each value of a feature amount of learning data. The branch score calculator is configured to calculate a branch score used for determining a branch condition for a node of the decision tree, from the cumulative sum without using a dividing circuit.

11 Claims, 32 Drawing Sheets

(56) References Cited

OTHER PUBLICATIONS

Narayanan, Ramanathan, et al. "An FPGA implementation of decision tree classification." 2007 Design, Automation & Test in Europe Conference & Exhibition. IEEE, 2007. (Year: 2007).*

Ke, Guolin, et al. "Lightgbm: A highly efficient gradient boosting decision tree." Advances in neural information processing systems 30 (2017). (Year: 2017).*

Alcolea, Adrián, and Javier Resano. "FPGA accelerator for gradient boosting decision trees." Electronics 10.3 (2021): 314. (Year: 2021).*

Narayanan, Ramanathan, et al. "Interactive presentation: An FPGA implementation of decision tree classification." Proceedings of the conference on Design, automation and test in Europe. EDA Consortium, 2007.6 pages.

Office Action issued Jun. 7, 2022 in Japanese Patent Application No. 2018-152114, 19 pages.

Katsutoshi Maeta, et al., "A Study of Numerical Prediction of 2-hour Plasma Glucose Level during OGTT using Machine Learning", The Institute of Electronics, Information Communication Engineers, Jul. 31, 2018, vol. 118, No. 81, 16 pages.

* cited by examiner

LEARNING DEVICE AND LEARNING METHOD

CROSS-REFERENCE TO RELATED APPLICATIONS

The present application claims priority under 35 U.S.C. § 119 to Japanese Patent Application No. 2018-152114, filed on Aug. 10, 2018. The contents of which are incorporated herein by reference in their entirety.

BACKGROUND OF THE INVENTION

1. Field of the Invention

The present invention relates to a learning device and a learning method.

2. Description of the Related Art

In recent years, an attempt to replace a function of human beings with a large amount of data has been made in various fields by using machine learning that is generally known in relation to artificial intelligence (AI). This field is still greatly developing day by day, but there are some problems under present circumstances. Representative examples thereof include a limit of accuracy including generalization performance for retrieving versatile knowledge from data, and a limit of processing speed due to a large calculation load thereof. As a well-known algorithm for high-performance machine learning, there are known Deep learning (DL), a convolutional neural network (CNN) in which an input vector is limited to the periphery, and the like. As compared with these methods, under present circumstances, gradient boosting (for example, Gradient Boosting Decision Tree (GBDT)) is known to have poor accuracy for input data such as an image, a voice, and a language because it is difficult to extract a feature amount, but give higher performance for other structured data. As a matter of fact, in Kaggle as a competition of data scientists, the GBDT is the most standard algorithm. In the real world, 70% of problems that are desired to be solved by machine learning is said to be structured data other than an image, a voice, and a language, so that there is no doubt that the GBDT is an important algorithm to solve the problems in the real world. Additionally, in recent years, there has been developed a method of extracting a feature from data such as an image and a voice using a decision tree.

In the gradient boosting, learning processing is performed at higher speed than deep learning such as CCN. However, it is fairly common to perform learning several hundreds of times or more for adjustment of hyperparameter and feature selection as required work in a practical use, and for work such as model ensemble and stacking for improving performance by combining a plurality of models for the purpose of evaluating generalization performance and improving performance. Thus, a calculation time becomes a problem even in the gradient boosting the processing of which is performed at relatively high speed. Thus, in recent years, there have been reported a large number of researches for increasing a processing speed of learning processing by gradient boosting.

In learning by gradient boosting, a branch score at each node needs to be operated by using an accumulated gradient. To operate the branch score, a divider, a multiplier, and the like are required, and a circuit scale is increased. Specifically, this problem is obvious when the number of dimensions of the feature amount of the learning data increases.

In relation to the gradient boosting described above, there is disclosed a technique of implementing learning processing with hard logic for the purpose of increasing the speed of decision tree learning (refer to Narayanan, Ramanathan, et al. "Interactive presentation: An FPGA implementation of decision tree classification." Proceedings of the conference on Design, automation and test in Europe. EDA Consortium, 2007.).

However, in the technique disclosed in Narayanan, Ramanathan, et al. "Interactive presentation: An FPGA implementation of decision tree classification." Proceedings of the conference on Design, automation and test in Europe. EDA Consortium, 2007, a divider is used for implementing an arithmetic operation of the branch score, and there is still the problem that the circuit scale is increased when the number of samples is large.

SUMMARY OF THE INVENTION

According to an aspect of the present invention, a learning device is configured to perform learning of a decision tree. The learning device includes a gradient output unit and a branch score calculator. The gradient output unit is configured to output a cumulative sum of gradient information corresponding to each value of a feature amount of learning data. The branch score calculator is configured to calculate a branch score used for determining a branch condition for a node of the decision tree, from the cumulative sum without using a dividing circuit.

BRIEF DESCRIPTION OF THE DRAWINGS

The accompanying drawings are intended to depict exemplary embodiments of the present invention and should not be interpreted to limit the scope thereof. Identical or similar reference numerals designate identical or similar components throughout the various drawings.

DESCRIPTION OF THE EMBODIMENTS

Figure 1:
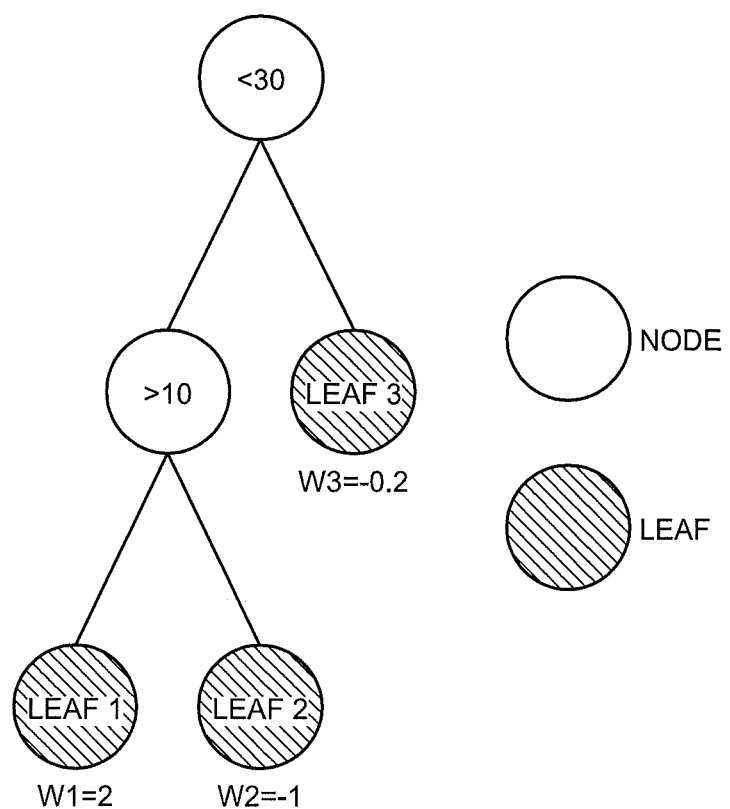
FIG. 1 is a diagram illustrating an example of a decision tree model.

The terminology used herein is for the purpose of describing particular embodiments only and is not intended to be limiting of the present invention.

As used herein, the singular forms "a", "an" and "the" are intended to include the plural forms as well, unless the context clearly indicates otherwise.

In describing preferred embodiments illustrated in the drawings, specific terminology may be employed for the sake of clarity. However, the disclosure of this patent specification is not intended to be limited to the specific terminology so selected, and it is to be understood that each specific element includes all technical equivalents that have the same function, operate in a similar manner, and achieve a similar result.

An embodiment of the present invention will be described in detail below with reference to the drawings.

An embodiment has an object to provide a learning device and a learning method that can prevent a circuit scale for calculating the branch score in gradient boosting from being increased.

The following describes embodiments of a learning device and a learning method according to the present invention in detail with reference to FIG. 1 to FIG. 34. The present invention is not limited to the following embodiments. Components in the following embodiments encompass a component that is easily conceivable by those skilled in the art, substantially the same component, and what is called an equivalent. Additionally, the components can be variously omitted, replaced, modified, and combined without departing from the gist of the embodiments described below.

First Embodiment

Regarding Logic of GBDT

In DL as an algorithm of high-performance machine learning, a discriminator is attempted to be implemented by various kinds of hard logic, which has been found to have higher power efficiency as compared with processing using a graphics processing unit (GPU). However, an architecture of the GPU closely matches to especially a CNN in the field of DL, so that, in view of speed, speed of discrimination performed by a field-programmable gate array (FPGA) implemented with logic is not higher than that of the GPU. On the other hand, hard logic has been attempted to be implemented by FPGA on a decision tree-based algorithm such as a GBDT, and a result of higher speed than the GPU has been reported. This is because, as described later, the decision tree-based algorithm is not appropriate for the architecture of the GPU in view of a feature of data arrangement thereof.

Examination as to learning falls behind examination as to discrimination in the world. There is almost no report about present circumstances of DL, and the number of reports about a decision tree system is small. Particularly, there is no report about learning by the GBDT under present circumstances, which can be currently considered to be an undeveloped field. To obtain an accurate discrimination model, selection and design of a feature amount, and selection of a hyperparameter of a learning algorithm are performed at the time of learning, so that an enormous number of trials are required. Especially in a case in which there is a large amount of learning data, speed of learning processing considerably affects accuracy of a final model practically. Additionally, in a field in which real-time performance for following environmental change is required such as robotics, High Frequency Trading (HFT), and Real-Time Bidding (RTB), speed is directly connected with performance. Thus, in a case in which high-speed learning processing is achieved by the GBDT with high accuracy, it can be considered to be able to largely improve performance of a system using the GBDT eventually.

Affinity of GBDT for FPGA

The following describes, in view of affinity of the GBDT for the FPGA, why the processing speed of the decision tree or the GBDT by the GPU is not high, and why the processing speed thereof by the FPGA is high.

First, description is made from a viewpoint that the GBDT is an algorithm using boosting. In a case of Random Forest (RF) using ensemble learning in the field of decision tree, trees are not dependent on each other, so that parallelization is easily performed by the GPU. However, the GBDT is a method of connecting a large number of trees using boosting, so that learning of a subsequent tree cannot be started until a result of a previous tree is obtained. Thus, the processing is serial processing, and it is important to learn each tree at high speed as much as possible. On the other hand, in the RF, an option of increasing the entire learning speed may be employed by increasing learning speed for a large number of trees in parallel even if the learning speed for each tree is low. Thus, also in a case of using the GPU, it can be considered that a problem of access latency of a Dynamic Random Access Memory (DRAM) (described later) can be concealed in some degree.

Next, description is made from a viewpoint of a limit of access speed (especially in random access) of a GPU device to a random access memory (RAM). A static random access memory (SRAM) built into the FPGA can greatly increase a bus width of a RAM in the FPGA, so that 3.2 [TB/sec] is achieved as follows even in a case of using XC7k325T manufactured by Xilinx Inc. as a middle-range FPGA, for example. Capacity of a built-in RAM is 16 [Mb].

445 BRAMs×36 bit×100 MHz×2 ports=445*36*2*100*10^6/10^12=3.2 TB/sec

In a case of using VU9P manufactured by Xilinx Inc. as a high-end FPGA, 6.9 [TB/sec] is achieved. The capacity of the built-in RAM is 270 [Mb].

960 URAMs×36 bit×100 MHz×2 ports=960*36*2*100*10^6/10^12=6.9 TB/sec

These values are obtained in a case of causing a clock frequency to be 100 [MHz], but actually, operation may be performed at about 200 to 500 [MHz] by devising a circuit configuration, and a limit band is raised several-fold. On the other hand, a RAM of a current generation connected to a central processing unit (CPU) is Double-Data-Rate4 (DDR4), but a band generated with one Dual Inline Memory Module (DIMM) remains at 25.6 [GB/sec] as described below. Even with an interleave configuration (256 bit width) of four DIMMs, the band reaches about 100 [GB/sec]. In a case in which a chip standard of the DDR4 is DDR4-3200 (bus width of 64 bit, 1 DIMM), the following expression is satisfied.

200 MHz×2 (DDR)×64=200*10^6*2*64/10^9=25.6 GB/sec

A band of a Graphics Double-Data-Rate 5 (GDDR5) mounted on the GPU is about four times larger than the band of the DDR4, but is about 400 [GB/sec] at the maximum.

In this way, the bands are greatly different from each other between the RAM in the FPGA and an external memory of the GPU and the CPU. Although the case of sequential access to an address has been described above, access time at the time of random access works more greatly. The built-in RAM of the FPGA is an SRAM, so that the access latency is 1 clock both in the sequential access and the random access. However, each of the DDR4 and the GDDR5 is a DRAM, so that latency is increased in a case of accessing different columns due to a sense amplifier. For example, typical Column Address Strobe latency (CAS latency) is 16 clock in the RAM of the DDR4, and throughput is calculated to be 1/16 of that of the sequential access in brief.

In a case of the CNN, pieces of data of adjacent pixels are successively processed, so that latency of the random access is not a big problem. However, in a case of the decision tree, addresses of original data of respective branches become discontinuous as branching proceeds, which becomes random access basically. Thus, in a case of storing the data in the DRAM, the throughput thereof causes a bottleneck, and the speed is greatly lowered. The GPU includes a cache to suppress performance deterioration in such a case, but the decision tree is basically an algorithm of accessing the entire data, so that there is no locality in data access, and an effect of the cache is hardly exhibited. In the structure of the GPU, the GPU includes a shared memory including an SRAM assigned to each arithmetic core (SM), and high-speed processing can be performed by using the shared memory in some cases. However, in a case in which the capacity of each SM is small, that is, 16 to 48 [kB], and access is performed across SMs, large latency is caused. The following represents a test calculation of the capacity of the shared memory in a case of Nvidia K80 as an expensive large-scale GPU at the present time.

$K80=2\times13$ $SMX=26$ $SMX=4992$ CUDA core 26×48× 8=9 Mb

As described above, even in a large-scale GPU that is worth hundreds of thousands of yen, the capacity of the shared memory is only 9 [Mb], which is too small. Additionally, in a case of the GPU, as described above, because the SM that performs processing cannot directly access the shared memory of the other SM, there is a restriction that high-speed coding is difficult to be performed in a case of being used for learning of the decision tree.

As a described above, assuming that the data is stored in the SRAM on the FPGA, it can be considered that the FPGA can implement a learning algorithm of the GBDT at higher speed as compared with the GPU.

Algorithm of GBDT

FIG. 1 is a diagram illustrating an example of a decision tree model. The following describes basic logic of the GBDT with reference to expressions (1) to (22) and FIG. 1.

The GBDT is a method of supervised learning, and the supervised learning is processing of optimizing an objective function obj($\theta$) including a loss function L($\theta$) representing a degree of fitting with respect to learning data and a regularization term $\Omega(\theta)$ representing complexity of a learned model using some kind of scale as represented by the following expression (1). The regularization term $\Omega(\theta)$ has a role of preventing a model (decision tree) from being too complicated, that is, improving generalization performance.

$$\text{obj}(\theta) = L(\theta) + \Omega(\theta) \tag{1}$$

The loss function of the first term of the expression (1) is, for example, obtained by adding up losses calculated from an error function l for respective pieces of sample data (learning data) as represented by the following expression (2). In this case, n is the number of pieces of sample data, i is a sample number, y is a label, and y (hat) of a model is a predicted value.

$$L(\theta) = \sum_{i=1}^{n} l(y_i, \hat{y}_i) \tag{2}$$

In this case, for example, as the error function l, a square error function or a logistic loss function as represented by the following expression (3) and the expression (4) is used.

$$l(y_i, \hat{y}_i) = (y_i - \hat{y}_i)^2 \tag{3}$$

$$l(y_i, \hat{y}_i) = y_i \ln(1 + e^{-\hat{y}_i}) + (1 - y_i)\ln(1 + e^{\hat{y}_i}) \tag{4}$$

As the regularization term $\Omega(\theta)$ of the second term of the expression (1), for example, a squared norm of a parameter $\theta$ as represented by the following expression (5) is used. In this case, $\lambda$ is a hyperparameter representing weight of regularization.

$$\Omega(\theta) = \lambda \|\theta\|^2 \tag{5}$$

A case of the GBDT is considered herein. First, the predicted value for the i-th sample data $x_i$ of the GBDT can be represented by the following expression (6).

$$\hat{y}_i = \sum_{k=1}^{K} f_k(x_i) \tag{6}$$

In this case, K is the total number of decision trees, k is a number of the decision tree, $f_K(\ )$ is an output of the k-th decision tree, and $x_i$ is a feature amount of sample data to be input. Accordingly, it can be found that a final output is obtained by adding up outputs of the respective decision trees in the GBDT similarly to the RF and the like. The parameter $\theta$ is represented as $\theta = \{f_1, f_2, \ldots, f_K\}$. According to the above description, the objective function of the GBDT is represented by the following expression (7).

$$\text{obj}(\theta) = \sum_{i=1}^{n} l(y_i, \hat{y}_i) + \sum_{k=1}^{K} \Omega(f_k) \tag{7}$$

Learning is performed on the objective function described above, but a method such as Stochastic Gradient Descent (SGD) used for learning of a neural network and the like cannot be used for the decision tree model. Thus, learning is performed by using Additive Training (boosting). In the Additive Training, a predicted value in a certain round (number of times of learning, the number of decision tree models) t is represented by the following expression (8).

$$\hat{y}_i^{(0)} = 0$$

$$\hat{y}_i^{(1)} = f_1(x_i) = \hat{y}_i^{(0)} + f_1(x_i)$$

$$\hat{y}_i^{(2)} = f_1(x_i) + f_2(x_i) = \hat{y}_i^{(1)} + f_2(x_i) \tag{8}$$

$$\hat{y}_i^{(t)} = \sum_{k=1}^{t} f_k(x_i) = \hat{y}_i^{(t-1)} + f_t(x_i)$$

From the expression (8), it can be found that (an output) of the decision tree $f_t(x_i)$ needs to be obtained in the certain round t. On the other hand, it is not required to consider other rounds in the certain round t. Thus, the following description considers the round t. The objective function in the round t is represented by the following expression (9).

$$\text{obj}^{(t)} = \sum_{i=1}^{n} l(y_i, \hat{y}_i^{(t)}) + \sum_{k=1}^{K} \Omega(f_k) \tag{9}$$

$$= \sum_{i=1}^{n} l(y_i, \hat{y}_i^{(t-1)} + f_t(x_i)) + \Omega(f_k) + \text{constant}$$

In this case, Taylor expansion (truncated at a second-order term) of the objective function in the round t is represented by the following expression (10).

$$\text{obj}^{(t)} \cong \sum_{i=1}^{n} \left[ l(y_i, \hat{y}_i^{(t-1)}) + g_i f_t(x_i) + \frac{1}{2} h_i f_t^2(x_i) \right] + \Omega(f_t) + \text{constant} \tag{10}$$

In this case, in the expression (10), pieces of gradient information $g_i$ and $h_i$ are represented by the following expression (11).

$$g_i = \partial_{\hat{y}_i^{(t-1)}} l(y_i, \hat{y}_i^{(t-1)})$$

$$h_i = \partial_{\hat{y}_i^{(t-1)}}^2 l(y_i, \hat{y}_i^{(t-1)}) \tag{11}$$

When a constant term is ignored in the expression (10), the objective function in the round t is represented by the following expression (12).

$$\text{obj}^{(t)} = \sum_{i=1}^{n} \left[ g_i f_t(x_i) + \frac{1}{2} h_i f_t^2(x_i) \right] + \Omega(f_t) \tag{12}$$

In the expression (12), the objective function in the round t is represented by the regularization term and a value obtained by performing first-order differentiation and second-order differentiation on the error function by the predicted value in a previous round, so that it can be found that the error function on which first-order differentiation and second-order differentiation can be performed can be applied.

The following considers the decision tree model. FIG. 1 illustrates an example of the decision tree model. The decision tree model includes nodes and leaves. At the node, an input is input to the next node or leaf under a certain branch condition, and the leaf has a leaf weight, which becomes an output corresponding to the input. For example, FIG. 1 illustrates the fact that a leaf weight W2 of a "leaf 2" is "−1".

The decision tree model is formulated as represented by the following expression (13).

$$f_t(x) = w_{q(x)}, w \in \mathbb{R}^T, q: \mathbb{R}^d \to \{1, 2, \ldots T\} \quad (13)$$

In the expression (13), w represents a leaf weight, and q represents a structure of the tree. That is, an input (sample data x) is assigned to any of the leaves depending on the structure q of the tree, and the leaf weight of the leaf is output.

In this case, complexity of the decision tree model is defined as represented by the following expression (14).

$$\Omega(f_t) = \gamma T + \frac{1}{2} \lambda \sum_{j=1}^{T} w_j^2 \quad (14)$$

In the expression (14), the first term represents complexity due to the number of leaves, and the second term represents a squared norm of the leaf weight. γ is a hyperparameter for controlling importance of the regularization term. Based on the above description, the objective function in the round t is organized as represented by the following expression (15).

$$\begin{aligned} obj^{(t)} &\cong \sum_{i=1}^{n} \left[ g_i f_t(x_i) + \frac{1}{2} h_i f_t^2(x_i) \right] + \Omega(f_t) \\ &= \sum_{i=1}^{n} \left[ g_i w_{q(x_i)} + \frac{1}{2} h_i w_{q(x_i)}^2 \right] + \gamma T + \frac{1}{2} \lambda \sum_{j=1}^{T} w_j^2 \\ &= \sum_{j=1}^{T} \left[ \left( \sum_{i \in I_j} g_i \right) w_j + \frac{1}{2} \left( \sum_{i \in I_j} h_i + \lambda \right) w_j^2 \right] + \gamma T \\ &= \sum_{j=1}^{T} \left[ G_j w_j + \frac{1}{2} (H_j + \lambda) w_j^2 \right] + \gamma T \end{aligned} \quad (15)$$

However, in the expression (15), $I_j$, $G_j$, and $H_j$ are represented by the following expression (16).

$$I_j = \{i | q(x_i) = j\}$$

$$G_j = \sum_{i \in I_j} g_i$$

$$H_j = \sum_{i \in I_j} h_i \quad (16)$$

From the expression (15), the objective function in the certain round t is a quadratic function related to the leaf weight w, and a minimum value of the quadratic function and a condition thereof are typically represented by the following expression (17).

$$\operatorname{argmin}_w Gw + \frac{1}{2} Hw^2 = -\frac{G}{H}, H > 0 \quad (17)$$

$$\min_w Gw + \frac{1}{2} Hw^2 = -\frac{1}{2} \frac{G^2}{H}$$

That is, when the structure q of the decision tree in the certain round t is determined, the objective function and the leaf weight thereof are represented by the following expression (18).

$$w_j^* = \frac{G_j}{H_j + \lambda} \quad (18)$$

$$obj = -\frac{1}{2} \sum_{j=1}^{T} \frac{G_j^2}{H_j + \lambda} + \gamma T$$

At this point, the leaf weight is enabled to be calculated at the time when the structure of the decision tree is determined in the certain round. The following describes a procedure of learning the structure of the decision tree.

Methods of learning the structure of the decision tree include a greedy method (Greedy Algorithm). The greedy method is an algorithm of starting the tree structure from depth 0, and learning the structure of the decision tree by calculating a branch score (Gain) at each node to determine whether to branch. The branch score is obtained by the following expression (19).

$$\text{Gain} = \frac{1}{2} \left[ \frac{G_L^2}{H_L + \lambda} + \frac{G_R^2}{H_R + \lambda} - \frac{(G_L + G_R)^2}{H_L + H_R + \lambda} \right] - \gamma \quad (19)$$

In this case, each of $G_L$ and $H_L$ is the sum of the gradient information of the sample branching to a left node, each of $G_R$ and $H_R$ is the sum of the gradient information of the sample branching to a right node, and γ is the regularization term. The first term in [ ] of the expression (19) is a score (objective function) of the sample data branching to the left node, the second term is a score of the sample data branching to the right node, and the third term is a score in a case in which the sample data does not branch, which represents a degree of improvement of the objective function due to branching.

The branch score represented by the expression (19) described above represents goodness at the time of branching with a certain threshold of a certain feature amount, but an optimum condition cannot be determined based on the single branch score. Thus, in the greedy method, the branch score is obtained for all threshold candidates of all feature amounts to find a condition under which the branch score is the largest. The greedy method is a very simple algorithm as described above, but calculation cost thereof is high because the branch score is obtained for all threshold candidates of all feature amounts. Thus, for library such as XGBoost (described later), a method of reducing the calculation cost while maintaining performance is devised.

Regarding XGBoost

The following describes XGBoost that is well-known as a library of the GBDT. In the learning algorithm of XGBoost, two points are devised, that is, reduction of the threshold candidates and treatment of a missing value.

First, the following describes reduction of the threshold candidates. The greedy method described above has a problem such that the calculation cost is high. In XGBoost, the number of threshold candidates is reduced by a method of Weighted Quantile Sketch. In this method, the sum of the gradient information of the sample data branching to the left and the right is important in calculating the branch score (Gain), and only a threshold with which the sum of the gradient information varies at a constant ratio is caused to be a candidate to be searched for. Specifically, a second-order gradient h of the sample is used. Assuming that the number of dimensions of the feature amount is f, a set of the feature amount and the second-order gradient h of the sample data is represented by the following expression (20).

$$D_f = \{(x_{1f}, h_1), (x_{2f}, h_2), \ldots, (x_{nf}, h_n)\} \quad (20)$$

A RANK function $r_f$ is defined as represented by the following expression (21).

$$r_f(z) = \frac{1}{\sum_{(x,h) \in D_f} h} \sum_{(x,h) \in D_f, x<z} h \quad (21)$$

In this case, z is a threshold candidate. The RANK function $r_f$ in the expression (21) represents a ratio of the sum of second-order gradients of the sample data smaller than a certain threshold candidate to the sum of second-order gradients of all pieces of sample data. In the end, a set of certain threshold candidates $\{s_{f1}, s_{f2}, \ldots, s_{fl}\}$ needs to be obtained for a feature amount represented by the dimension f, which is obtained by the following expression (22).

$$|r_f(s_{fj}) - r_f(s_{fj+1})| < \varepsilon$$

$$s_{f1} = \min(\{x_{1f}, x_{2f}, \ldots, x_{nf}\})$$

$$s_{fl} = \max(\{x_{1f}, x_{2f}, \ldots, x_{nf}\}) \quad (22)$$

In this case, s is a parameter for determining a degree of reduction of the threshold candidates, and about $1/\varepsilon$ threshold candidates can be obtained.

As Weighted Quantile Sketch, two patterns can be considered, that is, a global pattern in which Weighted Quantile Sketch is performed at the first node of the decision tree (collectively performed on all pieces of sample data), and a local pattern in which Weighted Quantile Sketch is performed at each node (performed each time on a sample assigned to a corresponding node). It has been found that the local pattern is appropriate in view of generalization performance, so that the local pattern is employed in XGBoost.

Next, the following describes treatment of a missing value. There is no typically effective method of treating the missing value of sample data to be input in the field of machine learning, irrespective of the GBDT and the decision tree. There are a method of complementing the missing value with an average value, a median, a cooperative filter, or the like, and a method of excluding a feature amount including a large number of missing values, for example, but these methods are successfully implemented in not so many cases in view of performance. However, the structured data often includes a missing value, so that some measure is required in a practical use.

In XGBoost, the learning algorithm is devised to directly treat the sample data including the missing value. This is a method of obtaining a score at the time when all pieces of data of the missing value are assigned to any of the left and the right nodes in obtaining the branch score at the node. In a case of performing Weighted Quantile Sketch described above, the threshold candidate may be obtained for a set excluding the sample data including the missing value.

Regarding LightGBM

Next, the following describes LightGBM as a library of the GBDT. LightGBM employs a fast algorithm employing quantization of the feature amount, what is called binning, for preprocessing, and utilizing a GPU for calculating the branch score. Performance of LightGBM is substantially the same as that of XGBoost, and learning speed of LightGBM is several times higher than that of XGBoost. In recent years, users of LightGBM have been increased.

First, the following describes quantization of the feature amount. When a data set is large-scale, the branch score needs to be calculated for a large number of threshold candidates. In LightGBM, the number of threshold candidates is reduced by quantizing the feature amount as preprocessing of learning. Additionally, due to quantization, values and the number of threshold candidates do not vary for each node as in XGBoost, so that LightGBM is indispensable processing in a case of utilizing the GPU.

Various studies have been carried out for quantization of the feature amount under the name of binning. In LightGBM, the feature amount is divided into k bins, and only k threshold candidates are present. k is 255, 63, and 15, for example, and performance or learning speed varies depending on the data set.

Calculation of the branch score is simplified due to quantization of the feature amount. Specifically, the threshold candidate becomes a simple quantized value. Thus, it is sufficient to create a histogram of a first-order gradient and a second-order gradient for each feature amount, and obtain the branch score for each bin (quantized value). This is called a feature amount histogram.

Next, the following describes calculation of the branch score utilizing the GPU. Calculation patterns of the branch score are 256 at the maximum because the feature amount is quantized, but the number of pieces of sample data may exceed tens of thousands depending on the data set, so that creation of the histogram dominates learning time. As described above, the feature amount histogram needs to be obtained in calculating the branch score. In a case of utilizing the GPU, a plurality of threads need to update the same histogram, but the same bin may be updated at this point. Thus, an Atomic operation needs to be used, and performance is deteriorated when a ratio of updating the same bin is high. Thus, in LightGBM, which of the histograms of the first-order gradient and the second-order gradient is used for updating the value is determined for each thread in creating the histogram, which lowers a frequency of updating the same bin.

Configuration of Learning and Discrimination Device

Figure 2:
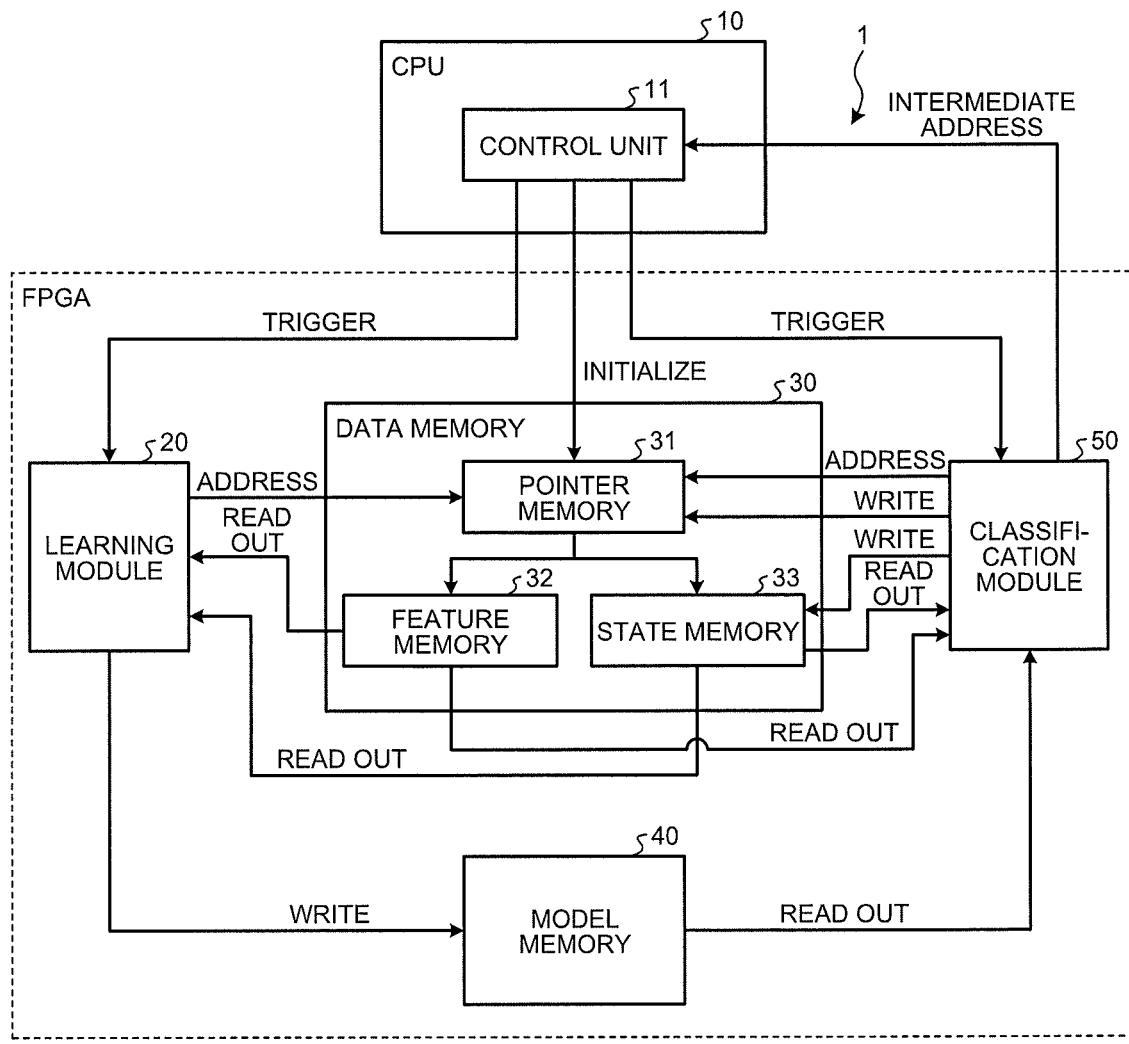
FIG. 2 is a diagram illustrating an example of a module configuration of a learning and discrimination device according to a first embodiment.
Figure 3:
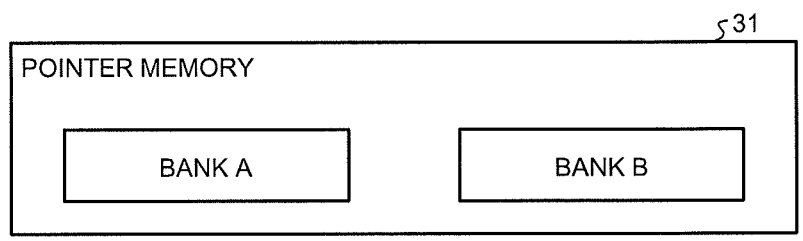
FIG. 3 is a diagram illustrating an example of a configuration of a pointer memory.
Figure 4:
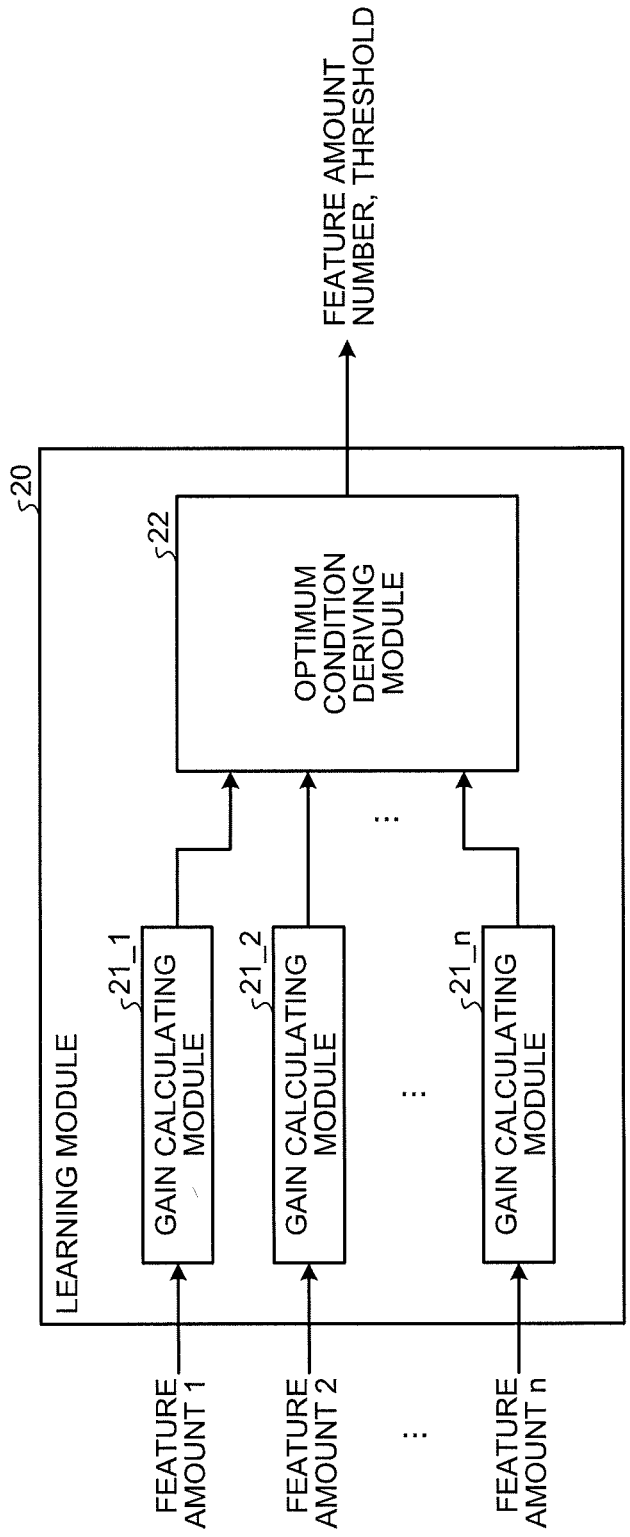
FIG. 4 is a diagram illustrating an example of a module configuration of a learning module.

FIG. 2 is a diagram illustrating an example of a module configuration of the learning and discrimination device according to the embodiment. FIG. 3 is a diagram illustrating an example of a configuration of a pointer memory. FIG. 4 is a diagram illustrating an example of a module configuration of a learning module. The following describes the module configuration of a learning and discrimination device 1 according to the present embodiment with reference to FIG. 2 to FIG. 4.

As illustrated in FIG. 2, the learning and discrimination device 1 according to the present embodiment includes a CPU 10, a learning module 20 (learning unit), a data memory 30, a model memory 40, and a classification module 50 (discriminating unit). Among these, the learning module 20, the data memory 30, the model memory 40, and the classification module 50 are configured by an FPGA. The CPU 10 can perform data communication with the FPGA via a bus. In addition to the components illustrated in FIG. 2, the learning and discrimination device 1 may include other components such as a RAM serving as a work area of the CPU 10, a read only memory (ROM) storing a computer program and the like executed by the CPU 10, an auxiliary storage device storing various kinds of data (a computer program and the like), and a communication I/F for communicating with an external device, for example.

The CPU 10 is an arithmetic device that controls learning of the GBDT as a whole. The CPU 10 includes a control unit 11. The control unit 11 controls respective modules including the learning module 20, the data memory 30, the model memory 40, and the classification module 50. The control unit 11 is implemented by a computer program executed by the CPU 10.

The learning module 20 is a hardware module that calculates a number of an optimum feature amount (hereinafter, also referred to as a "feature amount number" in some cases) for each node constituting a decision tree, and a threshold, and in a case in which the node is a leaf, calculates a leaf weight to be written into the model memory 40. As illustrated in FIG. 4, the learning module 20 also includes gain calculating modules 21_1, 21_2, ..., and 21_n (gain calculators) and an optimum condition deriving module 22 (deriving unit). In this case, n is a number at least equal to or larger than the number of feature amounts of sample data (including both of learning data and discrimination data). In a case of indicating an optional gain calculating module among the gain calculating modules 21_1, 21_2, ..., and 21_n, or a case in which the gain calculating modules 21_1, 21_2, ..., and 21_n are collectively called, they are simply referred to as a "gain calculating module 21".

The gain calculating module 21 is a module that calculates a branch score at each threshold using the expression (19) described above for a corresponding feature amount among the feature amounts included in the sample data to be input. In this case, the learning data of the sample data includes a label (true value) in addition to the feature amount, and the discrimination data of the sample data includes the feature amount and does not include the label. Each gain calculating module 21 includes a memory that performs an operation on respective histograms of all feature amounts input at a time (in 1 clock) and stores the histograms, and performs an operation on all of the feature amounts in parallel. Based on results of the histograms, gains of the respective feature amounts are calculated in parallel. Due to this, processing can be performed on all of the feature amounts at a time, or at the same time, so that speed of learning processing can be significantly improved. Such a method of reading out and processing all of the feature amounts in parallel is called Feature Parallel. To implement this method, a data memory needs to be able to read out all of the feature amounts at a time (in 1 clock). Thus, this method cannot be implemented with a memory having a normal data width such as 32-bit or 256-bit width. With software, the number of bits of data that can be treated by the CPU at a time is typically 64 bits at the maximum, and even when the number of the feature amounts is 100 and the number of bits of each feature amount is 8 bits, 8000 bits are required, so that the method cannot be implemented at all. Thus, in the related art, employed is a method of storing a different feature amount for each address of the memory (for example, 64-bit width that can be treated by the CPU), and storing the feature amounts as a whole across a plurality of addresses. On the other hand, the present method includes novel technical content such that all of the feature amounts are stored at one address of the memory, and all of the feature amounts are read out by one access.

As described above, in the GBDT, learning of the decision tree cannot be parallelized. Thus, how quickly each decision tree is learned dominates the speed of learning processing. On the other hand, in the RF for performing ensemble learning, there is no dependence between the decision trees at the time of learning, so that the learning processing for each decision tree can be easily parallelized, but accuracy thereof is typically lower than that of the GBDT. As described above, by applying Feature Parallel as described above to learning of the GBDT having higher accuracy than that of the RF, speed of the learning processing of the decision tree can be improved.

The gain calculating module 21 outputs the calculated branch score to the optimum condition deriving module 22.

The optimum condition deriving module 22 is a module that receives an input of each branch score corresponding to the feature amount output from each gain calculating module 21, and derives a threshold and a number of the feature amount (feature amount number) the branch score of which is the largest. The optimum condition deriving module 22 writes the derived feature amount number and threshold into the model memory 40 as branch condition data of a corresponding node (an example of data of a node).

The data memory 30 is an SRAM that stores various kinds of data. The data memory 30 includes a pointer memory 31, a feature memory 32, and a state memory 33.

The pointer memory 31 is a memory that stores a storage destination address of the sample data stored in the feature memory 32. As illustrated in FIG. 3, the pointer memory 31 includes a bank A (bank region) and a bank B (bank region). An operation of dividing a region into two banks including the bank A and the bank B, and storing the storage destination address of the sample data will be described later in detail with reference to FIG. 5 to FIG. 13. The pointer memory 31 may have three or more banks.

The feature memory 32 is a memory that stores the sample data (including the learning data and the discrimination data).

The state memory 33 is a memory that stores the state information (w, g, and h described above) and label information.

The model memory 40 is an SRAM that stores branch condition data (the feature amount number and the threshold) for each node of the decision tree, a leaf flag (flag information, an example of data of the node) indicating whether the node is a leaf, and a leaf weight in a case in which the node is a leaf.

The classification module 50 is a hardware module that distributes pieces of sample data for each node and each decision tree. The classification module 50 calculates the state information (w, g, h) to be written into the state memory 33.

Not only in discrimination (branching) of the sample data (learning data) in the learning processing described above but also in discrimination processing for the sample data (discrimination data), the classification module 50 can discriminate the discrimination data with the same module configuration. At the time of discrimination processing, processing performed by the classification module 50 can be pipelined by collectively reading all of the feature amounts, and the processing speed can be increased such that one piece of sample data is discriminated for each clock. On the other hand, in a case in which the feature amounts cannot be collectively read as described above, which of the feature amounts is required cannot be found unless branching into the respective node, so that the processing cannot be pipelined in a form of accessing an address of a corresponding feature amount each time.

Assuming that a plurality of classification modules 50 described above are provided, a plurality of pieces of discrimination data may be divided (Data Parallel) to be distributed to the respective classification modules 50, and each of the classification modules 50 may be caused to perform discrimination processing to increase the speed of discrimination processing.

Learning Processing of Learning and Discrimination Device

The following specifically describes learning processing of the learning and discrimination device 1 with reference to FIG. 5 to FIG. 13.

Initialization

Figure 5:
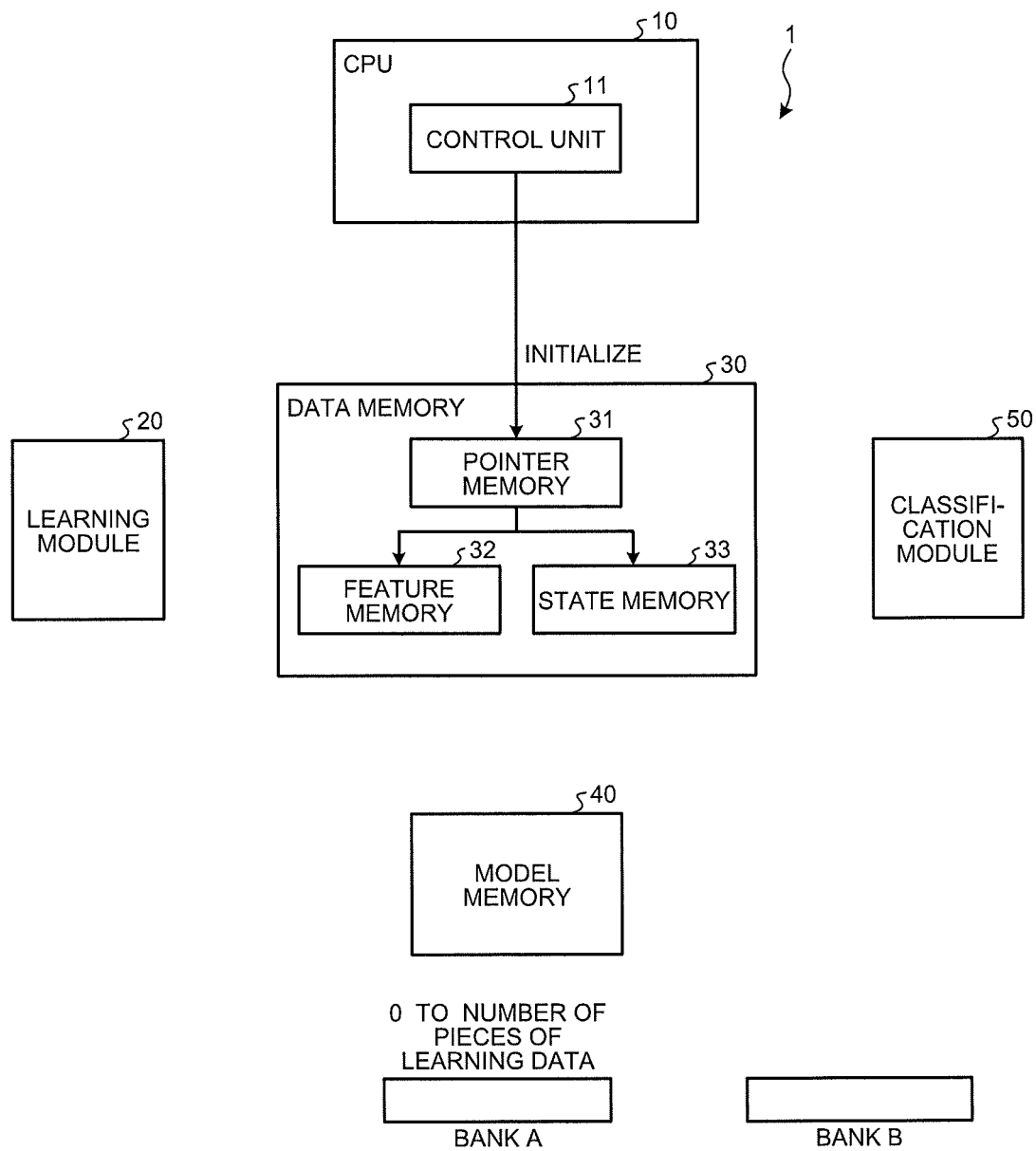
FIG. 5 is a diagram illustrating an operation of a module at the time of initializing the learning and discrimination device according to the first embodiment.

FIG. 5 is a diagram illustrating an operation of a module at the time of initializing the learning and discrimination device according to the embodiment. As illustrated in FIG. 5, first, the control unit 11 initializes the pointer memory 31. For example, as illustrated in FIG. 5, the control unit 11 writes, into the bank A of the pointer memory 31, addresses of the pieces of sample data (learning data) in the feature memory 32 corresponding to the number of pieces of learning data in order (for example, in ascending order of the address).

All pieces of the learning data are not necessarily used (all addresses are not necessarily written), and it may be possible to use pieces of the learning data that are randomly selected (write addresses of the selected pieces of the learning data) based on a probability corresponding to a predetermined random number by what is called data subsampling. For example, in a case in which a result of data subsampling is 0.5, half of all addresses of the pieces of the learning data may be written into the pointer memory 31 (in this case, the bank A) with a half probability corresponding to the random number. To generate a random number, a pseudorandom number created by a Linear Feedback Shift Register (LFSR) can be used.

All of the feature amounts of the pieces of learning data used for learning are not necessarily used, and it may be possible to use only feature amounts that are randomly selected (for example, selected half thereof) based on a probability corresponding to the random number similarly to the above description by what is called feature subsampling. In this case, for example, as data of feature amounts other than the feature amounts selected by feature subsampling, constants may be output from the feature memory 32. Due to this, an effect is exhibited such that generalization performance for unknown data (discrimination data) is improved.

Determination of Branch Condition Data at Depth 0, Node 0

Figure 6:
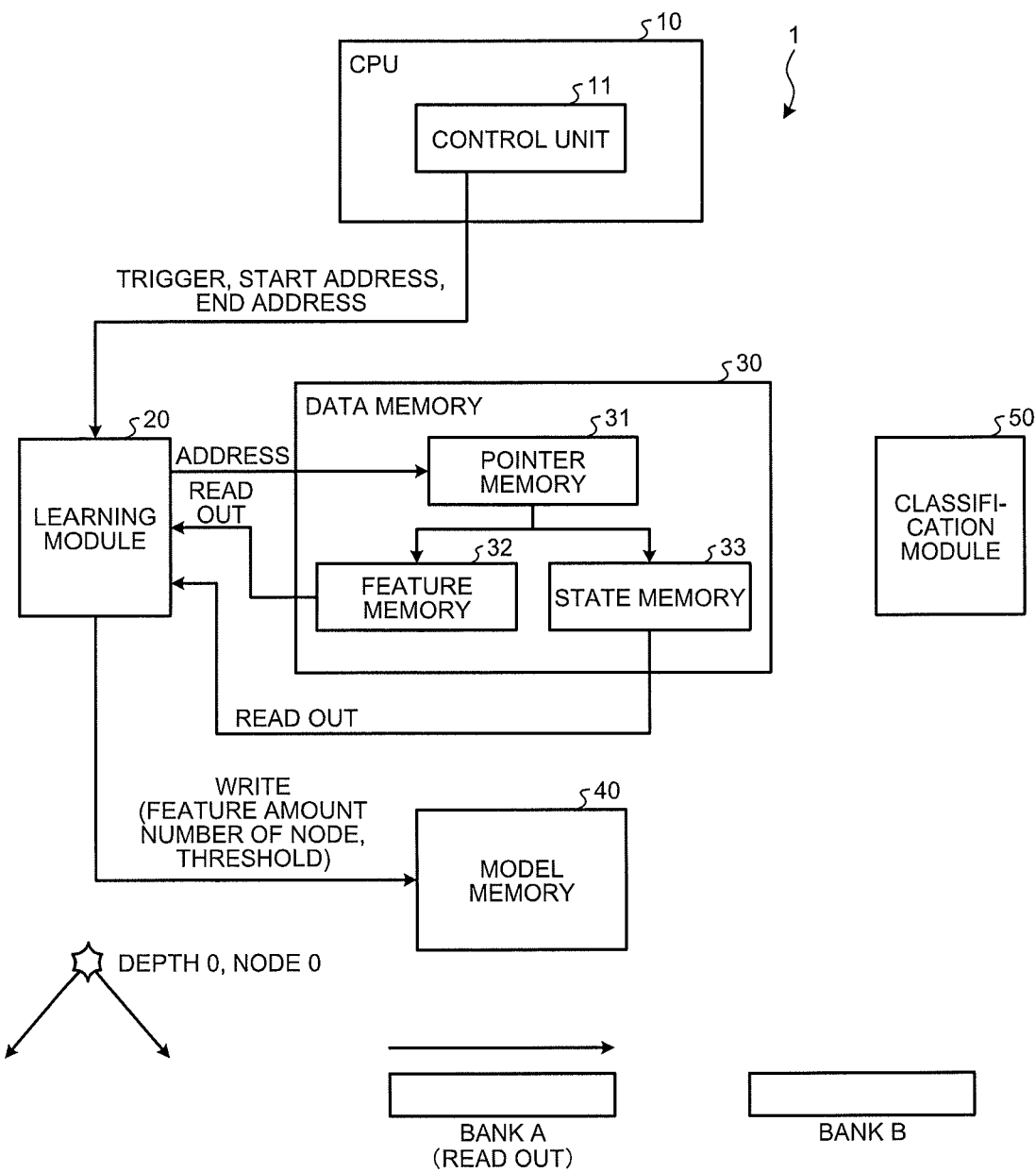
FIG. 6 is a diagram illustrating an operation of a module in a case of determining node parameters at depth 0, node 0 of the learning and discrimination device according to the first embodiment.

FIG. 6 is a diagram illustrating an operation of a module in a case of determining node parameters at depth 0, node 0 of the learning and discrimination device according to the embodiment. It is assumed that the top of a hierarchy of the decision tree is "depth 0", hierarchical levels lower than the top are referred to as "depth 1", "depth 2", . . . in order, the leftmost node at a specific hierarchical level is referred to as "node 0", and nodes on the right side thereof are referred to as "node 1", "node 2", . . . in order.

As illustrated in FIG. 6, first, the control unit 11 transmits a start address and an end address to the learning module 20, and causes the learning module 20 to start processing by a trigger. The learning module 20 designates an address of a target piece of the learning data from the pointer memory 31 (bank A) based on the start address and the end address, reads out the learning data (feature amount) from the feature memory 32, and reads out the state information (w, g, h) from the state memory 33 based on the address.

In this case, as described above, each gain calculating module 21 of the learning module 20 calculates a histogram of a corresponding feature amount, stores the histogram in the SRAM thereof, and calculates a branch score at each threshold based on a result of the histogram. The optimum condition deriving module 22 of the learning module 20 receives an input of the branch score corresponding to each feature amount output from the gain calculating module 21, and derives a threshold and a number of the feature amount (feature amount number) the branch score of which is the largest. The optimum condition deriving module 22 then writes the derived feature amount number and threshold into the model memory 40 as branch condition data of the corresponding node (depth 0, node 0). At this point, the optimum condition deriving module 22 sets the leaf flag to be "0" to indicate that branching is further performed from the node (depth 0, node 0), and writes the data of the node (this may be part of the branch condition data) into the model memory 40.

The learning module 20 performs the operation described above by designating the addresses of the pieces of learning data written into the bank A in order, and reading out the respective pieces of learning data from the feature memory 32 based on the addresses.

Data Branch Processing at Depth 0, Node 0

Figure 7:
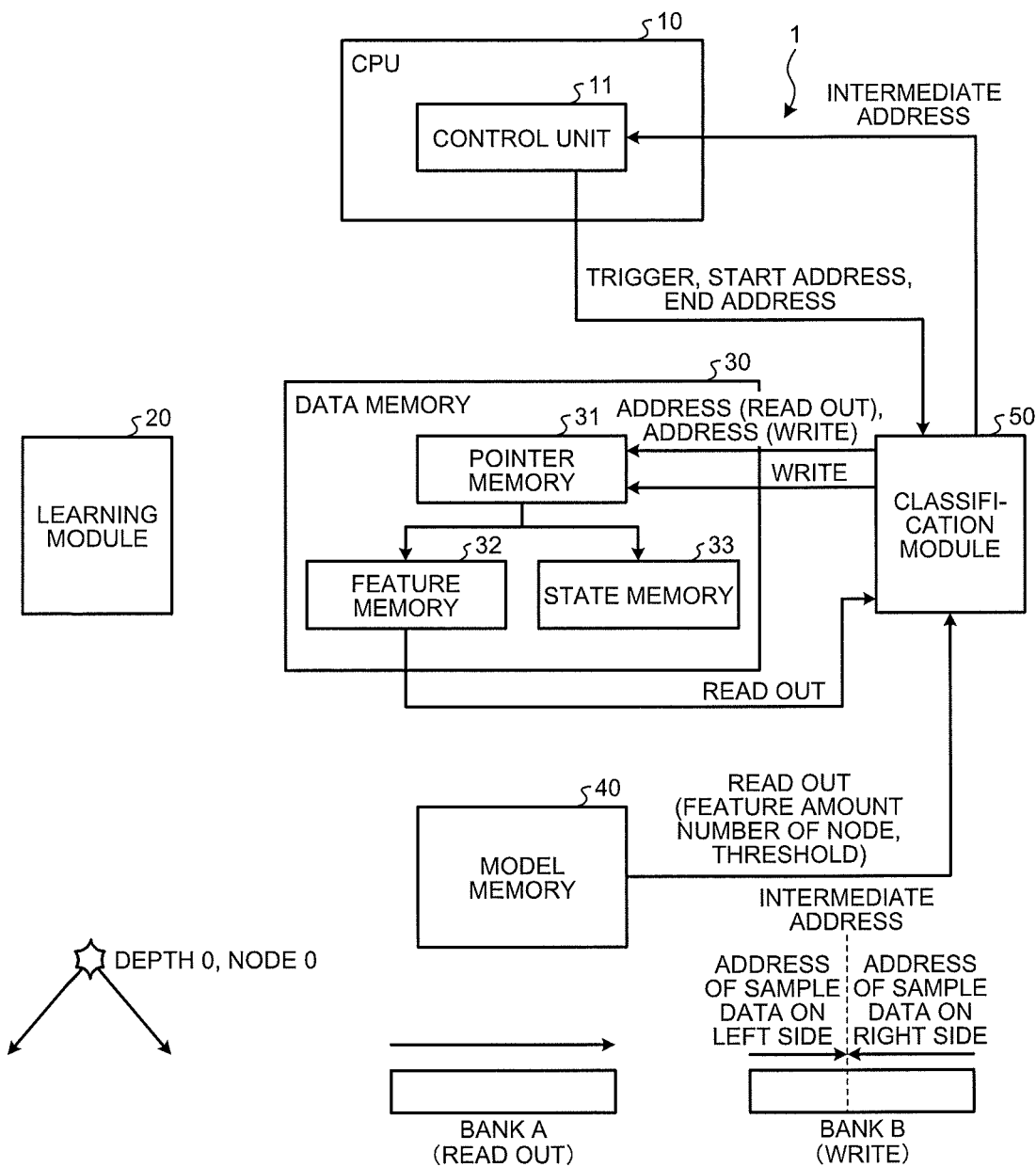
FIG. 7 is a diagram illustrating an operation of a module at the time of branching at depth 0, node 0 of the learning and discrimination device according to the first embodiment.

FIG. 7 is a diagram illustrating an operation of a module at the time of branching at depth 0, node 0 of the learning and discrimination device according to the embodiment.

As illustrated in FIG. 7, the control unit 11 transmits the start address and the end address to the classification module 50, and causes the classification module 50 to start processing by a trigger. The classification module 50 designates the address of the target learning data from the pointer memory 31 (bank A) based on the start address and the end address, and reads out the learning data (feature amount) from the feature memory 32 based on the address. The classification module 50 also reads out the branch condition data (the feature amount number, the threshold) of the corresponding node (depth 0, node 0) from the model memory 40. The classification module 50 determines whether to cause the read-out sample data to branch to the left side or to the right side of the node (depth 0, node 0) in accordance with the branch condition data, and based on a determination result, the classification module 50 writes the address of the learning data in the feature memory 32 into the other bank (writing bank) (in this case, the bank B) (a bank region for writing) different from a read-out bank (in this case, the bank A) (a bank region for reading-out) of the pointer memory 31.

At this point, if it is determined that branching is performed to the left side of the node, the classification module 50 writes the address of the learning data in ascending order of the address in the bank B as illustrated in FIG. 7. If it is determined that branching is performed to the right side of the node, the classification module 50 writes the address of the learning data in descending order of the address in the bank B. Due to this, in the writing bank (bank B), the address of the learning data branched to the left side of the node is written as a lower address, and the address of the learning data branched to the right side of the node is written as a higher address, in a clearly separated manner. Alternatively, in the writing bank, the address of the learning data branched to the left side of the node may be written as a higher address, and the address of the learning data branched to the right side of the node may be written as a lower address, in a separated manner.

In this way, the two banks, that is, the bank A and the bank B are configured in the pointer memory 31 as described above, and the memory can be efficiently used by alternately performing reading and writing thereon although the capacity of the SRAM in the FPGA is limited. As a simplified method, there is a method of configuring each of the feature memory 32 and the state memory 33 to have two banks. However, the data indicating the address in the feature memory 32 is typically smaller than the sample data, so that usage of the memory can be further reduced by a method of preparing the pointer memory 31 to indirectly designate the address as in the present embodiment.

As the operation described above, the classification module 50 performs branch processing on all pieces of the learning data. However, after the branch processing ends, the respective numbers of pieces of learning data separated to the left side and the right side of the node (depth 0, node 0) are not the same, so that the classification module 50 returns, to the control unit 11, an address (intermediate address) in the writing bank (bank B) corresponding to a boundary between the addresses of the learning data branched to the left side and the addresses of the learning data branched to the right side. The intermediate address is used in the next branch processing.

Determination of Branch Condition Data at Depth 1, Node 0

Figure 8:
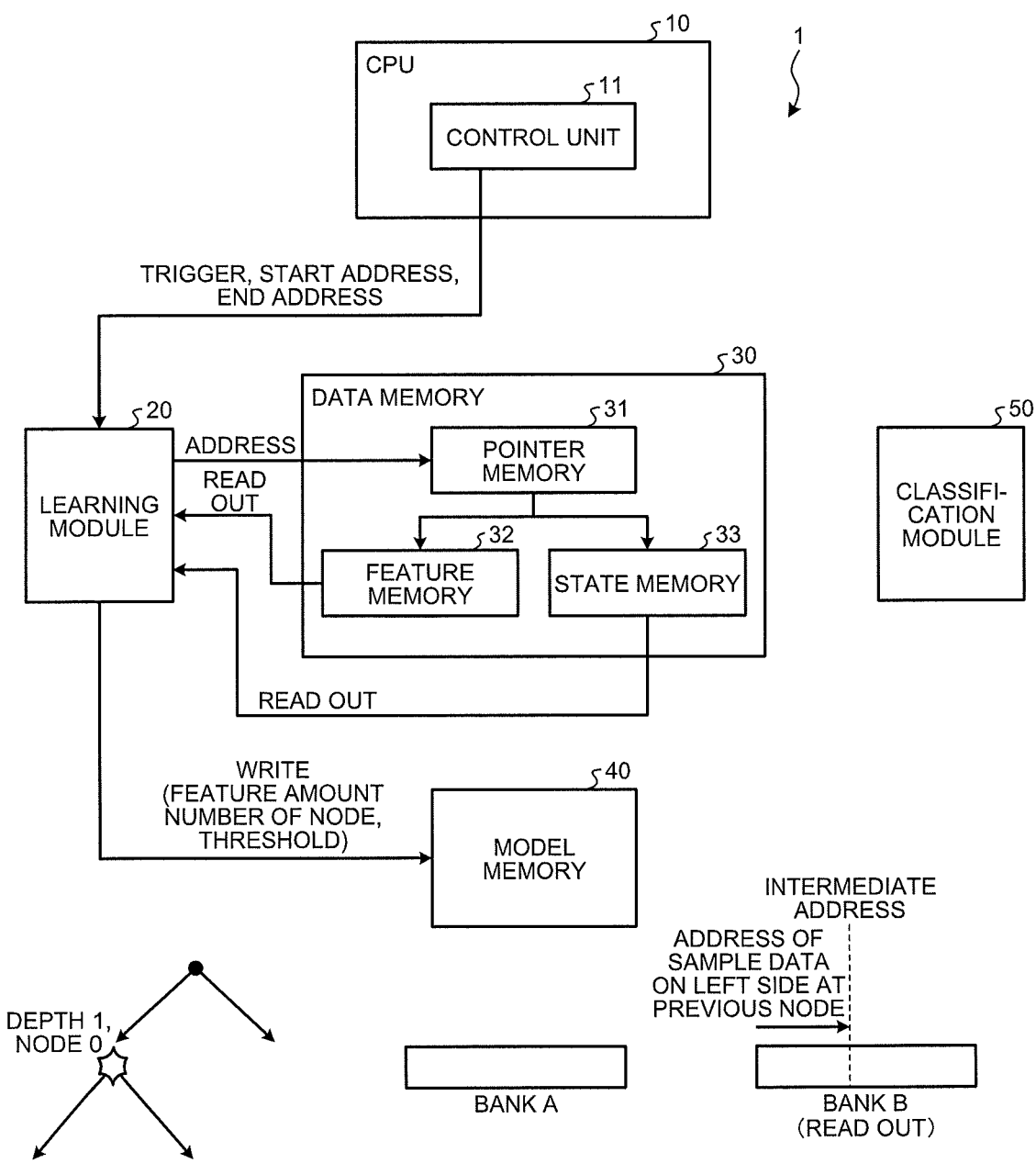
FIG. 8 is a diagram illustrating an operation of a module in a case of determining node parameters at depth 1, node 0 of the learning and discrimination device according to the first embodiment.

FIG. 8 is a diagram illustrating an operation of a module in a case of determining node parameters at depth 1, node 0 of the learning and discrimination device according to the embodiment. The operation is basically the same as that in the processing of determining the branch condition data at depth 0, node 0 illustrated in FIG. 6, but the hierarchical level of a target node is changed (from depth 0 to depth 1), so that roles of the bank A and the bank B in the pointer memory 31 are reversed. Specifically, the bank B serves as the read-out bank, and the bank A serves as the writing bank (refer to FIG. 9).

As illustrated in FIG. 8, the control unit 11 transmits the start address and the end address to the learning module 20 based on the intermediate address received from the classification module 50 through the processing at depth 0, and causes the learning module 20 to start processing by a trigger. The learning module 20 designates the address of the target learning data from the pointer memory 31 (bank B) based on the start address and the end address, reads out the learning data (feature amount) from the feature memory 32 based on the address, and reads out the state information (w, g, h) from the state memory 33. Specifically, as illustrated in FIG. 8, the learning module 20 designates the addresses in order from the left side (lower address) to the intermediate address in the bank B.

In this case, as described above, each gain calculating module 21 of the learning module 20 stores the feature amount of the read-out learning data in the SRAM thereof, and calculates the branch score at each threshold. The optimum condition deriving module 22 of the learning module 20 receives an input of the branch score corresponding to each feature amount output from the gain calculating module 21, and derives a threshold and a number of the feature amount (feature amount number) the branch score of which is the largest. The optimum condition deriving module 22 then writes the derived feature amount number and threshold into the model memory 40 as the branch condition data of the corresponding node (depth 1, node 0). At this point, the optimum condition deriving module 22 sets the leaf flag to be "0" to indicate that branching is further performed from the node (depth 1, node 0), and writes the data of the node (this may be part of the branch condition data) into the model memory 40.

The learning module 20 performs the operation described above by designating the addresses in order from the left side (lower address) to the intermediate address in the bank B, and reading out each piece of the learning data from the feature memory 32 based on the addresses.

Data Branch Processing at Depth 1, Node 0

Figure 9:
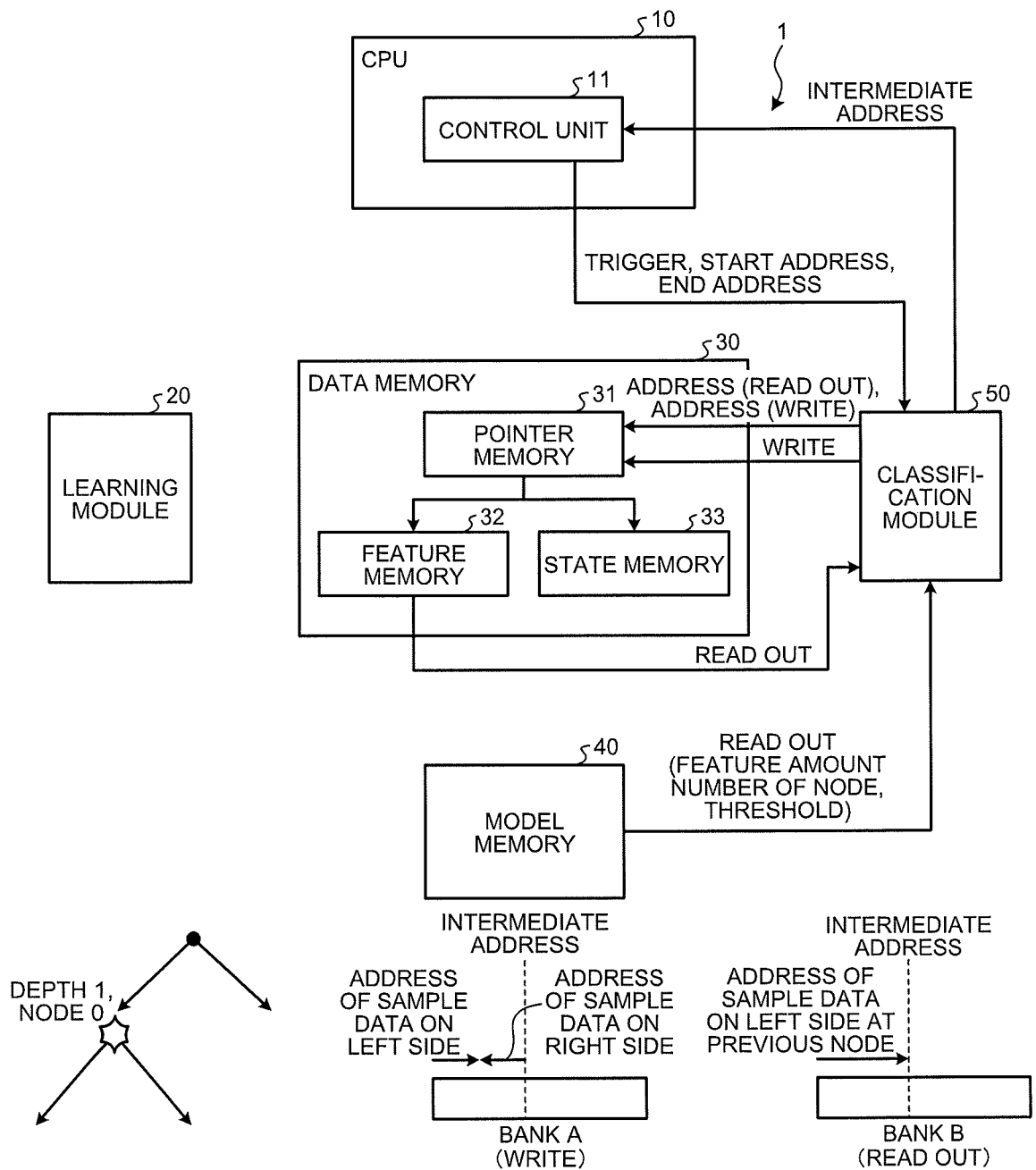
FIG. 9 is a diagram illustrating an operation of a module at the time of branching at depth 1, node 0 of the learning and discrimination device according to the first embodiment.

FIG. 9 is a diagram illustrating an operation of a module at the time of branching at depth 1, node 0 of the learning and discrimination device according to the embodiment.

As illustrated in FIG. 9, the control unit 11 transmits the start address and the end address to the classification module 50 based on the intermediate address received from the classification module 50 through the processing at depth 0, and causes the classification module 50 to start processing by a trigger. The classification module 50 designates the address of the target learning data from the left side of the pointer memory 31 (bank B) based on the start address and the end address, and reads out the learning data (feature amount) from the feature memory 32 based on the address. The classification module 50 also reads out the branch condition data (the feature amount number, the threshold) of the corresponding node (depth 1, node 0) from the model memory 40. The classification module 50 determines whether to cause the read-out sample data to branch to the left side or to the right side of the node (depth 1, node 0) in accordance with the branch condition data, and based on a determination result, the classification module 50 writes the address of the learning data in the feature memory 32 into the other bank (writing bank) (in this case, the bank A) (the bank region for writing) different from the read-out bank (in this case, the bank B) (the bank region for reading-out) of the pointer memory 31.

At this point, if it is determined that branching is performed to the left side of the node, the classification module 50 writes the address of the learning data in ascending order of the address (from the received start address) in the bank A as illustrated in FIG. 9. If it is determined that branching is performed to the right side of the node, the classification module 50 writes the address of the learning data in descending order of the address (from the received end address, that is, the previous intermediate address) in the bank A. Due to this, in the writing bank (bank A), the address of the learning data branched to the left side of the node is written as a lower address, and the address of the learning data branched to the right side of the node is written as a higher address, in a clearly separated manner. Alternatively, in the writing bank, the address of the learning data branched to the left side of the node may be written as a higher address, and the address of the learning data branched to the right side of the node may be written as a lower address, in a separated manner.

As the operation described above, the classification module 50 performs branch processing on a piece of learning data designated by the address written on the left side of the intermediate address in the bank B among all the pieces of learning data. However, after the branch processing ends, the respective numbers of pieces of learning data separated to the left side and the right side of the node (depth 1, node 0) are not the same, so that the classification module 50 returns, to the control unit 11, an address (intermediate address) in the writing bank (bank A) corresponding to the middle of the addresses of the learning data branched to the left side and the addresses of the learning data branched to the right side. The intermediate address is used in the next branch processing.

Determination of Branch Condition Data at Depth 1, Node 1

Figure 10:
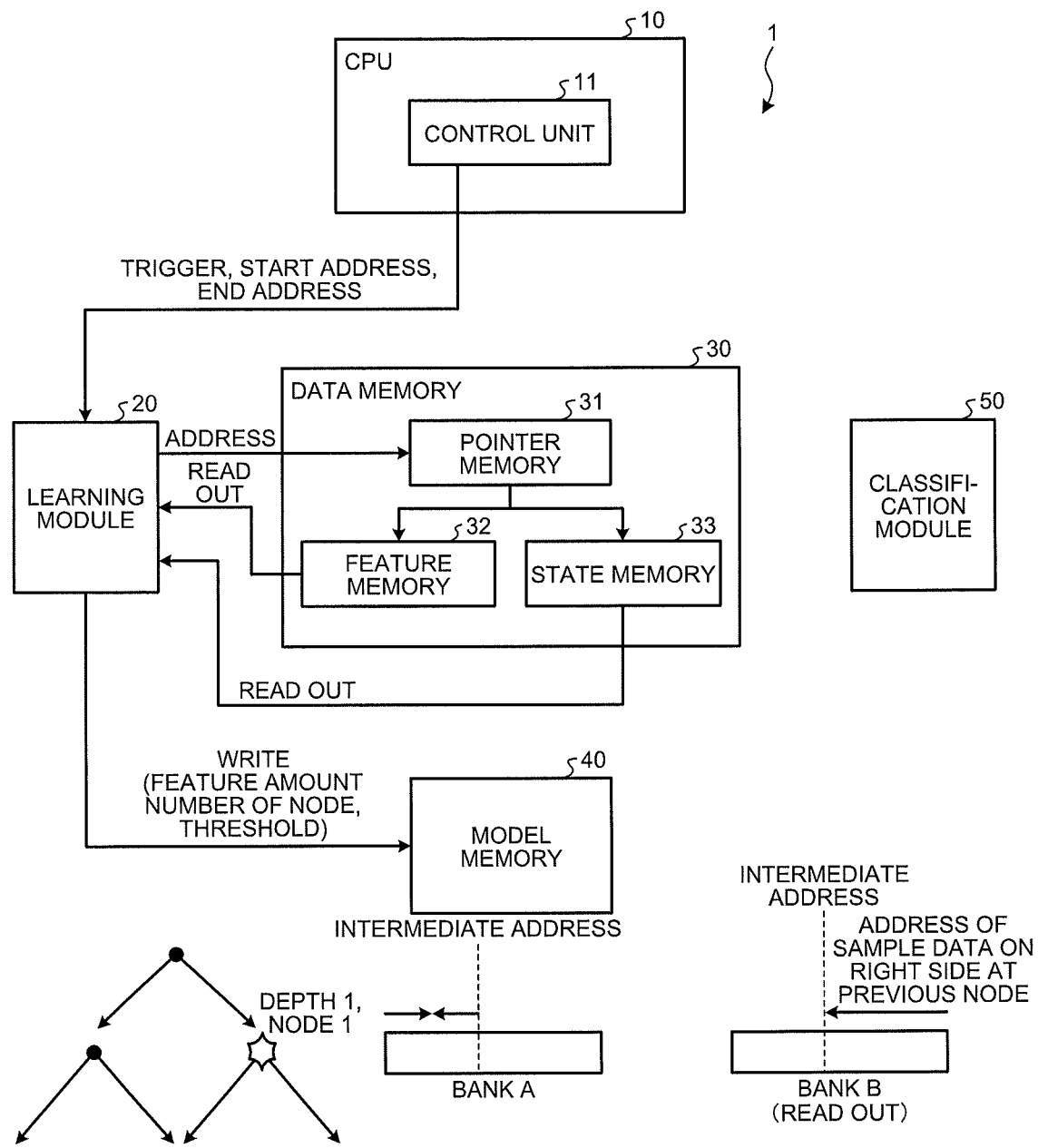
FIG. 10 is a diagram illustrating an operation of a module in a case of determining node parameters at depth 1, node 1 of the learning and discrimination device according to the first embodiment.

FIG. 10 is a diagram illustrating an operation of a module in a case of determining node parameters at depth 1, node 1 of the learning and discrimination device according to the embodiment. Similarly to the case of FIG. 8, the hierarchical level is the same as that of the node at depth 1, node 0, so that the bank B serves as the read-out bank, and the bank A serves as the writing bank (refer to FIG. 11).

As illustrated in FIG. 10, the control unit 11 transmits the start address and the end address to the learning module 20 based on the intermediate address received from the classification module 50 through the processing at depth 0, and causes the learning module 20 to start processing by a trigger. The learning module 20 designates the address of the target learning data from the pointer memory 31 (bank B) based on the start address and the end address, reads out the learning data (feature amount) from the feature memory 32 based on the address, and reads out the state information (w, g, h) from the state memory 33. Specifically, as illustrated in FIG. 10, the learning module 20 designates the addresses in order from the right side (higher address) to the intermediate address in the bank B.

In this case, as described above, each gain calculating module 21 of the learning module 20 stores each feature amount of the read-out learning data in the SRAM thereof, and calculates the branch score at each threshold. The optimum condition deriving module 22 of the learning module 20 receives an input of the branch score corresponding to each feature amount output from the gain calculating module 21, and derives a threshold and a number of the feature amount (feature amount number) the branch score of which is the largest. The optimum condition deriving module 22 then writes the derived feature amount number and threshold into the model memory 40 as the branch condition data of the corresponding node (depth 1, node 1). At this point, the optimum condition deriving module 22 sets the leaf flag to be "0" to indicate that branching is further performed from the node (depth 1, node 1), and writes the data of the node (this may be part of the branch condition data) into the model memory 40.

The learning module 20 performs the operation described above by designating the addresses in order from the right side (higher address) to the intermediate address in the bank B, and reading out each piece of the learning data from the feature memory 32 based on the addresses.

Data Branch Processing at Depth 1, Node 1

Figure 11:
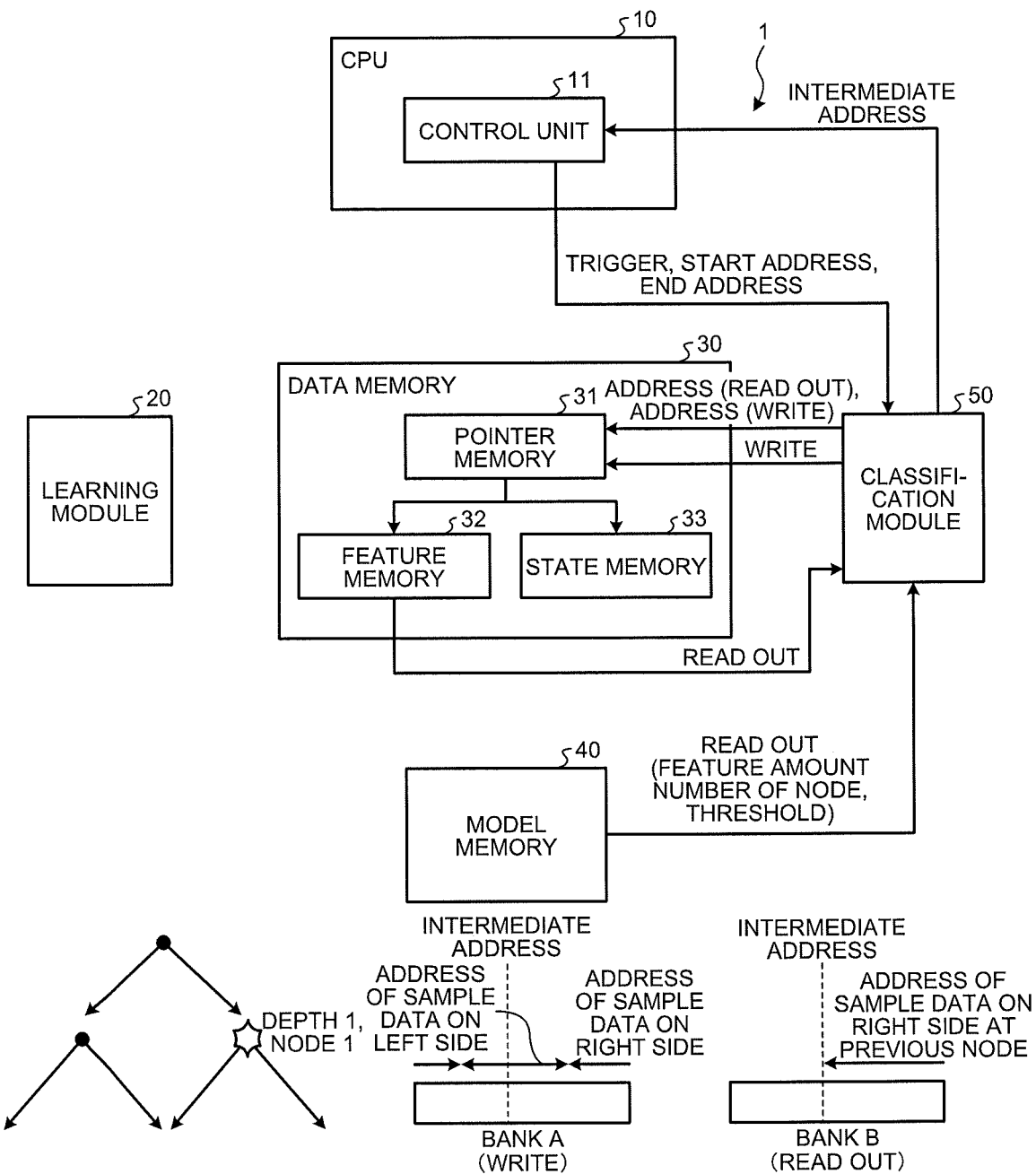
FIG. 11 is a diagram illustrating an operation of a module at the time of branching at depth 1, node 1 of the learning and discrimination device according to the first embodiment.

FIG. 11 is a diagram illustrating an operation of a module at the time of branching at depth 1, node 1 of the learning and discrimination device according to the embodiment.

As illustrated in FIG. 11, the control unit 11 transmits the start address and the end address to the classification module 50 based on the intermediate address received from the classification module 50 through the processing at depth 0, and causes the classification module 50 to start processing by a trigger. The classification module 50 designates the address of the target learning data from the right side of the pointer memory 31 (bank B) based on the start address and the end address, and reads out the learning data (feature amount) from the feature memory 32 based on the address. The classification module 50 reads out the branch condition data (the feature amount number, the threshold) of the corresponding node (depth 1, node 1) from the model memory 40. The classification module 50 then determines whether to cause the read-out sample data to branch to the left side or to the right side of the node (depth 1, node 1) in accordance with the branch condition data, and based on a determination result, the classification module 50 writes the address of the learning data in the feature memory 32 into the other bank (writing bank) (in this case, the bank A) (the bank region for writing) different from the read-out bank (in this case, the bank B) (the bank region for reading-out) of the pointer memory 31.

At this point, if it is determined that branching is performed to the left side of the node, the classification module 50 writes the address of the learning data in ascending order of the address (from the received start address, that is, the previous intermediate address) in the bank A as illustrated in FIG. 11. If it is determined that branching is performed to the right side of the node, the classification module 50 writes the address of the learning data in descending order of the address (from the received end address) in the bank A. Due to this, in the writing bank (bank A), the address of the learning data branched to the left side of the node is written as a lower address, and the address of the learning data branched to the right side of the node is written as a higher address, in a clearly separated manner. Alternatively, in the writing bank, the address of the learning data branched to the left side of the node may be written as a higher address, and the address of the learning data branched to the right side of the node may be written as a lower address, in a separated manner. In such a case, the operation in FIG. 9 is required to be performed at the same time.

As the operation described above, the classification module 50 performs branch processing on a piece of learning data designated by the address written on the right side of the intermediate address in the bank B among all the pieces of learning data. However, after the branch processing ends, the respective numbers of pieces of learning data separated to the left side and the right side of the node (depth 1, node 1) are not the same, so that the classification module 50 returns, to the control unit 11, an address (intermediate address) in the writing bank (bank A) corresponding to the middle of the addresses of the learning data branched to the left side and the addresses of the learning data branched to the right side. The intermediate address is used in the next branch processing.

Case in which Branching is not Performed at Time of Determining Branch Condition Data at Depth 1, Node 1

Figure 12:
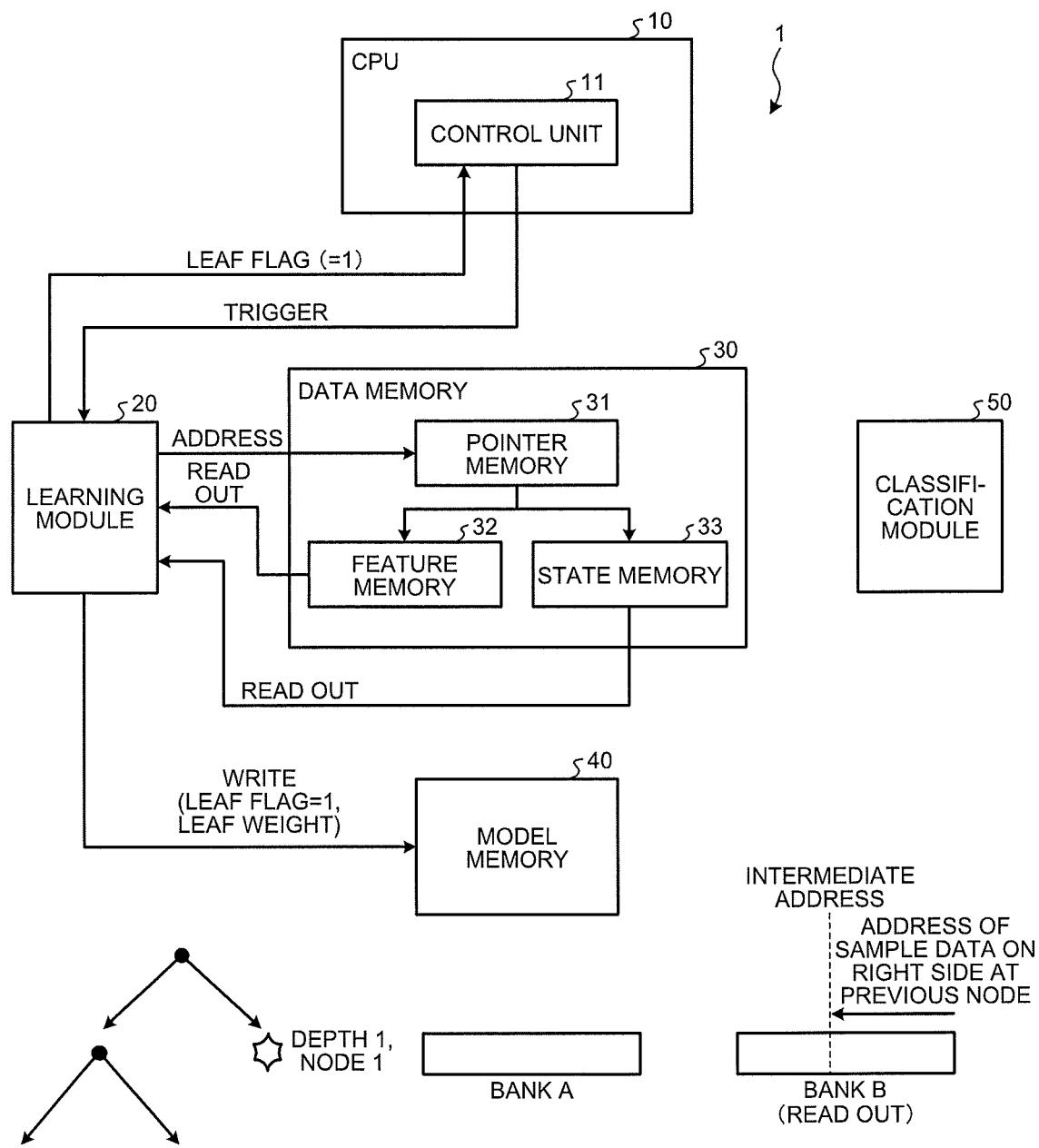
FIG. 12 is a diagram illustrating an operation of a module in a case in which branching is not performed as a result of determining node parameters at depth 1, node 1 of the learning and discrimination device according to the first embodiment.

FIG. 12 is a diagram illustrating an operation of a module in a case in which branching is not performed as a result of determining node parameters at depth 1, node 1 of the learning and discrimination device according to the embodiment. Similarly to the case of FIG. 8, the hierarchical level is the same as that of the node at depth 1, node 0, so that the bank B serves as the read-out bank.

As illustrated in FIG. 12, the control unit 11 transmits the start address and the end address to the learning module 20 based on the intermediate address received from the classification module 50 through the processing at depth 0, and causes the learning module 20 to start processing by a trigger. The learning module 20 designates the address of the target learning data from the pointer memory 31 (bank B) based on the start address and the end address, reads out the learning data (feature amount) from the feature memory 32 based on the address, and reads out the state information (w, g, h) from the state memory 33. Specifically, as illustrated in FIG. 12, the learning module 20 designates the addresses in order from the right side (higher address) to the intermediate address in the bank B.

If it is determined that branching will not be further performed from the node (depth 1, node 1) based on the calculated branch score and the like, the learning module 20 sets the leaf flag to be "1", writes the data of the node (this may be part of the branch condition data) into the model memory 40, and transmits, to the control unit 11, the fact that the leaf flag of the node is "1". Due to this, it is recognized that branching is not performed to a lower hierarchical level than the node (depth 1, node 1). In a case in which the leaf flag of the node (depth 1, node 1) is "1", the learning module 20 writes a leaf weight (w) (this may be part of the branch condition data) into the model memory 40 in place of the feature amount number and the threshold. Due to this, the capacity of the model memory 40 can be reduced as compared with a case in which capacities are secured in the model memory 40 separately.

By advancing the above processing illustrated in FIG. 6 to FIG. 12 for each hierarchical level (depth), the entire decision tree is completed (the decision tree is learned).

Case in Which Learning of Decision Tree is Completed

Figure 13:
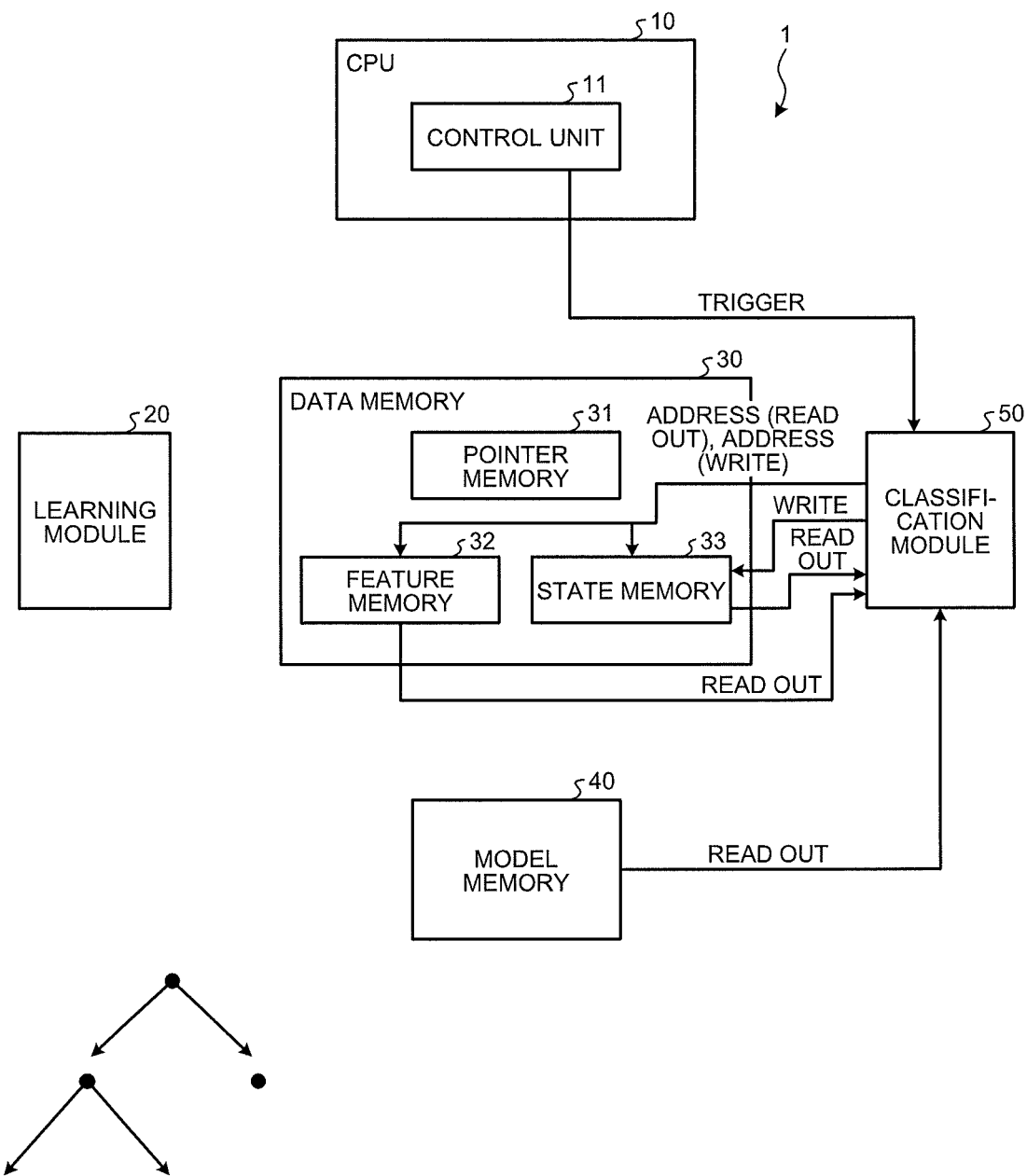
FIG. 13 is a diagram illustrating an operation of a module at the time of updating state information of all pieces of sample data in a case in which learning of a decision tree is completed by the learning and discrimination device according to the first embodiment.

FIG. 13 is a diagram illustrating an operation of a module at the time of updating the state information of all pieces of sample data in a case in which learning of the decision tree is completed by the learning and discrimination device according to the embodiment.

In a case in which learning of one decision tree constituting the GBDT is completed, a first-order gradient g and a second-order gradient h corresponding to the error function of each piece of the learning data, and the leaf weight w for each piece of the learning data need to be calculated for being used in boosting (in this case, gradient boosting) to the next decision tree. As illustrated in FIG. 13, the control unit 11 causes the classification module 50 to start calculation described above by a trigger. The classification module 50 performs processing of branch determination for nodes at all depths (hierarchical levels) on all pieces of the learning data, and calculates the leaf weight corresponding to each piece of the learning data. The classification module 50 then calculates the state information (w, g, h) for the calculated leaf weight based on the label information, and writes the state information (w, g, h) back to an original address of the state memory 33. In this way, learning of the next decision tree is performed by utilizing updated state information.

As described above, in the learning and discrimination device 1 according to the present embodiment, the learning module 20 includes memories (for example, SRAMs) for reading respective feature amounts of the input sample data. Due to this, all of the feature amounts of the sample data can be read out by one access, and each gain calculating module 21 can perform processing on all of the feature amounts at a time, so that speed of learning processing for the decision tree can be significantly improved.

In the learning and discrimination device 1 according to the present embodiment, the two banks, that is, the bank A and the bank B are configured in the pointer memory 31, and reading and writing are alternately performed. Due to this, the memory can be efficiently used. As a simplified method, there is a method of configuring each of the feature memory 32 and the state memory 33 to have two banks. However, the data indicating the address in the feature memory 32 is typically smaller than the sample data, so that the memory capacity can be further saved by a method of preparing the pointer memory 31 to indirectly designate the address as in the present embodiment. If it is determined that branching is performed to the left side of the node, the classification module 50 writes the address of the learning data in order from a lower address in the writing bank of the two banks, and if it is determined that branching is performed to the right side of the node, the classification module 50 writes the address of the learning data in order from a higher address in the writing bank. Due to this, in the writing bank, the address of the learning data branched to the left side of the node is written as a lower address, and the address of the learning data branched to the right side of the node is written as a higher address, in a clearly separated manner.

Modification

Figure 14:
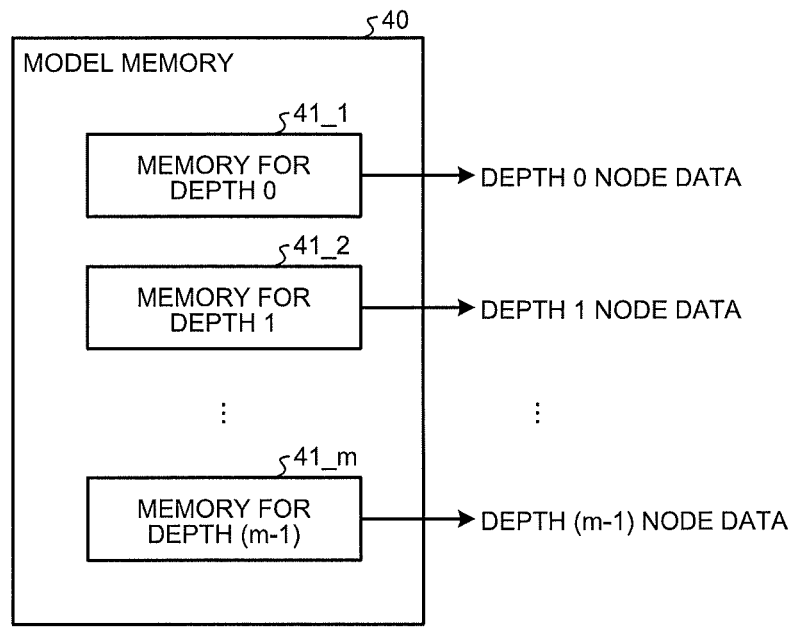
FIG. 14 is a diagram illustrating an example of a configuration of a model memory of a learning and discrimination device according to a modification of the first embodiment.

FIG. 14 is a diagram illustrating an example of a configuration of the model memory of the learning and discrimination device according to a modification. With reference to FIG. 14, the following describes a configuration in which the memory is provided for each depth (hierarchical level) of the decision tree in the model memory 40 of the learning and discrimination device 1 according to the present modification.

As illustrated in FIG. 14, the model memory 40 of the learning and discrimination device 1 according to the present modification includes a memory 41_1 for depth 0, memory 41_2 for depth 1, . . . , and a memory 41_m for depth (m−1) for storing the data (specifically, the branch condition data) for each depth (hierarchical level) of the model data of the learned decision tree. In this case, m is a number at least equal to or larger than a number of the depth (hierarchical level) of the model of the decision tree. That is, the model memory 40 includes an independent port for extracting data (depth 0 node data, depth 1 node data, . . . , depth (m−1) node data) at the same time for each depth (hierarchical level) of the model data of the learned decision tree. Due to this, the classification module 50 can read out the data (branch condition data) corresponding to the next node at all depths (hierarchical levels) in parallel based on a branch result at the first node of the decision tree, and can perform branch processing at the respective depths (hierarchical levels) at the same time in 1 clock (pipeline processing) on a piece of the sample data (discrimination data) without using a memory. Due to this, discrimination processing performed by the classification module 50 takes only time corresponding to the number of pieces of sample data, and speed of discrimination processing can be significantly improved. On the other hand, in the related art, the sample data is copied to a new memory region for each node, which affects the speed due to time for reading and writing performed by the memory, and the time required for discrimination processing is equal to (the number of pieces of sample data×the number of the depth (hierarchical level)), so that the discrimination processing according to the present modification has a great advantage as described above.

Figure 15:
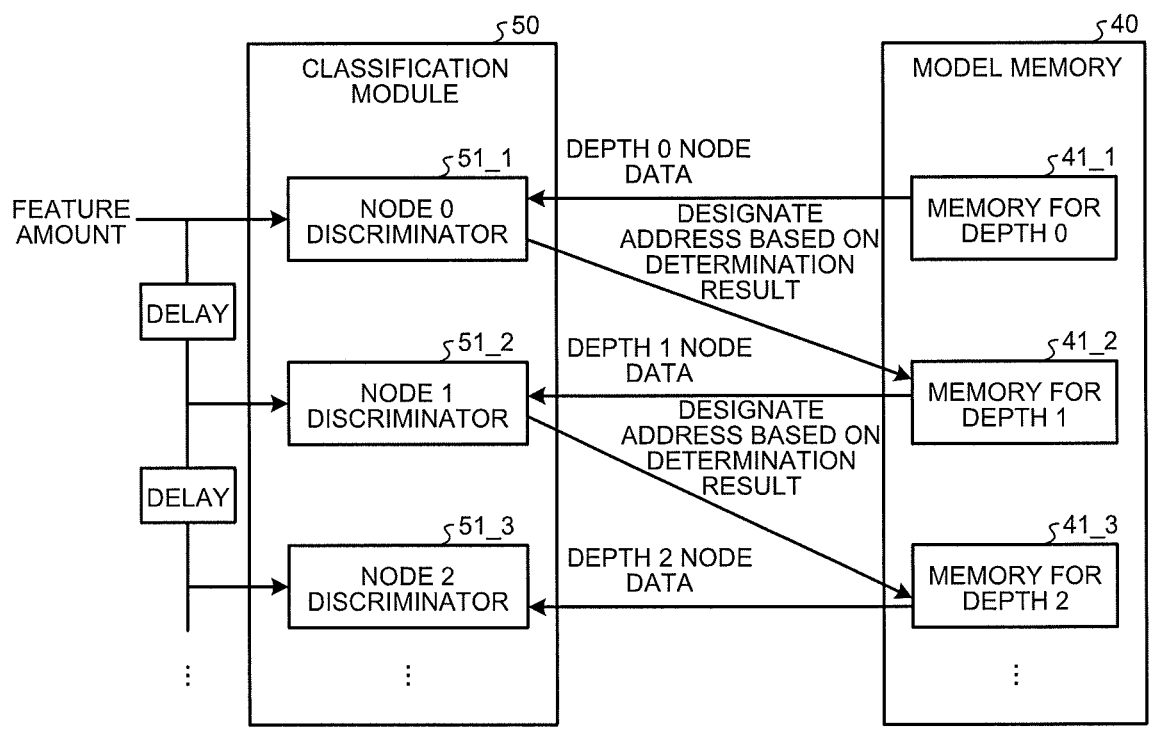
FIG. 15 is a diagram illustrating an example of a configuration of a classification module of the learning and discrimination device according to the modification of the first embodiment.

FIG. 15 is a diagram illustrating an example of a configuration of the classification module of the learning and discrimination device according to the modification. As illustrated in FIG. 15, the classification module 50 includes a node 0 discriminator 51_1, a node 1 discriminator 51_2, a node 2 discriminator 51_3, . . . . A piece of the sample data for each clock is supplied from the feature memory 32 as a feature amount. As illustrated in FIG. 15, the feature amount is input to the node 0 discriminator 51_1 first, and the node 0 discriminator 51_1 receives the data of the node (depth 0 node data) (a condition of whether to branch to the right or to the left, and the feature amount number to be used) from the corresponding memory 41_1 for depth 0 of the model memory 40. The node 0 discriminator 51_1 discriminates whether the corresponding sample data branches to the right or to the left in accordance with the condition. In this case, the latency of each memory for depth (the memory 41_1 for depth 0, the memory 41_2 for depth 1, a memory 41_3 for depth 2, . . . ) is assumed to be 1 clock. Based on the result obtained by the node 0 discriminator 51_1, whether the sample data branches to what number of node is designated by an address in the next memory 41_2 for depth 1, and the data of the corresponding node (depth 1 node data) is extracted and input to the node 1 discriminator 51_2.

The latency of the memory 41_1 for depth 0 is 1 clock, so that the feature amount is similarly input to the node 1 discriminator 51_2 with a delay of 1 clock. The feature amount of the next sample data is input to the node 0 discriminator 51_1 with the same clock. In this way, by performing discrimination through the pipeline processing, one decision tree as a whole can discriminate one piece of sample data with 1 clock on the precondition that the memories perform output at the same time for each depth. Only one address is required for the memory 41_1 for depth 0 because there is one node at depth 0, two addresses are required for the memory 41_2 for depth 1 because there are two nodes at depth 1, similarly, four addresses are required for the memory 41_3 for depth 2, and eight addresses are required for a memory for depth 3 (not illustrated). Although the classification module 50 discriminates the entire tree, learning may be performed using only the node 0 discriminator 51_1 at the time of learning the node to reduce a circuit scale by using the same circuit.

Second Embodiment

The following describes the learning and discrimination device according to a second embodiment, mainly about differences from the learning and discrimination device 1 according to the first embodiment. The first embodiment describes the learning processing and the discrimination processing by the GBDT assuming that there is one data memory 30 in which the sample data is stored. The present embodiment describes an operation of performing learning processing by dividing the data memory into a plurality of parts to implement Data Parallel for processing a plurality of pieces of sample data in parallel.

Regarding Data Parallel

Figure 16:
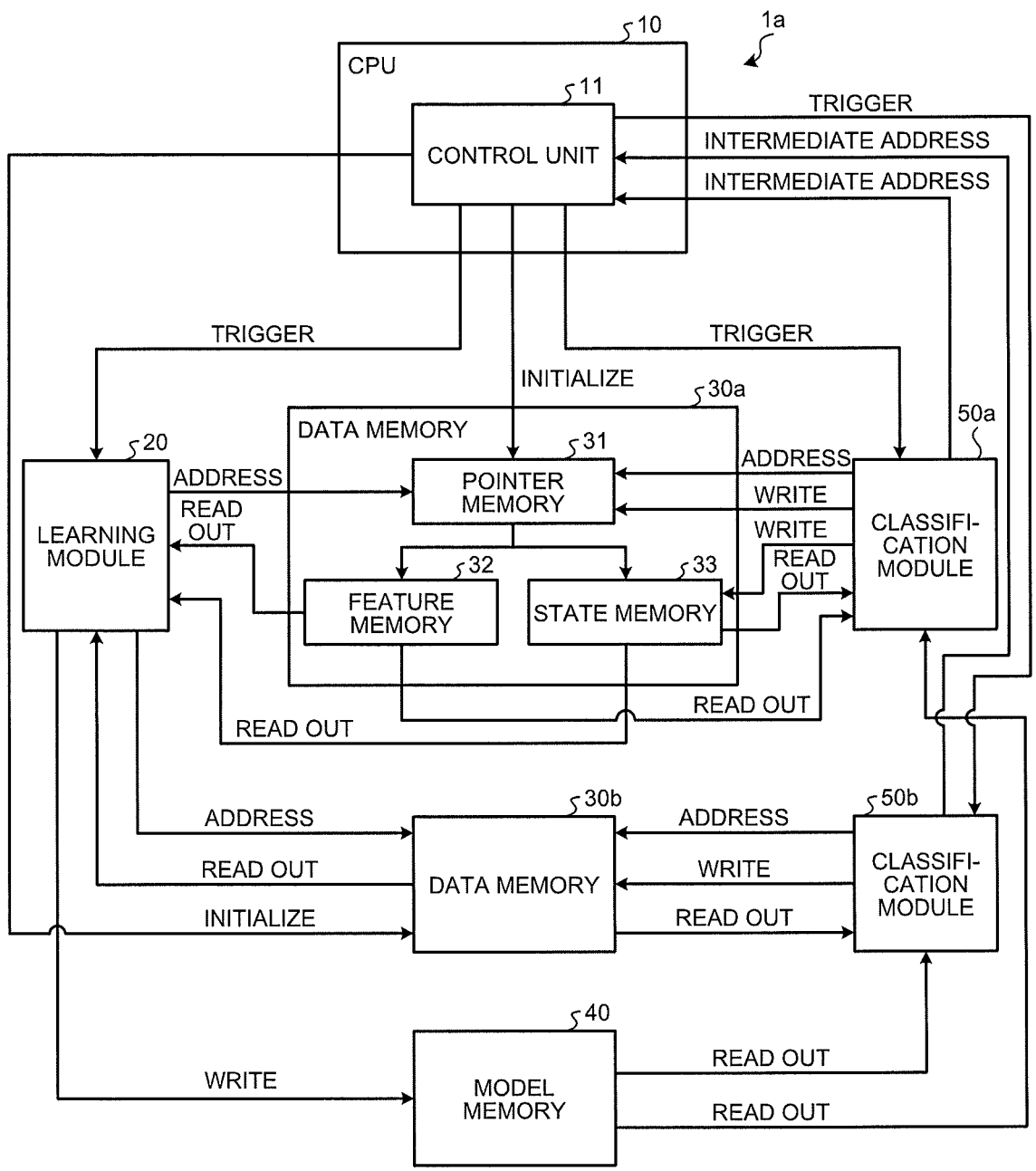
FIG. 16 is a diagram illustrating an example of a module configuration of the learning and discrimination device to which Data Parallel is applied.

FIG. 16 is a diagram illustrating an example of a module configuration of the learning and discrimination device to which Data Parallel is applied. With reference to FIG. 16, the following describes a configuration of a learning and discrimination device 1a as an example of a configuration for implementing Data Parallel.

To implement Data Parallel for the sample data (the learning data or the discrimination data), first, the data memory may be divided into two data memories 30a and 30b to hold divided pieces of sample data as illustrated in FIG. 16. Although not illustrated in the data memory 30b of FIG. 16, the data memory 30b also includes the pointer memory 31, the feature memory 32, and the state memory 33 similarly to the data memory 30a. However, it is not sufficient to simply dividing the memory that holds the sample data, and a mechanism for performing processing (learning processing, discrimination processing, and the like) on the divided pieces of sample data in parallel is required. In the configuration example illustrated in FIG. 16, the number of arranged modules that perform discrimination processing is the same as that of the divided data memories. That is, the learning and discrimination device 1a includes classification modules 50a and 50b for performing discrimination processing on respective pieces of sample data stored in the two data memories 30a and 30b in parallel. Focusing on each individual module, assuming that processing is performed by Feature Parallel, the configuration of the module is changed little for implementing Data Parallel as described above, so that implementation thereof is facilitated.

Data parallel for increasing speed of learning processing, that is, processing performed by the learning module 20 has a problem such that the circuit scale is increased because the data memory is divided into the two data memories 30a and 30b for holding divided pieces of sample data, and the memory that holds the histogram (hereinafter, also referred to as a "gradient histogram" in some cases) of the feature amount calculated in a process of the learning processing and the gradient information (refer to the expression (11) described above) is increased in proportion to the number of division of the data memory as described above.

Method of Calculating Branch Score Using Gradient Histogram

First, the following describes a method of calculating the branch score by the learning module 20. In this case, the feature amount of the sample data (in this case, the learning data) is assumed to be quantized to have a certain bit width. For example, in a case in which the feature amount is 8 bits (values of 256 patterns) and the number of dimensions of the feature amount is 100, the learning module 20 calculates branch scores of 256×100=25600 patterns. In this case, the number of candidates of the threshold is 256.

To calculate the branch score corresponding to a certain branch condition (one threshold corresponding to one feature amount), it is required to obtain the sum of the gradient information of the learning data having the feature amount equal to or larger than the threshold (corresponding to $G_R$ and $H_R$ in the expression (19) described above), and the sum of the gradient information of the learning data having the feature amount smaller than the threshold (corresponding to $G_L$ and $H_L$ in the expression (19) described above) from the learning data at the present node. In this case, as represented by the following (Table 1), the following specifically describes a case in which the number of pieces of the learning data is 4, the number of dimensions of the feature amount is 1 and values thereof are 3 patterns, and the gradient information is the first-order gradient g.

TABLE 1

| Sample data number | Feature amount | g |
| --- | --- | --- |
| 1 | 0 | 0.1 |
| 2 | 1 | 0.2 |
| 3 | 1 | 0.1 |
| 4 | 2 | −0.3 |

As represented by (Table 1), there are 3 patterns of feature amounts, that is, 0, 1, and 2, so that thresholds are also 0, 1, and 2, the sum of the gradient information at each threshold is a value represented by the following (Table 2), and the branch score corresponding to each of the thresholds of 3 patterns is calculated.

TABLE 2

| Threshold | $G_L$ | $G_R$ |
| --- | --- | --- |
| 0 | 0 | 0.1 + 0.2 + 0.1 − 0.3 = 0.1 |
| 1 | 0.1 | 0.2 + 0.1 − 0.3 = 0 |
| 2 | 0.1 + 0.2 + 0.1 = 0.4 | −0.3 |

To obtain the sum of the gradient information for a specific threshold, it is required to refer to all pieces of the learning data at the present node. If this processing should be performed for all thresholds every time, it takes very long processing time. For example, in a case in which the feature amount is 8 bits (256 patterns), there are also 256 patterns of thresholds, so that the sum of the gradient information needs to be obtained (the number of pieces of learning data at the present node×256) times. It takes very long processing time, so that calculation processing of the branch score is simplified by obtaining the sum of the gradient information for each value of the feature amount (gradient histogram) and the sum total of the gradient information in advance, and taking a cumulative sum of the gradient histogram.

In a case of the sample data represented by (Table 1) described above, the sum of the gradient information for each value of the feature amount (gradient histogram) becomes a value represented by the following (Table 3).

TABLE 3

| Feature amount | Gradient histogram |
| --- | --- |
| 0 | 0.1 |
| 1 | 0.2 + 0.1 = 0.3 |
| 2 | −0.3 |

The sum total of the gradient information for each value of the feature amount is 0.1+0.2+0.1−0.3=0.1. In this case, the sum $G_L$ of the gradient information is obtained by obtaining the cumulative sum of the gradient histogram, $G_R$ of the gradient information is obtained by subtracting the sum $G_L$ of the gradient information from the sum total of the gradient information, and the sums $G_L$ and $G_R$ of the gradient information for each threshold becomes values represented by the following (Table 4).

TABLE 4

| Threshold | $G_L$ (Cumulative sum of gradient histogram) | $G_R$ (Sum total − $G_L$) |
| --- | --- | --- |
| 0 | 0 | 0.1 |
| 1 | 0.1 | 0 |
| 2 | 0.1 + 0.3 = 0.4 | −0.3 |

Figure 17:
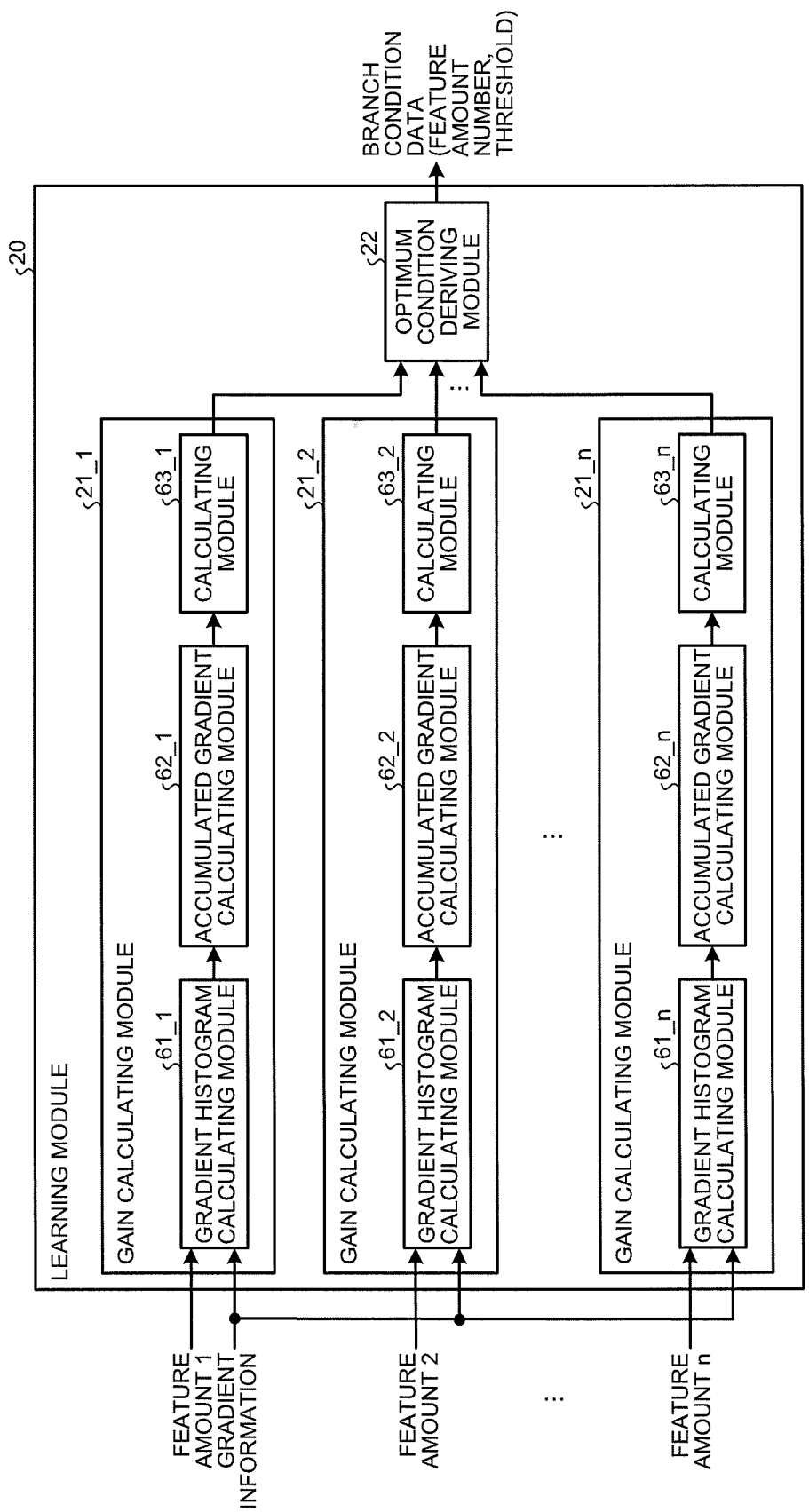
FIG. 17 is a diagram illustrating an example of a specific module configuration of a learning module.

With this method, it is sufficient to refer to the learning data at the present node per one time, and thereafter, the branch scores for all branch conditions can be obtained by referring to gradient histograms corresponding to the number of thresholds. In a case in which the feature amount is 8 bits (256 patterns), it is sufficient to perform processing (the number of pieces of learning data at the present node+ 256) times. The above case is a case in which the feature amount has one dimension, but even when the feature amount has two or more dimensions, the same processing can be calculated in parallel by obtaining the gradient histogram for each dimension of the feature amount. The following describes a configuration and an operation for calculating the gradient histogram and obtaining the branch condition data by the learning module 20 illustrated in FIG. 17 the configuration of which is illustrated in more detail based on FIG. 4 illustrating the configuration of the learning module 20 that performs learning by Feature Parallel in the first embodiment, and further describes a configuration and an operation in a case of using a Data Parallel configuration.
Configuration Example of Learning Module for Obtaining Branch Condition Data Using Gradient Histogram FIG. 17 is a diagram illustrating an example of a specific module configuration of the learning module. With reference to FIG. 17, the following describes a configuration and an operation of the learning module 20 representing the configuration illustrated in FIG. 4 described above in more detail.

The learning module 20 illustrated in FIG. 17 includes the gain calculating modules 21_1, 21_2, . . . , and 21_n, and the optimum condition deriving module 22. In this case, n is a number at least equal to or larger than the number of types of the feature amounts of the sample data (in this case, the learning data). In a case of indicating an optional gain calculating module among the gain calculating modules 21_1, 21_2, . . . , and 21_n, or a case in which the gain calculating modules 21_1, 21_2, . . . , and 21_n are collectively called, they are simply referred to as the "gain calculating module 21".

Each of the gain calculating modules 21_1 to 21_1n is a module that calculates the branch score at each threshold using the expression (19) described above for a corresponding feature amount among the feature amounts included in the sample data to be input. The gain calculating module 21_1 includes a gradient histogram calculating module 61_1, an accumulated gradient calculating module 62_1, and a calculating module 63_1.

The gradient histogram calculating module 61_1 is a module that calculates, using each value of the feature amount of the input sample data as a bin of the histogram, the gradient histogram by integrating values of the gradient information corresponding to the sample data.

The accumulated gradient calculating module 62_1 is a module that calculates the sums of the gradient information ($G_L$, $G_R$, $H_L$, $H_R$) by obtaining the cumulative sum of the gradient histogram for each threshold of the feature amount.

The calculating module 63_1 is a module that calculates the branch score at each threshold using the expression (19) described above and using the sum of the gradient information calculated by the accumulated gradient calculating module 62_1.

Similarly, the gain calculating module 21_2 includes a gradient histogram calculating module 61_2, an accumulated gradient calculating module 62_2, and a calculating module 63_2, and the same applies to the gain calculating module 21_n. In a case of indicating an optional gradient histogram calculating module among the gradient histogram calculating modules 61_1, 61_2, . . . , and 61_n, or a case in which the gradient histogram calculating modules 61_1, 61_2, . . . , and 61_n are collectively called, they are simply referred to as a "gradient histogram calculating module 61". In a case of indicating an optional accumulated gradient calculating module among the accumulated gradient calculating modules 62_1, 62_2, . . . , and 62_n, or a case in which the accumulated gradient calculating modules 62_1, 62_2, . . . , and 62_n are collectively called, they are simply referred to as an "accumulated gradient calculating module 62". In a case of indicating an optional calculating module among the calculating modules 63_1, 63_2, . . . , and 63_n, or a case in which the calculating modules 63_1, 63_2, and 63_n are collectively called, they are simply referred to as a "calculating module 63".

The optimum condition deriving module 22 is a module that receives an input of the branch score corresponding to each threshold and each feature amount output from the respective gain calculating modules 21, and derives a threshold and a number of the feature amount (feature amount number) the branch score of which is the largest. The optimum condition deriving module 22 writes the derived feature amount number and threshold into the model memory 40 as the branch condition data (an example of data of the node) of a corresponding node.

Configuration and Operation of Gradient Histogram Calculating Module

Figure 18:
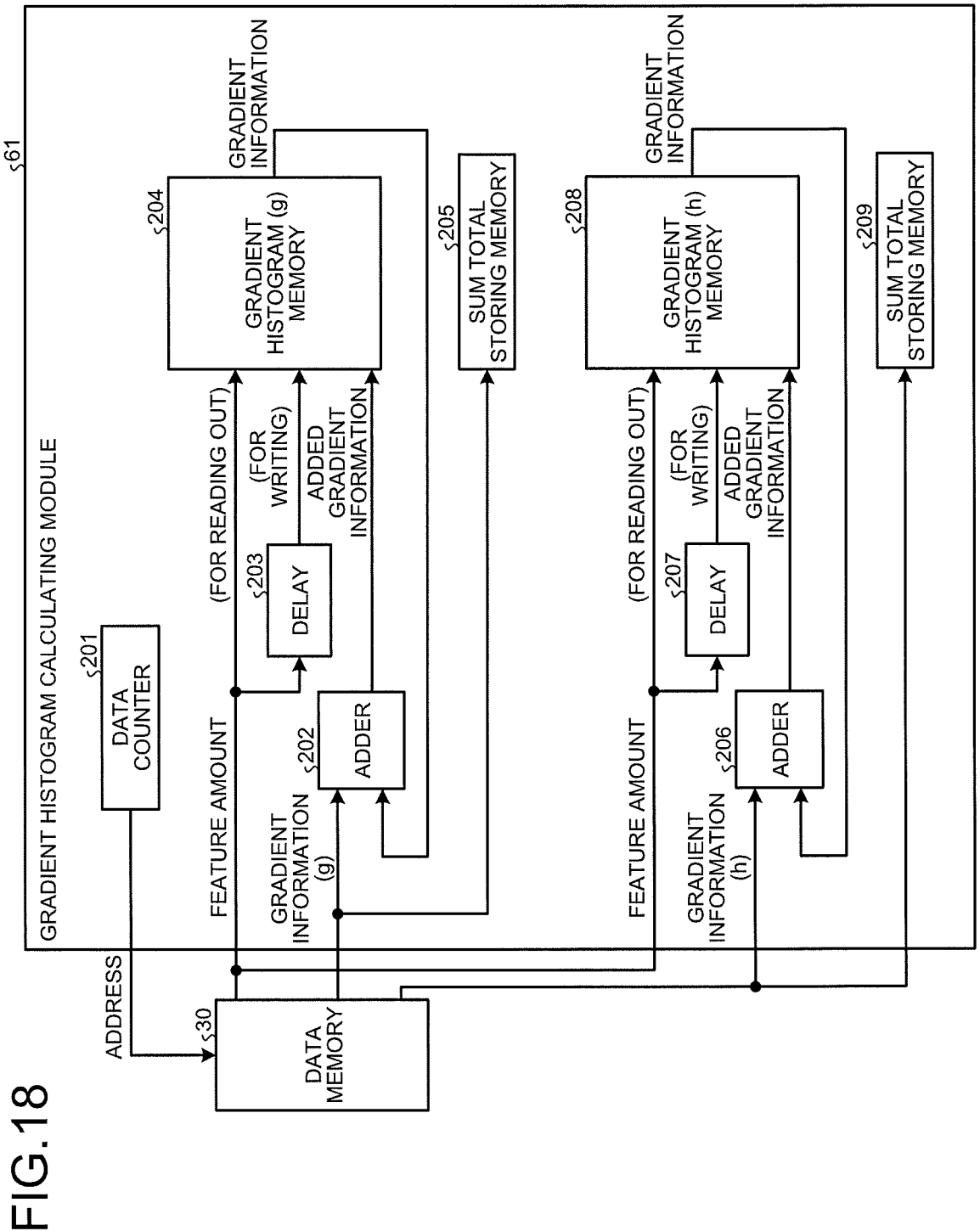
FIG. 18 is a diagram illustrating an example of a module configuration of a gradient histogram calculating module of the learning module.

FIG. 18 is a diagram illustrating an example of a module configuration of the gradient histogram calculating module of the learning module. With reference to FIG. 18, the following describes a configuration and an operation of the gradient histogram calculating module 61 in the learning module 20. FIG. 18 illustrates a case in which the feature amount is assumed to have one dimension, and the gradient information is assumed to include the first-order gradient g and the second-order gradient h, which may be simply referred to as gradient information g and gradient information h in some cases.

As illustrated in FIG. 18, the gradient histogram calculating module 61 includes a data counter 201, an adder 202, a delay 203, a gradient histogram memory 204, a sum total storing memory 205, an adder 206, a delay 207, a gradient histogram memory 208, and a sum total storing memory 209.

The data counter 201 outputs an address for reading out, from the data memory 30, the sample data (feature amount) to be subjected to learning processing and corresponding pieces of gradient information g and h.

The adder 202 adds added gradient information g read out from the gradient histogram memory 204 to the gradient information g that is newly read out from the data memory 30.

The delay 203 outputs the feature amount read out from the data memory 30 with delay to be matched with a timing of writing the gradient information g added by the adder 202 into the gradient histogram memory 204.

The gradient histogram memory 204 is a memory that successively stores the added gradient information g using the value of the feature amount as an address, and stores the gradient histogram for each value (bin) of the feature amount in the end.

The sum total storing memory 205 is a memory that stores the sum total of the gradient information g read out from the data memory 30.

The adder 206 adds the added gradient information h read out from the gradient histogram memory 208 to the gradient information h that is newly read out from the data memory 30.

The delay 207 outputs the feature amount read out from the data memory 30 with delay to be matched with a timing of writing the gradient information h added by the adder 206 into the gradient histogram memory 208.

The gradient histogram memory 208 is a memory that successively stores the added gradient information h using the value of the feature amount as an address, and stores the gradient histogram for each value (bin) of the feature amount in the end.

The sum total storing memory 209 is a memory that stores the sum total of the gradient information h read out from the data memory 30.

The following simply describes an operation procedure of calculating the gradient histogram of the gradient histogram calculating module 61. First, the gradient histogram calculating module 61 reads out a piece of learning data (the feature amount, the gradient information) of the present node stored in the data memory 30 using an address output from the data counter 201. The adder 202 reads out the gradient information g (added gradient information g) from the gradient histogram memory 204 using the feature amount read out from the data memory 30 as an address. The adder 202 then adds the gradient information g (added gradient information g) read out from the gradient histogram memory 204 to the gradient information g read out from the data memory 30, and writes (updates) the added gradient information g into the gradient histogram memory 204 using the feature amount read out from the data memory 30 as an address. The sum total storing memory 205 adds up pieces of the gradient information g each time the gradient information g is read out from the data memory 30, and stores the sum total of the gradient information g. The same applies to processing on the gradient information h performed by the adder 206, the delay 207, the gradient histogram memory 208, and the sum total storing memory 209. The above operation is repeatedly performed on all the pieces of learning data at the present node.

Configuration and Operation of Accumulated Gradient Calculating Module

Figure 19:
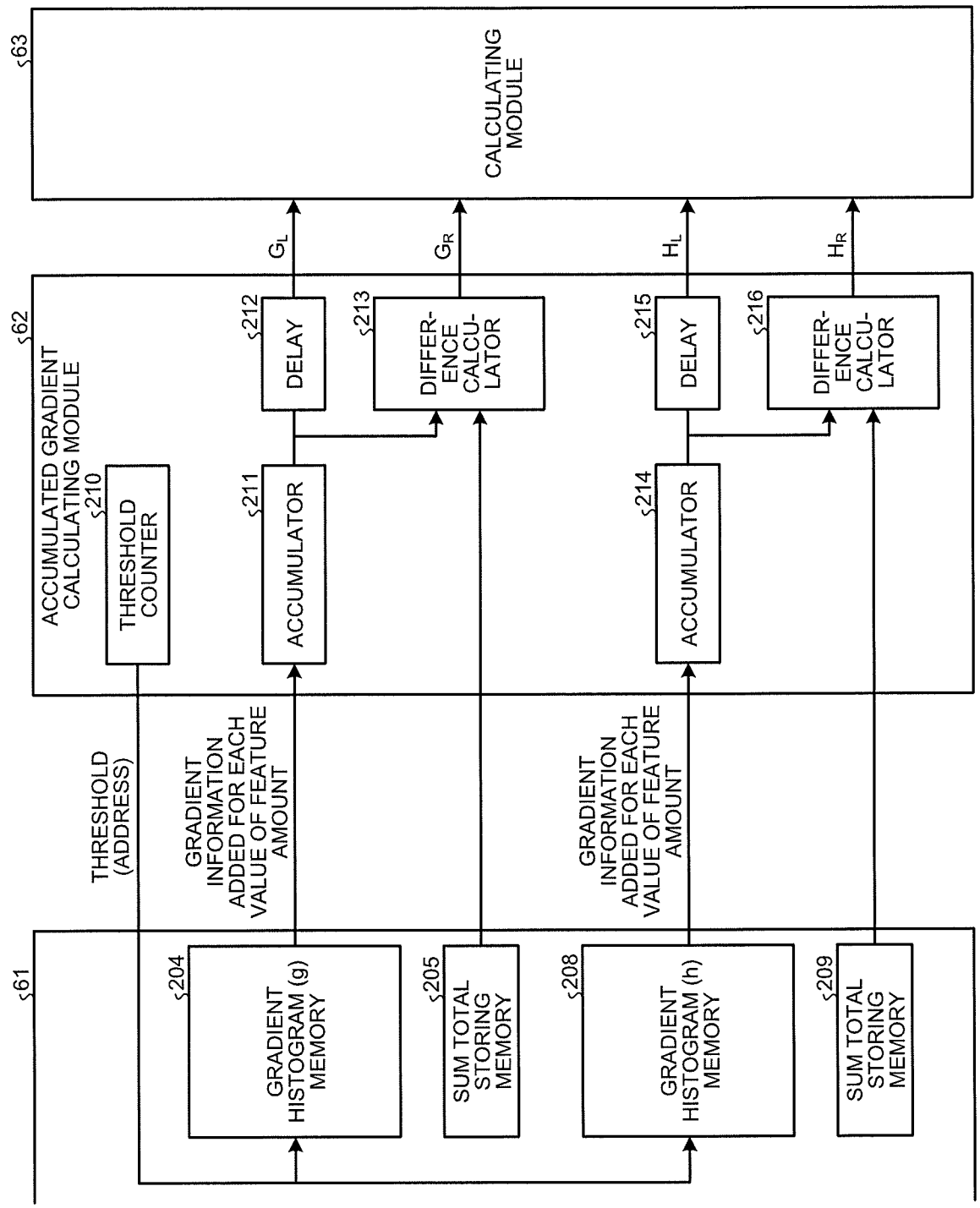
FIG. 19 is a diagram illustrating an example of a module configuration of an accumulated gradient calculating module of the learning module.

FIG. 19 is a diagram illustrating an example of a module configuration of the accumulated gradient calculating module of the learning module. With reference to FIG. 19, the following describes a configuration and an operation of the accumulated gradient calculating module 62 in the learning module 20. FIG. 19 illustrates a case in which the feature amount is assumed to have one dimension, and the gradient information is assumed to include the first-order gradient g and the second-order gradient h.

As illustrated in FIG. 19, the accumulated gradient calculating module 62 includes a threshold counter 210, an accumulator 211, a delay 212, a difference calculator 213, an accumulator 214, a delay 215, and a difference calculator 216.

The threshold counter 210 outputs a threshold to be an address for reading out, from the gradient histogram memories 204 and 208, the gradient information (g, h) added for each value of the feature amount, that is, the gradient histogram of each value of the feature amount.

The accumulator 211 reads out, from the gradient histogram memory 204, the gradient histogram of the gradient information g corresponding to the threshold (address) output from the threshold counter 210, further accumulates the gradient histogram on the cumulative sum of the gradient histogram that is presently stored, and hold it as a new cumulative sum of the gradient histogram.

The delay 212 outputs, as the sum $G_T$ of the gradient information g, the cumulative sum of the gradient histogram of the gradient information g read out from the accumulator 211 with delay to be matched with a timing at which the sum $G_R$ of the gradient information g is output from the difference calculator 213.

The difference calculator 213 calculates the sum $G_R$ of the gradient information g by subtracting, from the sum total of the gradient information g read out from the sum total storing memory 205, the cumulative sum of the gradient histogram of the gradient information g (that is, the sum $G_L$ of the gradient information g) read out from the accumulator 211.

The accumulator 214 reads out, from the gradient histogram memory 208, the gradient histogram of the gradient information h corresponding to the threshold (address) output from the threshold counter 210, further accumulates the gradient histogram on the cumulative sum of gradient histogram that is presently stored, and hold it as a new cumulative sum of the gradient histogram.

The delay 215 outputs, as the sum $H_L$ of the gradient information h, the cumulative sum of the gradient histogram of the gradient information h read out from the accumulator 214 with delay to be matched with a timing at which the sum $H_R$ of the gradient information h is output from the difference calculator 216.

The difference calculator 216 calculates the sum $H_R$ of the gradient information h by subtracting, from the sum total of the gradient information h read out from the sum total storing memory 209, the cumulative sum of the gradient histogram of the gradient information h (that is, the sum $H_L$ of the gradient information h) read out from the accumulator 214.

The following simply describes an operation procedure of calculating the sums ($G_L$, $G_R$, $H_L$, $H_R$) of the gradient information performed by the accumulated gradient calculating module 62. The accumulated gradient calculating module 62 starts calculation processing after the gradient histogram calculating module 61 ends an operation of calculation and storage processing for the gradient histogram of the gradient information. That is, after the gradient histogram calculating module 61 ends the calculation processing, each of the gradient histogram memories 204 and 208 holds the gradient histograms of the pieces of gradient information g and h calculated from all the pieces of learning data at the present node.

First, the accumulated gradient calculating module 62 reads out the gradient histogram of the gradient information g stored in the gradient histogram memory 204 using the threshold as an address output from the threshold counter 210. The accumulator 211 reads out, from the gradient histogram memory 204, the gradient histogram of the gradient information g corresponding to the threshold output from the threshold counter 210, accumulates the gradient histogram on the cumulative sum of the gradient histogram that is presently stored, and hold it as a new cumulative sum of the gradient histogram. The difference calculator 213 calculates the sum $G_R$ of the gradient information g by subtracting, from the sum total of the gradient information g read out from the sum total storing memory 205, the cumulative sum of the gradient histogram of the gradient information g (that is, the sum $G_L$ of the gradient information g) read out from the accumulator 211, and outputs the sum $G_R$ to the calculating module 63. The delay 212 outputs, to the calculating module 63, the cumulative sum of the gradient histogram of the gradient information g (that is, the sum $G_L$ of the gradient information g) read out from the accumulator 211 at a timing of output by the difference calculator 213. The same applies to processing on the gradient information h (processing of calculating the sums $H_L$ and $H_R$ of the gradient information h) performed by the accumulator 214, the delay 215, and the difference calculator 216. The above operation is repeatedly performed on all of the thresholds, and this is implemented when the threshold counter 210 sequentially counts up the thresholds to be output in a round.

Figure 20:
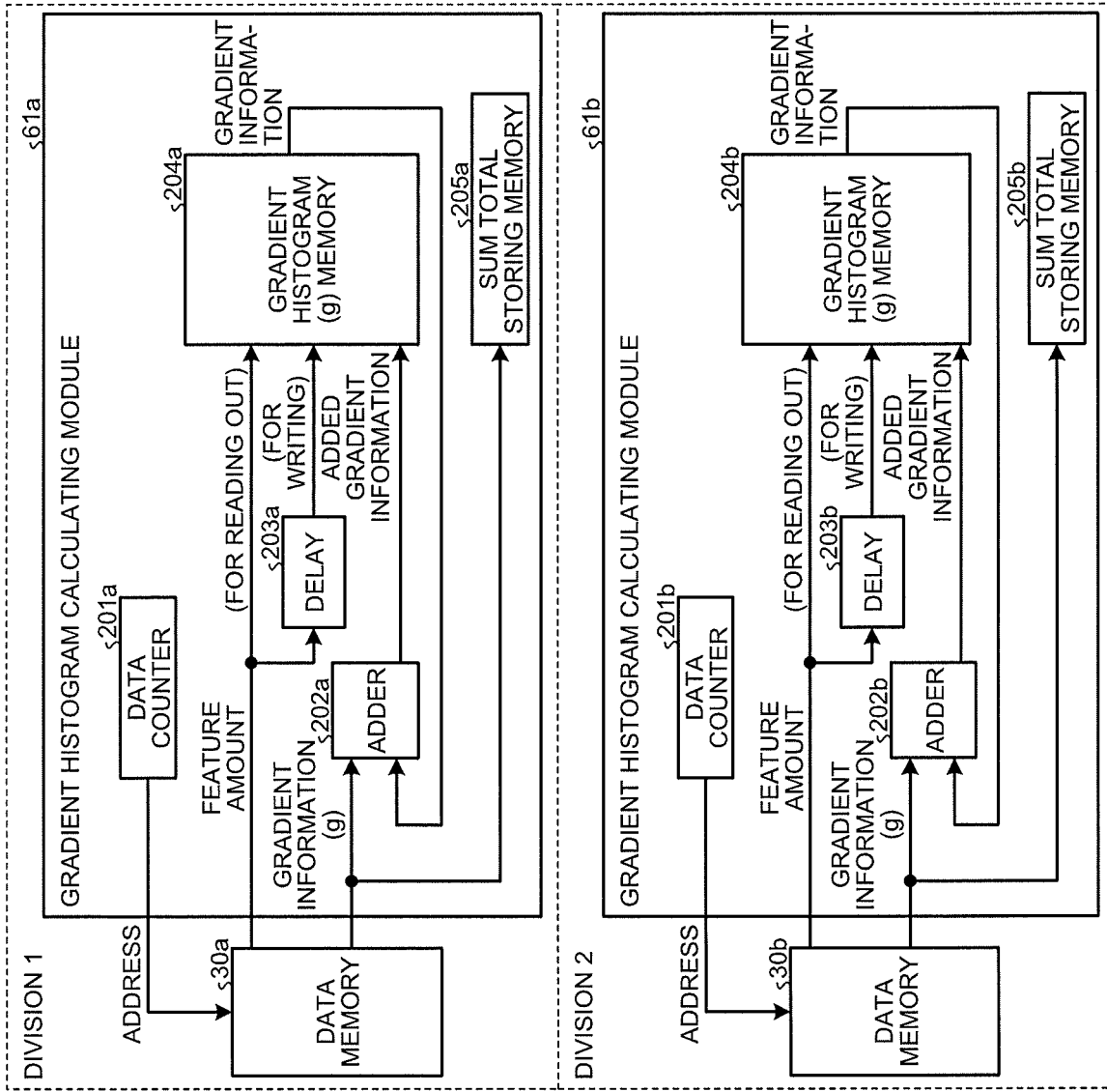
FIG. 20 is a diagram illustrating an example of a module configuration of the gradient histogram calculating module in a case in which Data Parallel is implemented.

Gradient Histogram Calculating Module in Case in Which Data Parallel is Implemented FIG. 20 is a diagram illustrating an example of a module configuration of the gradient histogram calculating module in a case in which Data Parallel is implemented. With reference to FIG. 20, the following describes a configuration and an operation of the gradient histogram calculating module 61 in a case in which Data Parallel is implemented. FIG. 20 illustrates a case in which the number of division for Data Parallel is assumed to be 2, the feature amount is assumed to have one dimension, and the gradient information is assumed to include only the first-order gradient g.

As illustrated in FIG. 20, to implement Data Parallel the number of division of which is 2, the data memories 30a and 30b as divided memories are configured in place of the data memory 30 illustrated in FIG. 18, and gradient histogram calculating modules 61a and 61b are configured in place of the gradient histogram calculating module 61.

As illustrated in FIG. 20, the gradient histogram calculating module 61a includes a data counter 201a, an adder 202a, a delay 203a, a gradient histogram memory 204a, and a sum total storing memory 205a. The gradient histogram calculating module 61b includes a data counter 201b, an adder 202b, a delay 203b, a gradient histogram memory 204b, and a sum total storing memory 205b. Functions of the data counters 201a and 201b, the adders 202a and 202b, the delays 203a and 203b, the gradient histogram memories 204a and 204b, and the sum total storing memories 205a and 205b are the same as the respective functions described above with reference to FIG. 18.

In a case of simply configuring Data Parallel, as illustrated in FIG. 20, the number of the gradient histogram calculating modules 61 to be arranged may be the same as the number of division similarly to the data memories 30. In this case, the number of the gradient histogram memories is equal to (the dimensions of the feature amount×the number of division). In the example illustrated in FIG. 20, the feature amount has one dimension and the number of division is 2, so that the two gradient histogram memories 204a and 204b are arranged. Additionally, in a case of considering the respective gradient histogram memories for the first-order gradient g and the second-order gradient h as the gradient information, required total capacity of the gradient histogram memory is equal to (capacity of one memory (the number of bins×bit width)×2 (the first-order gradient g, the second-order gradient h)×the dimensions of the feature amount×the number of division). In a large-scale data set, the number of dimensions of the feature amount may be several hundreds to several thousands in many cases, and a large number of memories are required when the number of division is increased. Accordingly, the capacity of the memories becomes a bottleneck, and a circuit scale is increased. For example, in a case in which the feature amount is 8 bits (256 patterns) and has 2000 dimensions, the gradient information includes two gradients, that is, the first-order gradient g and the second-order gradient h, and the bit width of the gradient histogram is 12 bits, 12 [bits]×256=3072 [bits] is established, so that the memory capacity of one gradient histogram memory is required to satisfy 3072 bit. The memory is typically prepared based on a power of 2, so that, in this case, the memory capacity is 4096 bits (4 kbits). Thus, in a case of one division (no division), the total capacity of the gradient histogram memory is represented as follows.

4 [kbits]×2 (the first-order gradient g, the second-order gradient h)×2000 [dimensions]=16 [Mbits]

That is, the memory capacity of 16 Mbits is required per one division (no division), and in a case of dividing the memory, the memory capacity of (the number of division× 16 Mbits) is required.

For example, the following considers a case of a chip called virtex UltrScale+ VU9P manufactured by Xilinx Inc. as a high-end FPGA. Circuits that can be used for the gradient histogram memory include a distributed RAM and a block RAM. In VU9P, the distributed RAM is 36.1 Mbits at the maximum, and the block RAM is 75.9 Mbits at the maximum. Thus, two-division is a limit in a case of using the distributed RAM as the gradient histogram memory, and four-division is a limit in a case of using the block RAM.

The distributed RAM and the block RAM need to be used for purposes other than a purpose of holding the gradient histogram, so that an upper limit of the number of division is smaller than the number described above. Accordingly, in a case in which the set of the feature amount and the gradient information is input in parallel, a configuration that can calculate and store the gradient histogram with a smaller-scale circuit is required as compared with the configuration of the learning module 20 described above with reference to FIG. 17 to FIG. 20. The following describes a configuration and an operation of the learning module according to the present embodiment with reference to FIG. 21 to FIG. 26.

Configuration of Learning Module According to Second Embodiment

Figure 21:
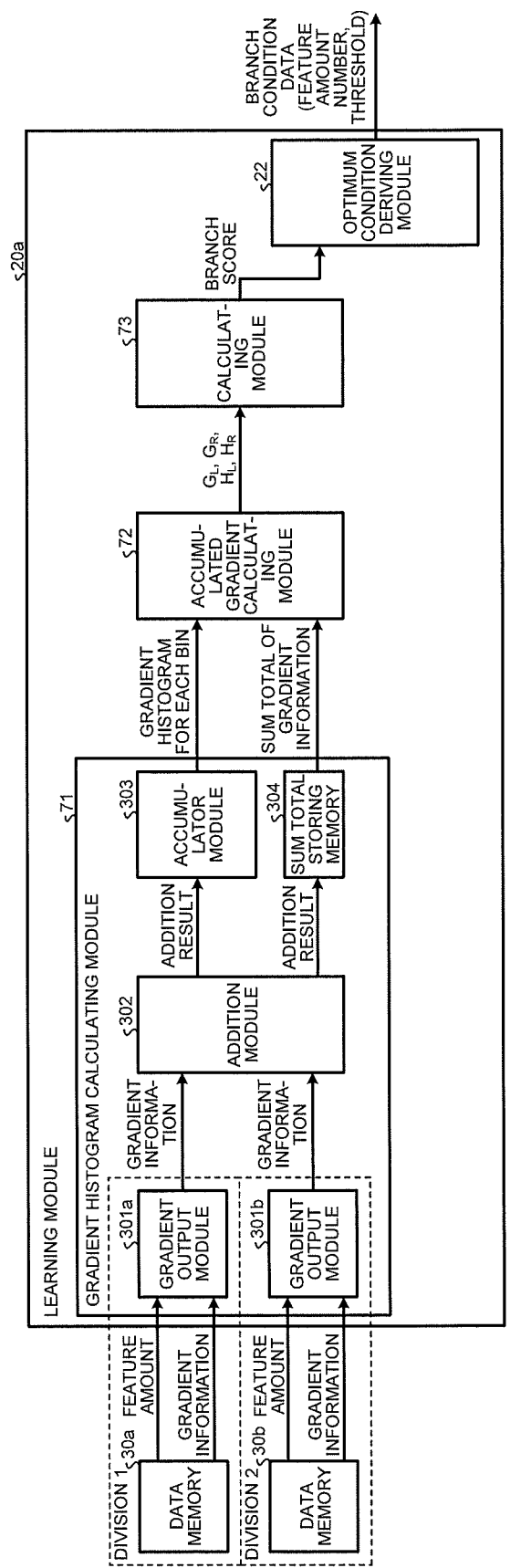
FIG. 21 is a diagram illustrating an example of a module configuration of a learning module of a learning and discrimination device according to a second embodiment.

FIG. 21 is a diagram illustrating an example of a module configuration of the learning module of the learning and discrimination device according to the second embodiment. With reference to FIG. 21, the following describes a configuration and an operation of a learning module 20a of the learning and discrimination device (an example of a learning device) according to the present embodiment. In FIG. 21, the number of division for Data Parallel is assumed to be 2, and the feature amount is assumed to have one dimension.

As illustrated in FIG. 21, the learning module 20a according to the present embodiment includes a gradient histogram calculating module 71, an accumulated gradient calculating module 72 (accumulated gradient calculator), a calculating module 73 (score calculator), and the optimum condition deriving module 22.

The gradient histogram calculating module 71 is a module that calculates, using each value of the feature amount of the input sample data as a bin of the histogram, the gradient histogram by integrating values of the gradient information corresponding to the sample data. The gradient histogram calculating module 71 includes gradient output modules 301a and 301b, an addition module 302, an accumulator module 303, and a sum total storing memory 304.

Each of the gradient output modules 301a and 301b is a module that includes an output port corresponding to each value of the feature amount, receives an input of the feature amount and the gradient information from the data memories 30a and 30b, and outputs the gradient information through the output port corresponding to a value of the input feature amount.

The addition module 302 is a module that adds up corresponding pieces of gradient information to be output for each value (bin) of the feature amount.

The accumulator module 303 is a module that adds the added gradient information input from the addition module 302 to the added gradient information that is presently held for each value (bin) of the feature amount, and holds the gradient histogram of the gradient information for each bin in the end.

The sum total storing memory 304 is a memory that stores the sum total of the gradient information calculated by the addition module 302.

The accumulated gradient calculating module 72 is a module that calculates the sums ($G_L$, $G_R$, $H_L$, $H_R$) of the gradient information by obtaining the cumulative sum of the gradient histogram for each threshold of the feature amount.

The calculating module 73 is a module that calculates the branch score at each threshold using the expression (19) described above and using the sum of the gradient information calculated by the accumulated gradient calculating module 72.

The optimum condition deriving module 22 is a module that receives an input of the branch score corresponding to each feature amount (in FIG. 21, one feature amount) and each threshold output from the calculating module 73, and derives a threshold and a number of the feature amount (feature amount number) the branch score of which is the largest. The optimum condition deriving module 22 writes the derived feature amount number and threshold into the model memory 40 as branch condition data of a corresponding node (an example of data of the node).

As illustrated in FIG. 21, to implement Data Parallel in a case in which the number of division is 2, the memory is divided into two memories, that is, the data memories 30a and 30b, and the gradient histogram calculating module 71 is divided into two modules, that is, the gradient output modules 301a and 301b at a preceding stage. In FIG. 21, a physical division unit is represented as "division 1" and "division 2".

Configuration and Operation of Gradient Histogram Calculating Module

Figure 22:
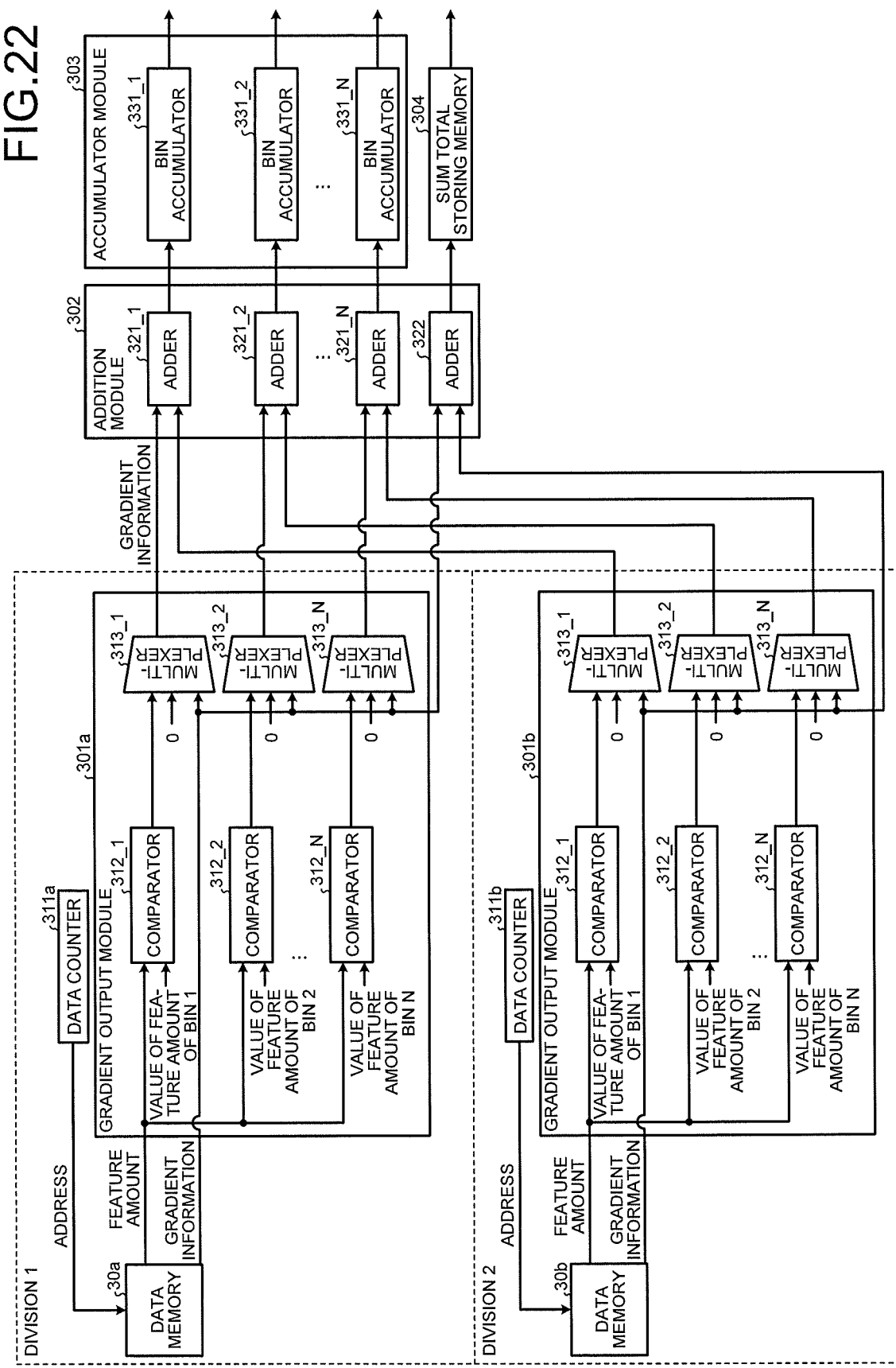
FIG. 22 is a diagram illustrating an example of a module configuration of a gradient histogram calculating module of the learning module according to the second embodiment.

FIG. 22 is a diagram illustrating an example of a module configuration of the gradient histogram calculating module of the learning module according to the second embodiment. With reference to FIG. 22, the following describes a configuration and an operation of the gradient histogram calculating module 71 in the learning module 20a according to the present embodiment. FIG. 21 illustrates a case in which the number of division for Data Parallel is assumed to be 2, the feature amount is assumed to have one dimension, and the gradient information is assumed to include only one piece of information (for example, the first-order gradient g).

As illustrated in FIG. 21, the gradient histogram calculating module 71 includes data counters 311a and 311b in addition to the configuration described above with reference to FIG. 20.

The data counter 311a outputs an address for reading out the sample data (feature amount) to be subjected to learning processing and corresponding gradient information from the data memory 30a.

As illustrated in FIG. 22, the gradient output module 301a includes comparators 312_1, 312_2, . . . , and 312_N and multiplexers 313_1, 313_2, . . . , and 313_N. In this case, N is a number of a value that may be taken by the feature amount, and is the number of bins in the gradient histogram. In a case of indicating an optional comparator among the comparators 312_1, 312_2, . . . , and 312_N, or a case in which the comparators 312_1, 312_2, . . . , and 312_N are collectively called, they are simply referred to as a "comparator 312". In a case of indicating an optional multiplexer among the multiplexers 313_1, 313_2, . . . , and 313_N, or a case in which the multiplexers 313_1, 313_2, . . . , and 313_N are collectively called, they are simply referred to as a "multiplexer 313".

The comparator 312 receives an input of values of the feature amount read out from the data memory 30a and the feature amount of a specific bin, and compares the values with each other. If the values are identical to each other, the comparator 312 outputs the fact that the values are identical to each other (for example, an ON output of a voltage level) to the multiplexer 313. For example, in a case in which the feature amount read out from the data memory 30a is identical to the value of the feature amount of a bin 1, the comparator 312_1 outputs the fact that the values are identical to each other to the multiplexer 313_1.

The multiplexer 313 receives an input of 0 and the gradient information corresponding to the feature amount (learning data) that is read out from the data memory 30a by the comparator 312, and outputs the input gradient information or 0 in accordance with a comparison result output from the comparator 312. For example, the multiplexer 313_1 receives an input of 0 and the gradient information corresponding to the feature amount that is read out from the data memory 30a by the comparator 312_1, outputs the input gradient information as the gradient information corresponding to the bin 1 in a case in which the comparison result output from the comparator 312_1 indicates that the values are identical to each other, and outputs 0 in a case in which the comparison result indicates that the values are not identical to each other. That is, in this mechanism, the gradient information corresponding to the feature amount is output from the multiplexer 313 corresponding to the value of the feature amount read out from the data memory 30a, and 0 is output from the other multiplexer 313.

Functions of the data memory 30b, the data counter 311b, and the gradient output module 301b are the same as those of the data memory 30a, the data counter 311a, and the gradient output module 301a described above, respectively.

The addition module 302 adds up the gradient information input from the multiplexer 313 for each value of the feature amount, that is, for each bin, and outputs the added gradient information to the accumulator module 303. The addition module 302 includes adders 321_1, 321_2, . . . , and 321_N, and an adder 322.

Each of the adders 321_1, 321_2, . . . , and 321_N adds up the gradient information input from the multiplexer 313 for each of bins 1, 2, . . . , and N, and outputs the added gradient information to the accumulator module 303. For example, the adder 321_1 adds the gradient information as an output from the multiplexer 313_1 corresponding to the bin 1 in the gradient output module 301a to the gradient information as an output from the multiplexer 313_1 corresponding to the bin 1 in the gradient output module 301b, and outputs the added gradient information to the accumulator module 303 (in this case, a bin 1 accumulator 331_1 described later).

The adder 322 receives an input of the pieces of gradient information to be added up, the pieces of gradient information read out from the data memories 30a and 30b by the gradient output module 301a and the gradient output module 301b, respectively. The adder 322 then outputs the added gradient information to the sum total storing memory 304.

The accumulator module 303 adds the added gradient information input from the addition module 302 to the added gradient information that is presently held for each value (bin) of the feature amount, and holds the gradient histogram of the gradient information for each bin in the end. The accumulator module 303 includes the bin 1 accumulator 331_1, a bin 2 accumulator 331_2, . . . , and a bin N accumulator 331_N.

The bin 1 accumulator 331_1, the bin 2 accumulator 331_2, . . . , and the bin N accumulator 331_N adds the added gradient information input from the respective adders 321_1, 321_2, . . . , and 321_N to the added gradient information that is presently held for each of the bins 1, 2, . . . , and N. For example, the bin 1 accumulator 331_1 adds the added gradient information input from the adder 321_1 to the added gradient information that is presently held, and holds the gradient histogram of the gradient information of the bin 1.

The sum total storing memory 304 adds the added gradient information output from the adder 322 to the added gradient information that is presently held. That is, the sum total storing memory 304 stores the sum total of the gradient information corresponding to all the pieces of learning data.

The following simply describes an operation procedure of calculating the gradient histogram performed by the gradient histogram calculating module 71 according to the present embodiment. The data counter 311a (311b) outputs an address for reading out the sample data (feature amount) to be subjected to learning processing and corresponding gradient information from the data memory 30a. The comparator 312 of the gradient output module 301a (301b) receives an input of values of the feature amount read out from the data memory 30a (30b) and the feature amount of a specific bin, and compares the values with each other. If the values are identical to each other, the comparator 312 outputs the fact that the values are identical to each other to the multiplexer 313. The multiplexer 313 receives an input of 0 and the gradient information corresponding to the feature amount (learning data) that is read out from the data memory 30a (30b) by the comparator 312, and outputs 0 or the input gradient information in accordance with a comparison result output from the comparator 312. The respective adders 321_1, 321_2, . . . , and 321_N of the addition module 302 add up the gradient information input from the multiplexer 313 for each of the bins 1, 2, . . . , and N, and output the added gradient information to the accumulator module 303. The bin 1 accumulator 331_1, the bin 2 accumulator 331_2, . . . , and the bin N accumulator 331_N of the accumulator module 303 add the added gradient information input from the respective adders 321_1, 321_2, . . . , and 321_N to the added gradient information that is presently held for each of the bins 1, 2, . . . , and N, and holds the gradient histogram of the gradient information for each bin in the end. The above operation is repeatedly performed on all the pieces of learning data at the present node.

In the configuration of the gradient histogram calculating module 71 according to the present embodiment as described above, the gradient histogram is stored in a corresponding register (accumulator) for each bin of the feature amount instead of being stored in the memory as in the conventional configuration illustrated in FIG. 20. The configuration of the gradient histogram calculating module 71 illustrated in FIG. 22 can be implemented with registers the number of which is equal to (the number of bins of the feature amount×the dimensions of the feature amount (in FIG. 22, the number of dimensions is assumed to be one)). That is, the total capacity required for storing the gradient histogram is represented as (the number of bins×the bit width×2 (the first-order gradient g, the second-order gradient h)×the dimensions of the feature amount), which does not depend on the number of division. Thus, as compared with the conventional configuration illustrated in FIG. 20, circuit capacity for storing the gradient histogram can be greatly reduced. Additionally, in the configuration of the gradient histogram calculating module 71 according to the present embodiment, a circuit scale does not depend on the number of division, so that the number of division for Data Parallel can be increased so long as a circuit scale of other modules allows, and speed of learning processing can be improved.

For example, in a case in which the feature amount is 8 bits (256 patterns) and has 2000 dimensions, and the gradient information includes two gradients, that is, the first-order gradient g and the second-order gradient h, the number of required registers is represented as follows.

256 (the number of bins)×2 (the first-order gradient g, the second-order gradient h)×2000 [dimensions]=1024000 [registers]

In a case of a chip called VU9P described above, the maximum number of registers is 2364000, so that the number of registers required for holding the gradient histogram can be suppressed to be substantially half of the maximum number of registers in the configuration of the gradient histogram calculating module 71 according to the present embodiment.

Figure 23:
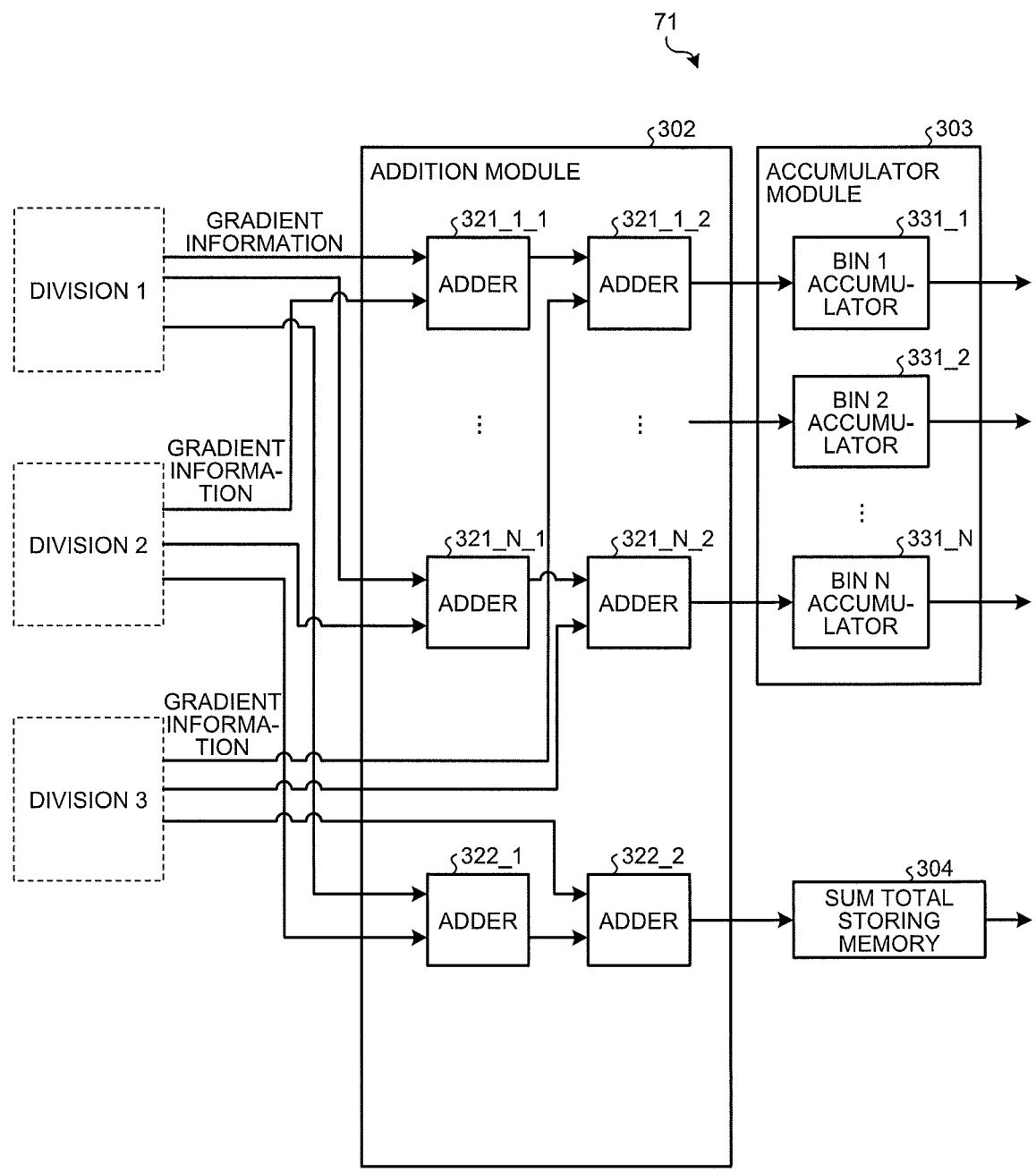
FIG. 23 is a diagram illustrating an example of a module configuration of the gradient histogram calculating module in a case in which the number of division is assumed to be 3 in the learning module according to the second embodiment.

FIG. 23 is a diagram illustrating an example of a module configuration of the gradient histogram calculating module in a case in which the number of division is assumed to be 3 in the learning module according to the second embodiment. With reference to FIG. 23, the following describes a configuration example of the gradient histogram calculating module 71 in a case in which the number of division for Data Parallel is assumed to be 3. FIG. 23 illustrates a case in which the feature amount is assumed to have one dimension, and the gradient information is assumed to include only one piece of information (for example, the first-order gradient g).

For example, in FIG. 23, the addition module 302 includes adders 321_1_1, ..., and 321_N_1, adders 321_1_2, ..., and 321_N_2, and adders 322_1 and 322_2. As in the gradient histogram calculating module 71 illustrated in FIG. 23, the addition module 302 may integrate (add up) the pieces of gradient information in a stepwise manner. For example, regarding the bin 1, the adder 321_1_1 adds the gradient information output from "division 1" to the gradient information output from "division 2" to be output to the adder 321_1_2. The adder 321_1_2 adds an added value output from the adder 321_1_1 to the gradient information output from "division 3" to be output to the bin 1 accumulator 331_1 of the accumulator module 303.

Configuration and Operation of Accumulated Gradient Calculating Module

Figure 24:
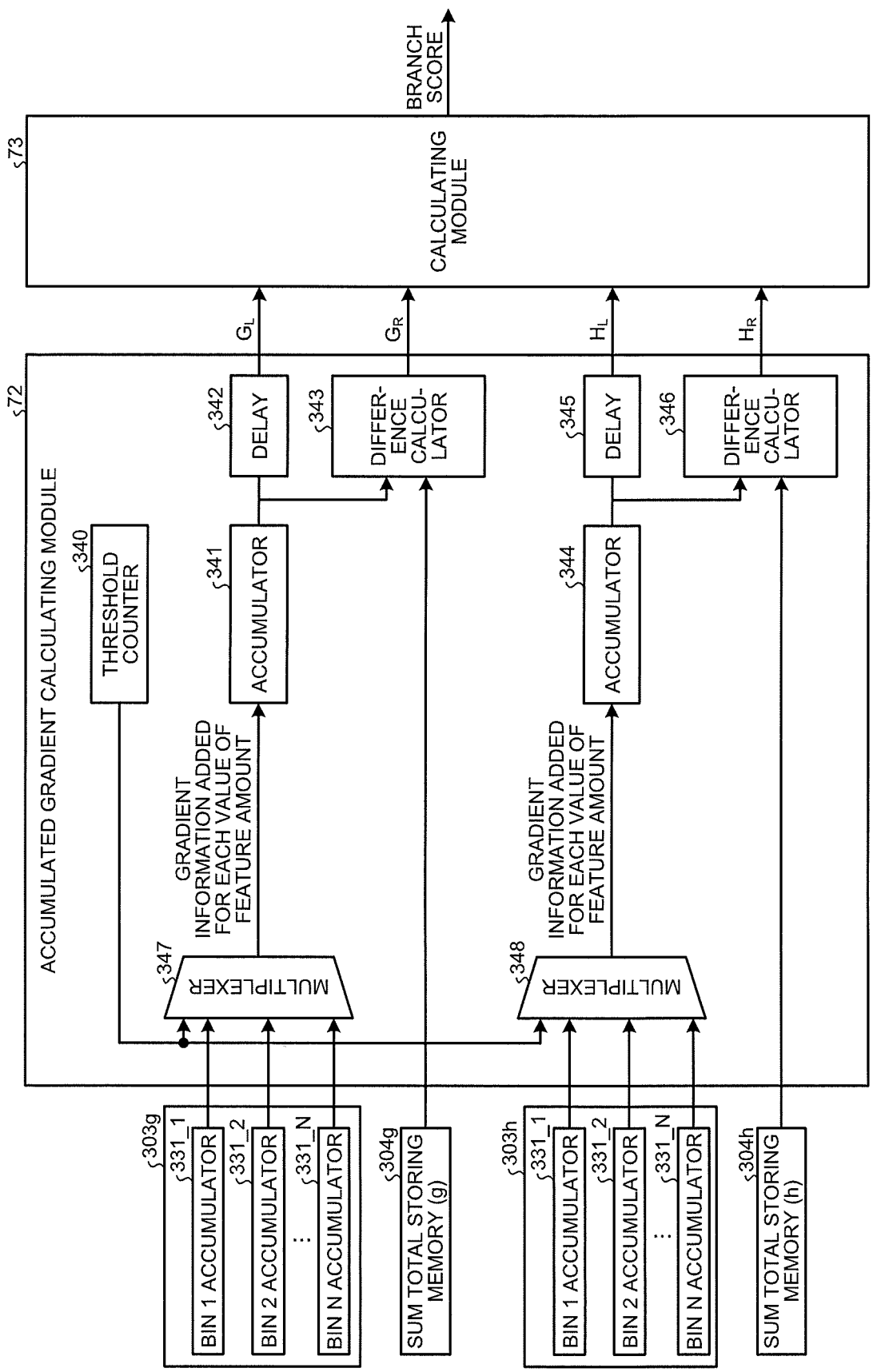
FIG. 24 is a diagram illustrating an example of a module configuration of an accumulated gradient calculating module of the learning module according to the second embodiment.

FIG. 24 is a diagram illustrating an example of a module configuration of the accumulated gradient calculating module of the learning module according to the second embodiment. With reference to FIG. 24, the following describes a configuration and an operation of the accumulated gradient calculating module 72 in the learning module 20a according to the present embodiment. FIG. 24 illustrates a case in which the number of division for Data Parallel is assumed to be 1, the feature amount is assumed to have one dimension, and the gradient information is assumed to include two piece of information (for example, the first-order gradient g and the second-order gradient h).

The conventional accumulated gradient calculating module 62 illustrated in FIG. 19 accesses the gradient histogram memory 204 (208) using the output (threshold) from the threshold counter 210 as an address. In FIG. 24, the gradient histogram is held by the register (accumulator) for each bin, so that only a value corresponding to the threshold of the threshold counter is extracted from every bin via the multiplexer.

As illustrated in FIG. 24, the accumulated gradient calculating module 72 includes a threshold counter 340, an accumulator 341, a delay 342, a difference calculator 343, an accumulator 344, a delay 345, a difference calculator 346, and multiplexers 347 and 348. In FIG. 24, the accumulator module 303 and the sum total storing memory 304 corresponding to the first-order gradient g are assumed to be an accumulator module 303g and a sum total storing memory 304g, respectively. The accumulator module 303 and the sum total storing memory 304 corresponding to the second-order gradient h are assumed to be an accumulator module 303h and a sum total storing memory 304h, respectively.

The threshold counter 340 outputs a threshold for reading out, from the accumulator modules 303g and 303h, the gradient information (g, h) added for each value (bin) of the feature amount, that is, the gradient histogram of each bin of the feature amount.

The multiplexer 347 receives an input of the threshold from the threshold counter 340, and an input of a storage value (gradient histogram) of each accumulator (the bin 1 accumulator 331_1, the bin 2 accumulator 331_2, ..., and the bin N accumulator 331_N) of the accumulator module 303g. The multiplexer 347 then outputs, to the accumulator 341, the gradient histogram corresponding to the bin corresponding to the threshold from the threshold counter 340 among the input gradient histograms of the respective bins.

The multiplexer 348 receives an input of the threshold from the threshold counter 340, and an input of the storage value (gradient histogram) of each accumulator (the bin 1 accumulator 331_1, the bin 2 accumulator 331_2, ..., and the bin N accumulator 331_N) of the accumulator module 303h. The multiplexer 348 then outputs, to the accumulator 344, the gradient histogram corresponding to the bin corresponding to the threshold from the threshold counter 340 among the input gradient histograms of the respective bins.

The accumulator 341 receives, from the multiplexer 347, an input of the gradient histogram of the gradient information g corresponding to the threshold output from the threshold counter 340, accumulates the input gradient histogram on the cumulative sum of the gradient histogram that is presently stored, and holds it as a new cumulative sum of the gradient histogram.

The delay 342 outputs, as the sum $G_L$ of the gradient information g, the cumulative sum of the gradient histogram of the gradient information g read out from the accumulator 341 with delay to be matched with a timing at which the sum $G_R$ of the gradient information g is output from the difference calculator 343.

The difference calculator 343 calculates the sum $G_R$ of the gradient information g by subtracting the cumulative sum of the gradient histogram of the gradient information g read out from the accumulator 341 (that is, the sum $G_L$ of the gradient information g) from the sum total of the gradient information g read out from the sum total storing memory 304g.

The accumulator 344 receives, from the multiplexer 348, an input of the gradient histogram of the gradient information h corresponding to the threshold output from the threshold counter 340, accumulates the input gradient histogram on the cumulative sum of the gradient histogram that is presently stored, and holds it as a new cumulative sum of the gradient histogram.

The delay 345 outputs, as the sum $H_L$ of the gradient information h, the cumulative sum of the gradient histogram of the gradient information h read out from the accumulator 344 with delay to be matched with a timing at which the sum $H_R$ of the gradient information h is output from the difference calculator 346.

The difference calculator 346 calculates the sum $H_R$ of the gradient information h by subtracting the cumulative sum of the gradient histogram of the gradient information h read out from the accumulator 344 (that is, the sum $H_L$ of the gradient information h) from the sum total of the gradient information h read out from the sum total storing memory 304h.

The following simply describes an operation procedure of calculating the sums ($G_L$, $G_R$, $H_L$, $H_R$) of the gradient information performed by the accumulated gradient calculating module 72. The accumulated gradient calculating module 72 starts calculation processing after the gradient histogram calculating module 71 ends the operation of calculation and storage processing for the gradient histogram of the gradient information. That is, after the gradient histogram calculating module 71 ends the calculation processing, the accumulator modules 303g and 303h hold the gradient histograms of the respective pieces of gradient information g and h calculated from all the pieces of learning data of the present node.

First, the multiplexer 347 receives an input of the threshold from the threshold counter 340, and an input of the storage value (gradient histogram) of each accumulator (the bin 1 accumulator 331_1, the bin 2 accumulator 331_2, . . . , and the bin N accumulator 331_N) of the accumulator module 303g. The multiplexer 347 outputs, to the accumulator 341, the gradient histogram corresponding to the bin corresponding to the threshold from the threshold counter 340 among the input gradient histograms of the respective bins. The accumulator 341 then receives, from the multiplexer 347, an input of the gradient histogram of the gradient information g corresponding to the threshold output from the threshold counter 340, accumulates the input gradient histogram on the cumulative sum of the gradient histogram that is presently stored, and holds it as a new cumulative sum of the gradient histogram. The delay 342 outputs, to the calculating module 73, the cumulative sum of the gradient histogram of the gradient information g read out from the accumulator 341 with delay to be matched with a timing at which the sum $G_R$ of the gradient information g is output from the difference calculator 343, as the sum $G_L$ of the gradient information g. The difference calculator 343 calculates the sum $G_R$ of the gradient information g by subtracting the cumulative sum of the gradient histogram of the gradient information g read out from the accumulator 341 (that is, the sum $G_L$ of the gradient information g) from the sum total of the gradient information g read out from the sum total storing memory 304g, and outputs the sum $G_R$ to the calculating module 73. The same applies to processing on the gradient information h (calculation processing for the sum $H_L$ and $H_R$ of the gradient information h) performed by the multiplexer 348, the accumulator 344, the delay 345, and the difference calculator 346. The above operation is repeatedly performed on all of the thresholds, and this is implemented when the threshold counter 340 sequentially counts up the thresholds to be output in a round.

In this way, the accumulated gradient calculating module 72 and the calculating module 73 performs the processing after the gradient histogram calculating module 71 performs the operation of calculation and storage processing for the gradient histogram of the gradient information in advance. Due to this, speed of calculation processing for the branch score (gain) performed by the learning module 20a can be increased.

Configuration of Learning Module in a Case in which Number of Dimensions is 2

Figure 25:
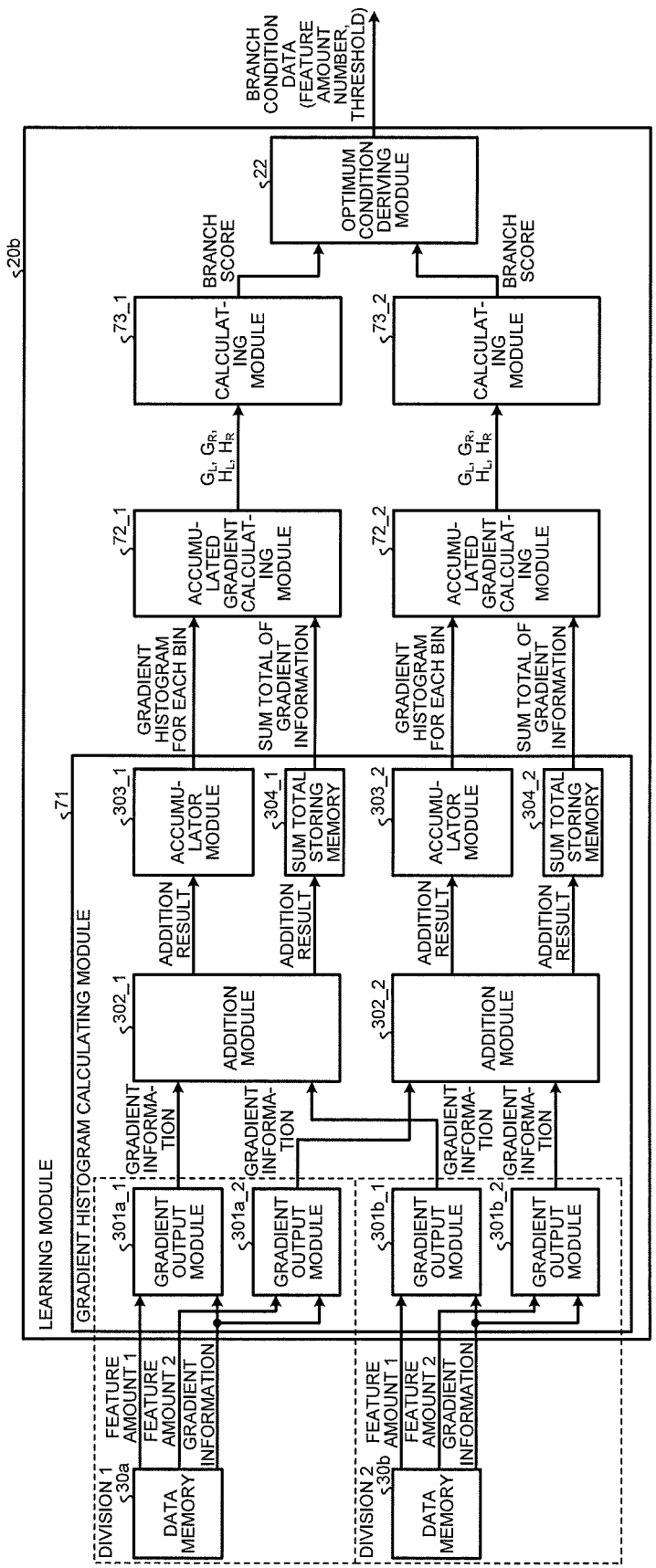
FIG. 25 is a diagram illustrating an example of a module configuration of the learning module in a case in which the number of types of feature amounts is assumed to be 2 in the learning and discrimination device according to the second embodiment.
Figure 26:
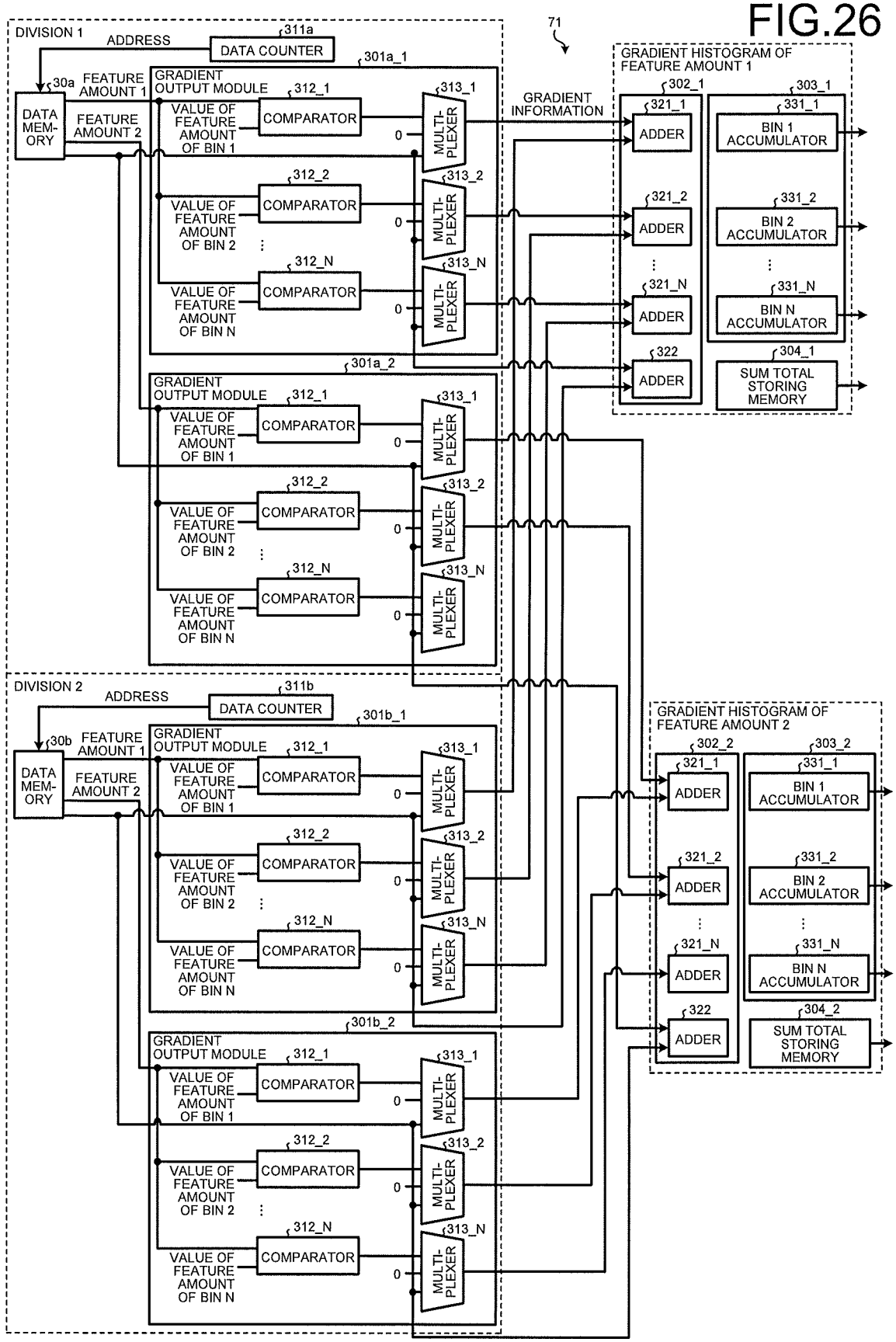
FIG. 26 is a diagram illustrating an example of a module configuration of the gradient histogram calculating module in a case in which the number of types of feature amounts is assumed to be 2 in the learning module according to the second embodiment.

FIG. 25 is a diagram illustrating an example of a module configuration of the learning module in a case in which the number of types of feature amounts is assumed to be 2 in the learning and discrimination device according to the second embodiment. FIG. 26 is a diagram illustrating an example of a module configuration of the gradient histogram calculating module in a case in which the number of types of feature amounts is assumed to be 2 in the learning module according to the second embodiment. With reference to FIG. 25 and FIG. 26, the following describes a configuration and an operation of a learning module 20b of the learning and discrimination device (an example of a learning device) according to the present embodiment. FIG. 25 illustrates a case in which the number of division for Data Parallel is assumed to be 2, and the feature amount is assumed to have two dimensions.

As illustrated in FIG. 25, the learning module 20b includes the gradient histogram calculating module 71, accumulated gradient calculating modules 72_1 and 72_2, calculating modules 73_1 and 73_2, and the optimum condition deriving module 22. The gradient histogram calculating module 71 includes gradient output modules 301a_1, 301a_2, 301b_1, and 301b_2, addition modules 302_1 and 302_2, accumulator modules 303_1 and 303_2, and sum total storing memories 304_1 and 304_2. As illustrated in FIG. 26, the gradient histogram calculating module 71 includes the data counters 311a and 311b in addition to the configuration illustrated in FIG. 25.

As illustrated in FIG. 26, each of the gradient output modules 301a_1, 301a_2, 301b_1, and 301b_2 includes the comparators 312_1, 312_2, . . . , and 312_N, and the multiplexers 313_1, 313_2, . . . , and 313_N. Each of the addition modules 302_1 and 302_2 includes the adders 321_1, 321_2, . . . , and 321_N, and the adder 322. Each of the accumulator modules 303_1 and 303_2 includes the bin 1 accumulator 331_1, the bin 2 accumulator 331_2, . . . , and the bin N accumulator 331_N.

In the configuration illustrated in FIG. 25 and FIG. 26, the gradient output modules 301a_1 and 301b_1, the addition module 302_1, the accumulator module 303_1, the sum total storing memory 304_1, the accumulated gradient calculating module 72_1, and the calculating module 73_1 are used for processing corresponding to "feature amount 1". On the other hand, the gradient output modules 301a_2 and 301b_2, the addition module 302_2, the accumulator module 303_2, the sum total storing memory 304_2, the accumulated gradient calculating module 72_2, and the calculating module 73_2 are used for processing corresponding to "feature amount 2". An operation of each of the modules is the same as the operation described above with reference to FIG. 22 and FIG. 24.

As described above, the capacity required for storing the gradient histogram is represented as (the number of bins×the bit width×2 (the first-order gradient g, the second-order gradient h)×the dimensions of the feature amount), so that the accumulator modules 303 the number of which corresponds to the dimensions of the feature amount are required (in FIG. 25, the accumulator modules 303_1 and 303_2). However, the capacity does not depend on the number of division, so that, although FIG. 25 and FIG. 26 exemplify the case in which the number of division is 2, it is sufficient to arrange the two accumulator modules 303 so long as the dimensions of the feature amount is two even when the number of division becomes equal to or larger than 3.

As described above, in the learning module 20a (20b) of the learning and discrimination device according to the present embodiment, the gradient histogram calculating module 71 stores the gradient histogram in a corresponding register (accumulator) for each bin of the feature amount instead of storing the gradient histogram in the memory as in the conventional configuration illustrated in FIG. 20. The configuration of the gradient histogram calculating module 71 can be implemented with registers the number of which is equal to (the number of bins of the feature amount×the dimensions of the feature amount). That is, the total capacity required for storing the gradient histogram is represented as (the number of bins×the bit width×2 (the first-order gradient g, the second-order gradient h)×the dimensions of the feature amount), which does not depend on the number of division. Thus, as compared with the conventional configuration illustrated in FIG. 20, it is possible to greatly reduce the circuit scale of the memory (the accumulator, the register) that holds the information of the gradient histogram created for the feature amount and the gradient information that are input in parallel. Additionally, in the configuration of the gradient histogram calculating module 71 according to the present embodiment, the circuit scale does not depend on the number of division, so that the number of division for Data Parallel can be increased so long as the circuit scale of the other modules allows, and speed of learning processing can be improved.

Third Embodiment

The following describes the learning and discrimination device according to a third embodiment, mainly about differences from the learning and discrimination device according to the second embodiment. In the present embodiment, the following specifically describes a configuration of the calculating module 73 that calculates the branch score from the sums ($G_L$, $G_R$, $H_L$, $H_R$) of the gradient information calculated by the accumulated gradient calculating module 72 (an example of a gradient output unit).

Configuration of Calculating Module

Figure 27:
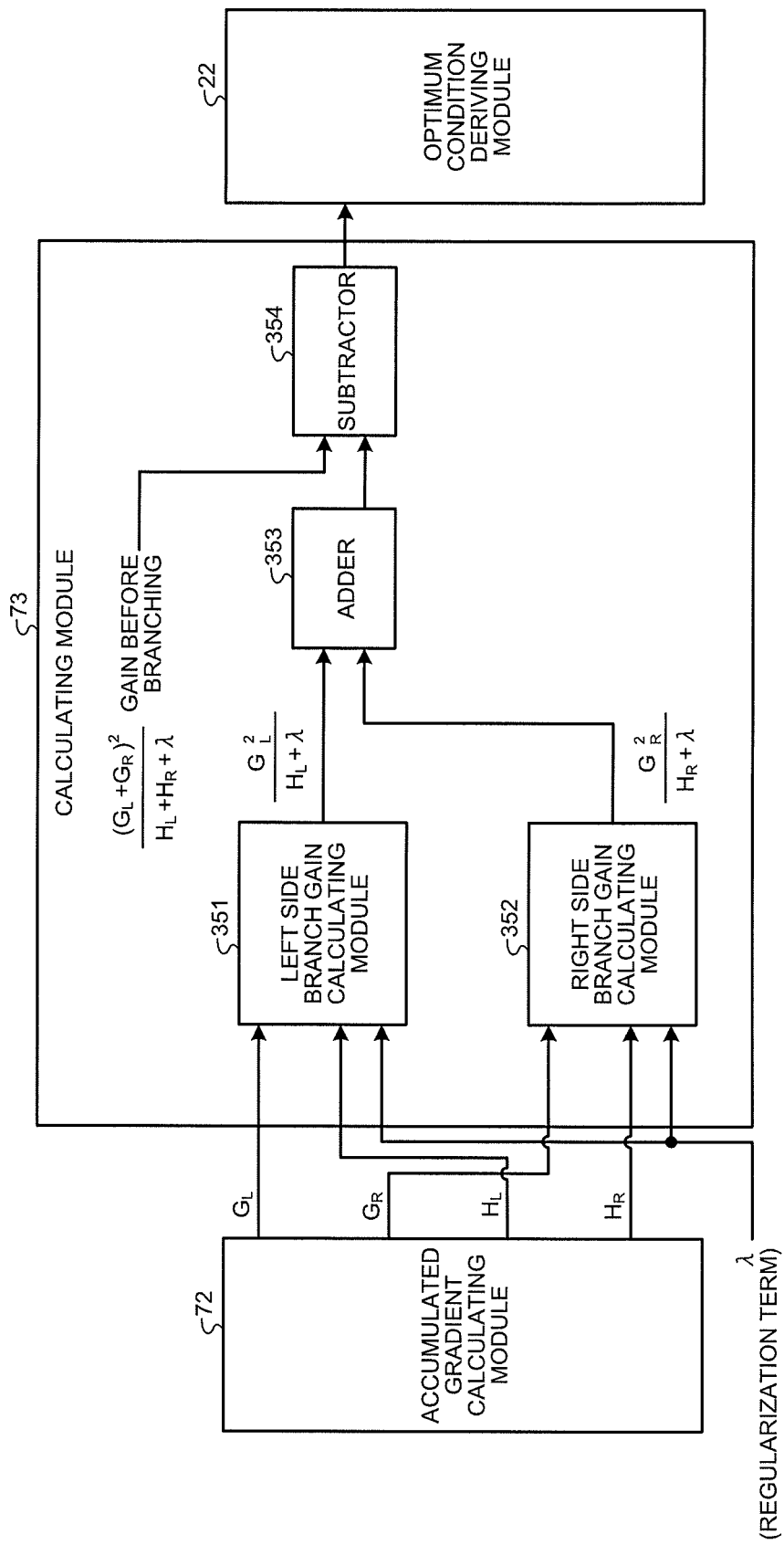
FIG. 27 is a diagram illustrating an example of an outline of a module configuration of a calculating module of a learning module according to a third embodiment.

FIG. 27 is a diagram illustrating an example of an outline of a module configuration of the calculating module of the learning module according to the third embodiment. First, with reference to FIG. 27, the following describes an outline of a configuration of the calculating module 73 of the learning module (in this case, assumed to be the learning module 20a described above) of the learning and discrimination device according to the present embodiment.

The calculating module 73 (branch score calculator) is, as described above, a module that calculates the branch score at each threshold by the expression (19) described above using the accumulated gradient calculated by the accumulated gradient calculating module 72, that is, the sums ($G_L$, $G_R$, $H_L$, $H_R$) of the gradient information. A value calculated by the expression (19) corresponds to an "index value" according to the present invention. As illustrated in FIG. 27, the calculating module 73 includes a left side branch gain calculating module 351, a right side branch gain calculating module 352, an adder 353, and a subtractor 354. One set of sums ($G_L$, $G_R$, $H_L$, $H_R$) of the gradient information ($G_L$, $G_R$, $H_L$, $H_R$ under a certain condition) is input to the calculating module 73 from the accumulated gradient calculating module 72 in 1 clock. The branch score is a value representing goodness in the case in which the learning data is made to branch under a certain condition (a feature amount, a threshold).

The left side branch gain calculating module 351 is a module that calculates the sums ($G_L$, $H_L$) of the gradient information from the accumulated gradient calculating module 72, and calculates the first term within [ ] in the expression (19) (hereinafter, referred to as a left side branch gain) from a regularization term $\lambda$.

The right side branch gain calculating module 352 is a module that calculates the sums ($G_R$, $H_R$) of the gradient information from the accumulated gradient calculating module 72, and calculates the second term within [ ] in the expression (19) (hereinafter, referred to as a right side branch gain) from the regularization term $\lambda$.

The adder 353 is an arithmetic circuit that adds the left side branch gain calculated by the left side branch gain calculating module 351 to the right side branch gain calculated by the right side branch gain calculating module 352.

The subtractor 354 is an arithmetic circuit that subtracts the third term within [ ] in the expression (19) (hereinafter, referred to as a gain before branching) from the sum of the left side branch gain and the right side branch gain calculated by the adder 353. An output from the subtractor 354 becomes an output from the calculating module 73, and is input to the optimum condition deriving module 22 (deriving unit) at a succeeding stage. As described later, it is sufficient that a large/small relation among branch scores of the respective feature amounts and the respective thresholds can be grasped, so that multiplication by ½ and the constant $\gamma$ in the expression (19) are ignored.

The processing of each arithmetic circuit of the calculating module 73 described above is performed under all conditions of the respective feature amounts and the respective thresholds.

Figure 28:
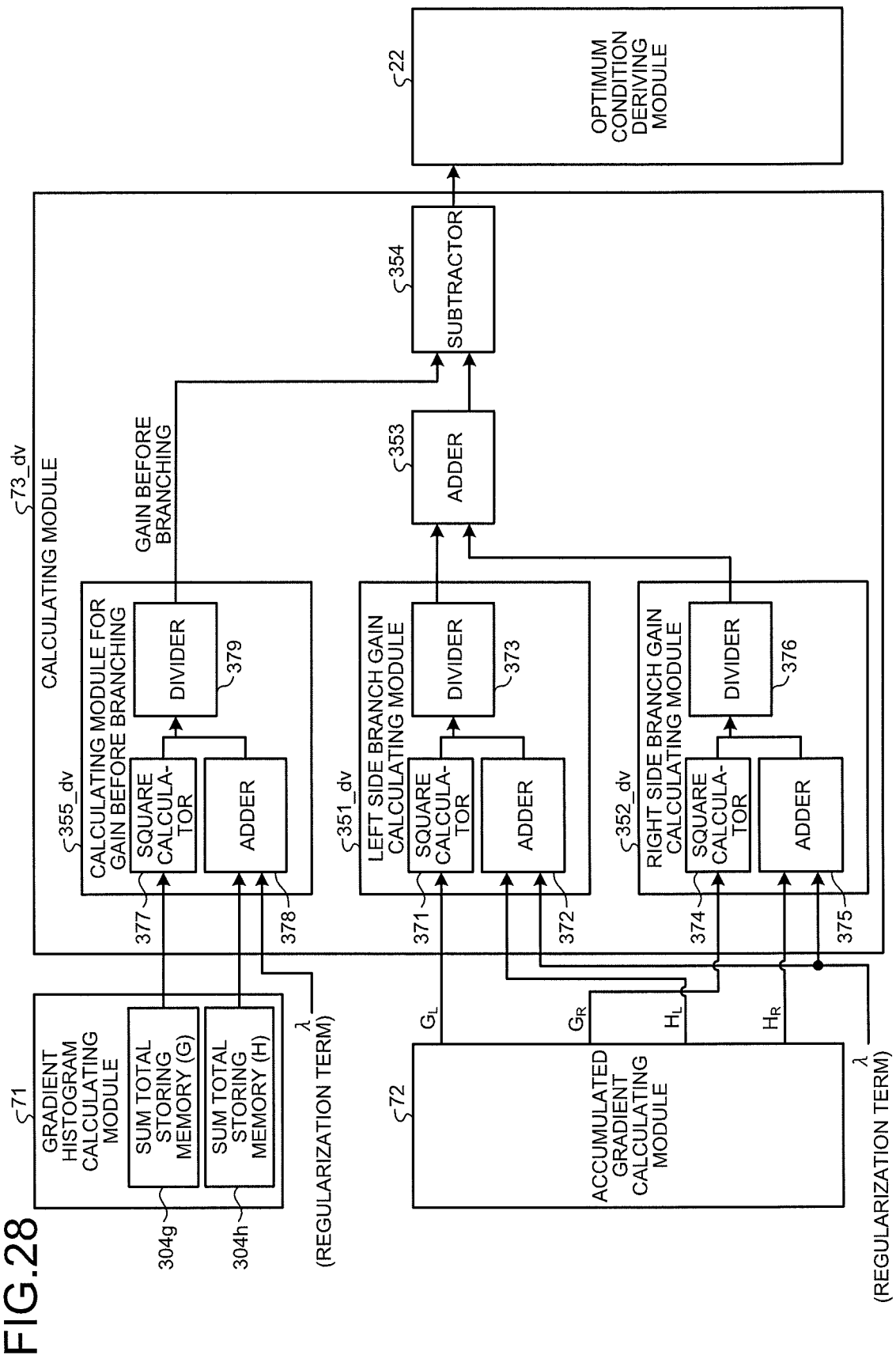
FIG. 28 is a diagram illustrating an example of a case in which the calculating module is implemented by a configuration using a divider.

FIG. 28 is a diagram illustrating an example of a case in which the calculating module is implemented by a configuration using a divider. Next, with reference to FIG. 28, the following describes a calculating module 73_dv as a specific example of implementing the calculating module 73 using a divider.

As illustrated in FIG. 28, the calculating module 73_dv includes a left side branch gain calculating module 351_dv, a right side branch gain calculating module 352_dv, an adder 353, a subtractor 354, and a calculating module 355_dv for a gain before branching. Operations of the adder 353 and the subtractor 354 are the same as those described above with reference to FIG. 27.

The left side branch gain calculating module 351_dv is a module corresponding to the left side branch gain calculating module 351 in FIG. 27, and includes a square calculator 371, an adder 372, and a divider 373.

The square calculator 371 is an arithmetic circuit that squares the sum $G_L$ of the gradient information input from the accumulated gradient calculating module 72, that is, multiplies the sum $G_L$ by the sum $G_L$.

The adder 372 is an arithmetic circuit that operates the sum of the regularization term $\lambda$ and the sum $H_L$ of the gradient information input from the accumulated gradient calculating module 72.

The divider 373 is an arithmetic circuit that divides the squared sum $G_L$ of the gradient information operated by the square calculator 371 by the sum of the regularization term $\lambda$ and the sum $H_L$ of the gradient information operated by the adder 372. A value operated by the divider 373, that is, a left side branch gain is output to the adder 353.

The right side branch gain calculating module 352_dv is a module corresponding to the right side branch gain calculating module 352 in FIG. 27, and includes a square calculator 374, an adder 375, and a divider 376.

The square calculator 374 is an arithmetic circuit that squares the sum $G_R$ of the gradient information input from the accumulated gradient calculating module 72, that is, multiplies the sum $G_R$ by the sum $G_R$.

The adder 375 is an arithmetic circuit that operates the sum of the regularization term $\lambda$ and the sum $H_R$ of the gradient information input from the accumulated gradient calculating module 72.

The divider 376 is an arithmetic circuit that divides the squared sum $G_R$ of the gradient information operated by the square calculator 374 by the sum of the regularization term $\lambda$ and the sum $H_R$ of the gradient information operated by the adder 375. A value operated by the divider 376, that is, a right side branch gain is output to the adder 353.

The calculating module 355_dv for a gain before branching is a module that calculates the gain before branching in FIG. 27, and includes a square calculator 377, an adder 378, and a divider 379.

The square calculator 377 is an arithmetic circuit that squares the sum total of the gradient information g (substantially, $G_L+G_R$) input from the sum total storing memory 304g of the gradient histogram calculating module 71, that is, multiplies the sum total by the sum total.

The adder 378 is an arithmetic circuit that operates the sum of the regularization term λ and the sum total of the gradient information h (substantially, $H_L+H_R$) input from the sum total storing memory 304h of the gradient histogram calculating module 71.

The divider 379 is an arithmetic circuit that divides the squared sum total of the gradient information g ($G_L+G_R$) operated by the square calculator 377 by the sum of the regularization term λ and the sum total ($H_L+H_R$) of the gradient information h operated by the adder 378. A value operated by the divider 379, that is, a gain before branching is output to the subtractor 354.

The gain before branching is not relevant to the dimension of the feature amount, so that it is sufficient to provide one calculating module 355_dv for a gain before branching irrespective of the dimension. On the other hand, the number of left side branch gain calculating modules 351_dv and the number of right side branch gain calculating modules 352_dv are each required to be equal to the number of dimensions of the feature amount. Thus, the number of dividers included in the calculating module 73_dv is required to be equal to (the number of dimensions of the feature amount×2+1). For example, the feature amount has 100 dimensions, 201 dividers are required. As described above, the divider has a larger circuit scale than that of the adder, the subtractor, and the like, so that the circuit scale of the entire learning module 20a increases as the number of dimensions of the feature amount increases. The following describes a circuit configuration of the calculating module 73 for calculating the branching score, the circuit configuration according to the present embodiment not using the divider.

Figure 29:
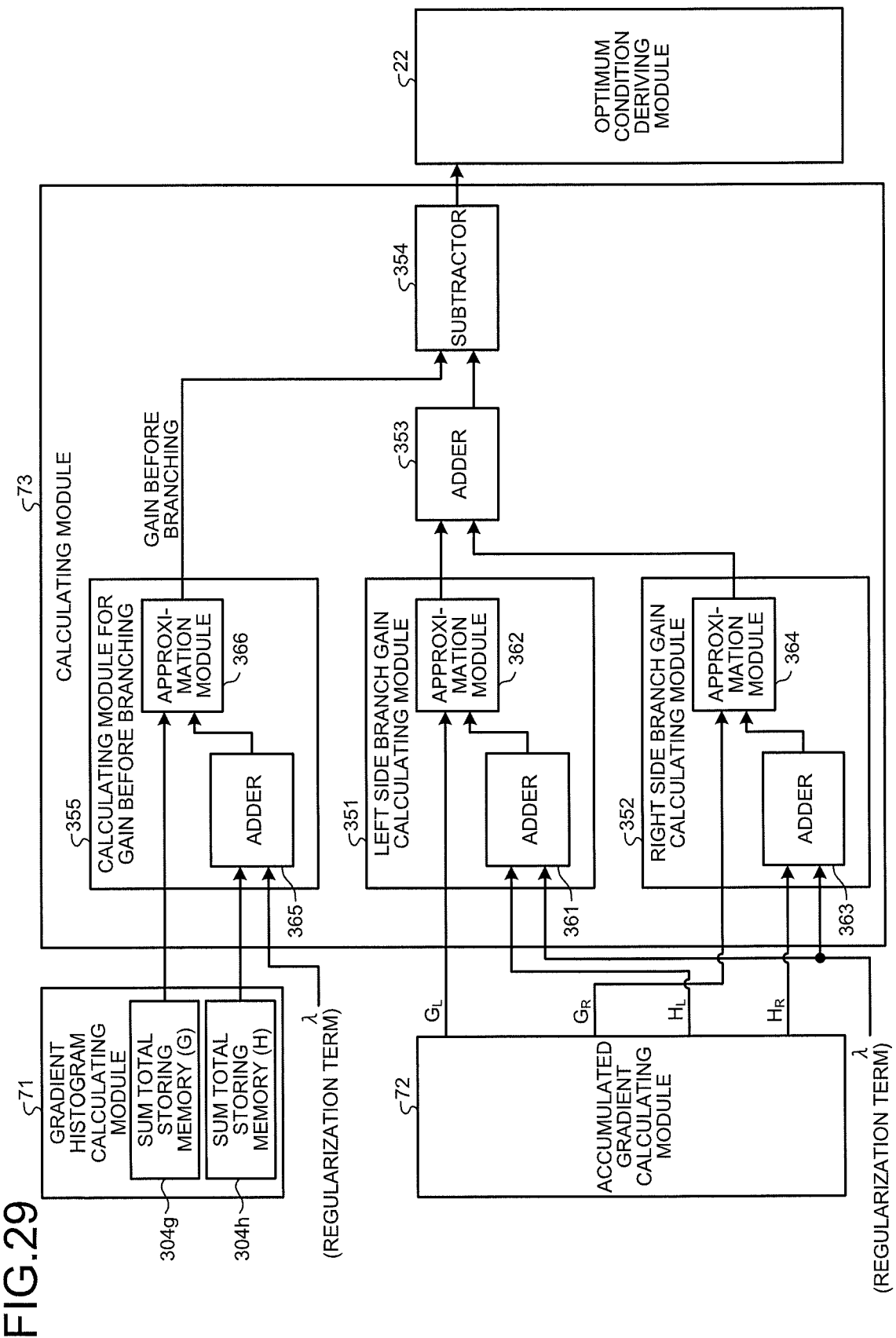
FIG. 29 is a diagram illustrating an example of a case in which the calculating module of the learning module according to the third embodiment is implemented by a configuration not using a divider.

FIG. 29 is a diagram illustrating an example of a case in which the calculating module of the learning module according to the third embodiment is implemented by a configuration not using the divider. With reference to FIG. 29, the following describes the configuration of the calculating module 73 not using the divider (dividing circuit) according to the present embodiment.

The branch score is used for calculating the branch condition for each node, so that a value itself is not so important, and it is sufficient that a large/small relation among conditions (feature amounts, thresholds) can be grasped. Thus, the calculating module 73 according to the present embodiment is configured by an arithmetic circuit using an approximation method without the divider in a range in which the large/small relation among the branch scores under the respective conditions does not largely varies. However, regarding a module that calculates the leaf weight (a leaf weight calculating module 74 illustrated in FIG. 30 described later), a value itself of the leaf weight is important, so that it is not preferable to use the approximation method as described above. Thus, as described later with reference to FIG. 30, the module that calculates the leaf weight is assumed to be implemented by a configuration having high arithmetic accuracy, the configuration not using the approximation method but using the divider. In the expression (19) described above for calculating the branch score, there are three arithmetic operations in a form of $a^2/b$, and the calculating module 73 according to the present embodiment implements the arithmetic operation by approximation. As described above, regarding the branch score, it is sufficient that the large/small relation among the branch scores of the respective feature amounts and the respective thresholds, so that multiplication by ½ and the constant γ in the expression (19) are neglected.

As illustrated in FIG. 29, the calculating module 73 includes the left side branch gain calculating module 351, the right side branch gain calculating module 352, the adder 353, the subtractor 354, and a calculating module 355 for a gain before branching. The operations of the adder 353 and the subtractor 354 are the same as those described above with reference to FIG. 27.

The left side branch gain calculating module 351 includes an adder 361 and an approximation module 362.

The adder 361 is an arithmetic circuit that operates the sum of the regularization term λ and the sum $H_L$ of the gradient information input from the accumulated gradient calculating module 72.

The approximation module 362 is a module that receives an input of the sum $G_L$ of the gradient information from the accumulated gradient calculating module 72 and the sum of the regularization term λ and the sum $H_L$ of the gradient information calculated by the adder 361, and calculates the left side branch gain. However, specifically, the approximation module 362 obtains an approximate value of a logarithm of the left side branch gain. Details about the configuration and the operation of the approximation module 362 will be described later with reference to FIG. 31 to FIG. 33.

The right side branch gain calculating module 352 includes an adder 363 and an approximation module 364.

The adder 363 is an arithmetic circuit that operates the sum of the regularization term λ and the sum $H_R$ of the gradient information input from the accumulated gradient calculating module 72.

The approximation module 364 is a module that receives an input of the sum $G_R$ of the gradient information from the accumulated gradient calculating module 72 and the sum of the regularization term λ and the sum $H_R$ of the gradient information calculated by the adder 363, and calculates the right side branch gain. However, specifically, the approximation module 364 obtains an approximate value of a logarithm of the right side branch gain. Details about the configuration and the operation of the approximation module 364 will be described later with reference to FIG. 31 to FIG. 33.

The calculating module 355 for a gain before branching is a module that calculates the gain before branching in FIG. 27, and includes an adder 365 and an approximation module 366.

The adder 365 is an arithmetic circuit that operates the sum of the regularization term λ and the sum total of the gradient information h (substantially, $H_L+H_R$) input from the sum total storing memory 304h of the gradient histogram calculating module 71.

The approximation module 366 receives an input of the sum total of the gradient information g (substantially, $G_L+G_R$) input from the sum total storing memory 304g of the gradient histogram calculating module 71 and the sum of the regularization term λ and the sum total of the gradient information h ($H_L+H_R$) calculated by the adder 365, and calculates the gain before branching. However, specifically, the approximation module 366 obtains an approximate value of a logarithm of the gain before branching. Details about the configuration and the operation of the approximation module 366 will be described later with reference to FIG. 31 to FIG. 33.

Figure 30:
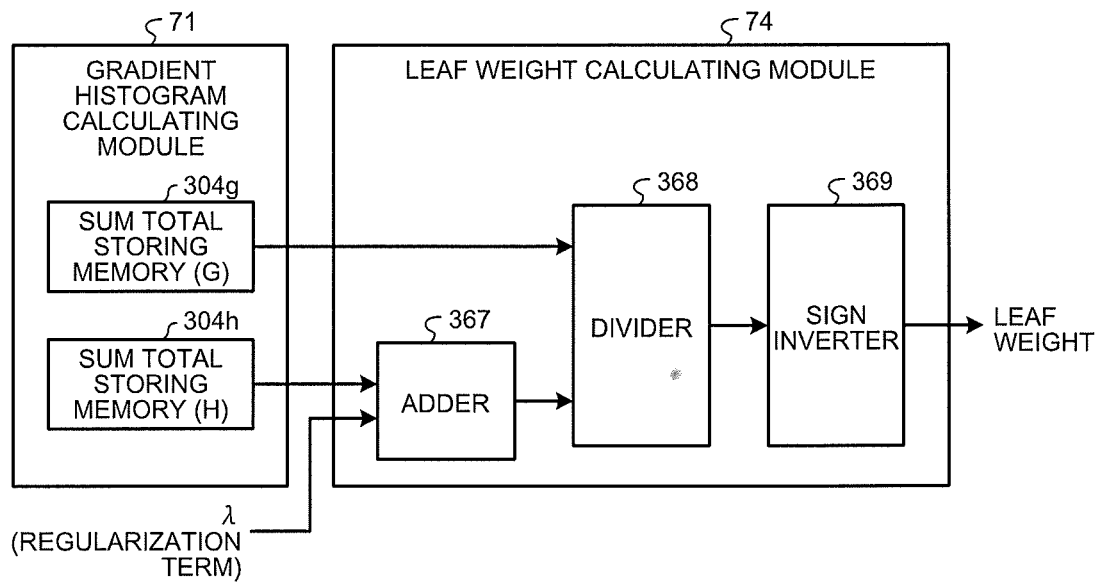
FIG. 30 is a diagram illustrating an example of a module configuration of a leaf weight calculating module of the learning module according to the third embodiment.

FIG. 30 is a diagram illustrating an example of a module configuration of the leaf weight calculating module of the learning module according to the third embodiment. The following describes the configuration and the operation of the leaf weight calculating module 74 (leaf weight calculator) according to the present embodiment with reference to FIG. 30. The leaf weight calculating module 74 is assumed to be included in the learning module 20a illustrated in FIG. 21.

The leaf weight calculating module 74 is a module that calculates a leaf value by the expression (18) described above using the sum total of the gradient information g (first-order gradient) ($G_L+G_R$) input from the sum total storing memory 304g of the gradient histogram calculating module 71, the sum total of the gradient information h (second-order gradient) ($H_L+H_R$) input from the sum total storing memory 304h, and the regularization term λ. As illustrated in FIG. 30, the leaf weight calculating module 74 includes an adder 367, a divider 368, and a sign inverter 369.

The adder 367 is an arithmetic circuit that operates the sum of the regularization term λ and the sum total of the gradient information h ($H_L+H_R$) input from the sum total storing memory 304h of the gradient histogram calculating module 71.

The divider 368 is an arithmetic circuit that divides the sum total of the gradient information g ($G_L+G_R$) input from the sum total storing memory 304g of the gradient histogram calculating module 71 by the sum of the regularization term λ and the sum total of the gradient information h ($H_L+H_R$) operated by the adder 367.

The sign inverter 369 is an arithmetic circuit that inverts a sign of the value operated by the divider 368 to obtain a leaf weight.

The value itself of the leaf weight is important unlike the branch score, so that the leaf weight calculating module 74 is implemented by a circuit configuration having high arithmetic accuracy, the circuit configuration not using the approximation method but using the divider as illustrated in FIG. 30. Accordingly, a leaf weight having high numerical value accuracy can be calculated.

The calculating module 73 performs calculation processing using the approximation method without the divider, so that the calculating module 73 can be implemented with a smaller circuit scale than the circuit scale of the leaf weight calculating module 74.

Configuration of Approximation Module

Figure 31:
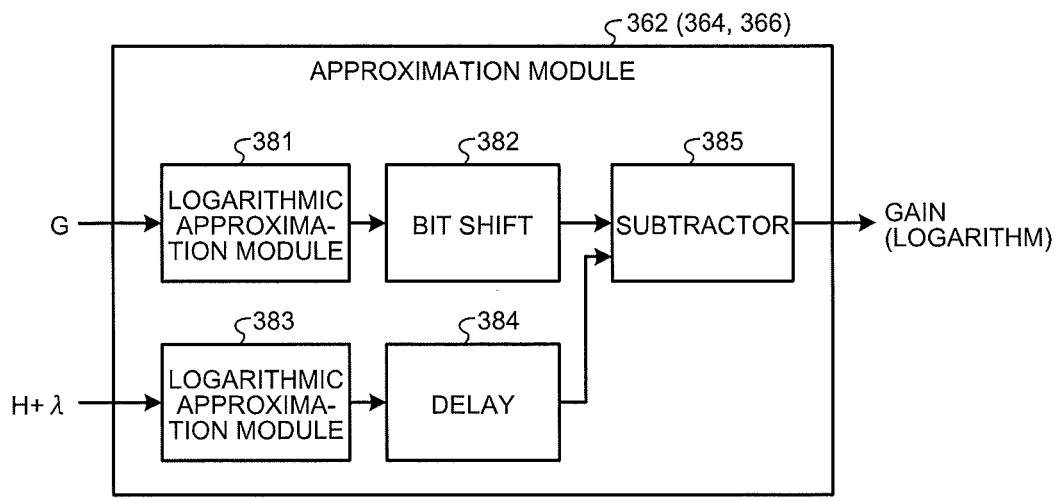
FIG. 31 is a diagram illustrating an example of a module configuration of an approximation module of the calculating module according to the third embodiment.
Figure 32:
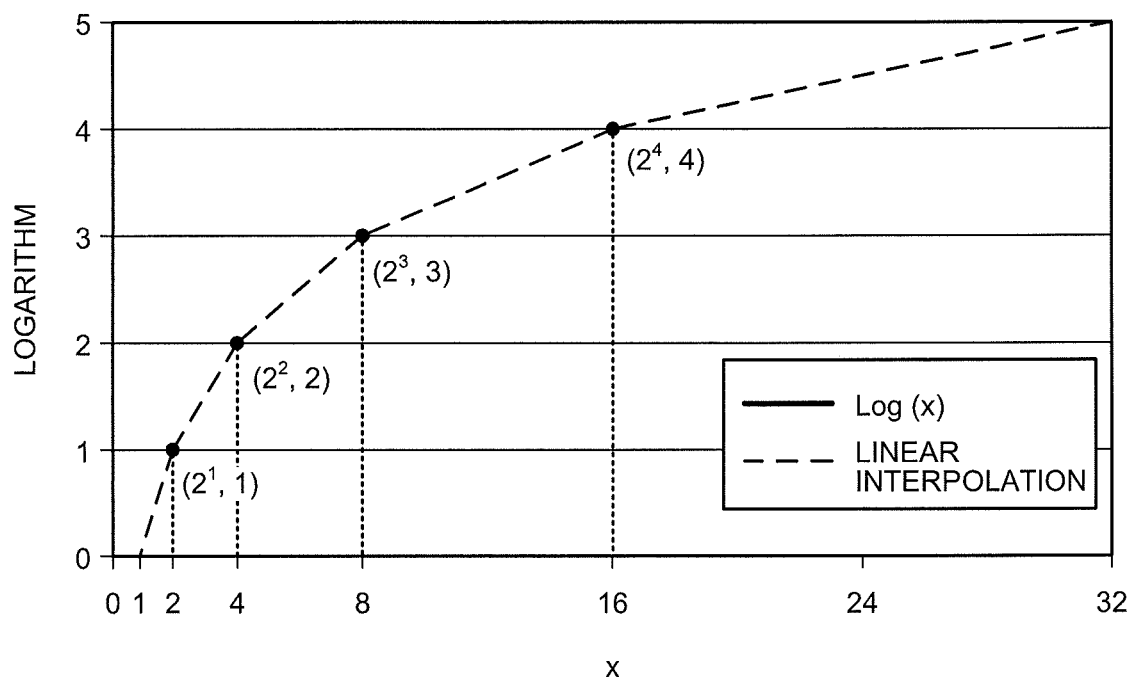
FIG. 32 is a diagram for explaining linear interpolation of a logarithmic curve.

FIG. 31 is a diagram illustrating an example of a module configuration of the approximation module of the calculating module according to the third embodiment. FIG. 32 is a diagram for explaining linear interpolation of a logarithmic curve. With reference to FIG. 31 and FIG. 32, the following describes configurations and operations of the approximation modules 362, 364, and 366 in the respective left side branch gain calculating module 351, right side branch gain calculating module 352, and calculating module 355 for a gain before branching illustrated in FIG. 29. The following exemplifies the configuration of the approximation module 362, but the same applies to the configurations of the approximation modules 364 and 366.

First, considered is a logarithm of the branch score (Gain) in the expression (19) described above. The logarithm of the branch score is obtained by the following expression (23).

$$\log(\text{Gain}) = 2 \times \log(G_L) - \log(H_L+\lambda) + 2 \times \log(G_R) - \log(H_R+\lambda) - \{2 \times \log(G_L+G_R) - \log(H_L+H_R+\lambda)\} \quad (23)$$

As represented by the expression (23), a logarithm of the form of $a^2/b$ becomes a form of $2 \times \log(a) - \log(b)$, so that an arithmetic operation can be performed without using division. The arithmetic operation for $2 \times \log(a)$ can be performed by addition processing such as ($\log(a)+\log(a)$) or bit shift of a value of $\log(a)$. As represented by the expression (23), the logarithm of the branch score can be obtained by performing six log operations. However, regarding the gain before branching, the logarithm is not required to be obtained for each feature amount, so that (dimensions of the feature amount×4+2) log operations are required. To perform the arithmetic operation of the logarithm, the circuit scale may be increased in a case of calculating a precise value, but an approximation operation using linear interpolation is used for the arithmetic operation of log(a) as described later. Due to this, the arithmetic operation can be performed with an arithmetic circuit having a smaller scale than that before the logarithm operation. The following describes the module configuration, in this case, of the approximation module 362 that implements the arithmetic operation (approximation operation) of the expression (23) described above with reference to FIG. 31.

As illustrated in FIG. 31, the approximation module 362 includes a logarithmic approximation module 381, a bit shift 382, a logarithmic approximation module 383, a delay 384, and a subtractor 385.

The logarithmic approximation module 381 is a module that calculates an approximate value of a logarithm $\log(G_L)$ of the sum $G_L$ of the gradient information. The following describes linear interpolation for obtaining the approximate value of the logarithm with reference to FIG. 32. A base of each logarithm in the expression (23) described above is assumed to be 2. As illustrated in FIG. 32, division into a plurality of sections is made with respect to an input x in a graph of a logarithm log(x), and approximation with a straight line (linear interpolation) is performed in each of the sections. As described above, regarding the branch score, it is sufficient that the large/small relation among the branch scores of the respective feature amounts and the respective thresholds, and the value itself of the branch score and the value itself of the logarithm thereof are not so important, so that rough approximation (approximation by linear interpolation in a case of reducing the divided sections) is considered. In the example illustrated in FIG. 32, the divided sections include a section of 1 to 2, a section of 2 to 4, a section of 4 to 8, a section of 8 to 16, and a section of 16 or more. In this case, the base of the logarithm log(x) is 2, so that coordinates of boundary points of the respective sections on the graph are ($2^0$, 0), ($2^1$, 1), ($2^2$, 2), ($2^3$, 3), and ($2^4$, 4). Inclination of respective straight lines obtained by performing linear interpolation on the section of 1 to 2, the section of 2 to 4, the section of 4 to 8, and the section of 8 to 16 is represented as $2^0$, $2^{-1}$, $2^{-2}$, and $2^{-3}$, that is, represented as a power of 2. Thus, as described later with reference to FIG. 33, an arithmetic operation of multiplying the inclination of the straight line subjected to linear interpolation can be implemented by bit shift. A specific configuration of the logarithmic approximation module 381 will be described later with reference to FIG. 33.

The bit shift 382 is an arithmetic circuit that calculates a value obtained by doubling the logarithm $\log(G_L)$ (approximate value) ($2 \times \log(G_L)$) of the sum $G_L$ of the gradient information calculated by the logarithmic approximation module 381. Specifically, multiplication by 2 performed by the bit shift 382 can be implemented by processing of shifting a bit.

The logarithmic approximation module 383 is a module that calculates an approximate value of a logarithm log($H_L$+λ) of the sum of the regularization term λ and the sum $H_L$ of the gradient information operated by the adder 361 described above. The operation of calculating the approximate value performed by the logarithmic approximation module 383 is the same as that of the logarithmic approximation module 381 described above.

The delay 384 is an arithmetic circuit that outputs the logarithm log($H_L$+λ) calculated by the logarithmic approximation module 383 with delay to be matched with a timing of inputting 2×log($G_L$) operated by the bit shift 382 to the subtractor 385.

The subtractor 385 is an arithmetic circuit that subtracts the logarithm log($H_L$+λ) output from the delay 384 from 2×log($G_L$) operated by the bit shift 382. The output from the subtractor 385 is a logarithm (approximate value) of the left side branch gain as the output from the approximation module 362. Similarly, an output from the approximation module 364 is a logarithm (approximate value) of the right side branch gain, and an output from the approximation module 366 is a logarithm (approximate value) of the gain before branching.

Configuration of Logarithmic Approximation Module

Figure 33:
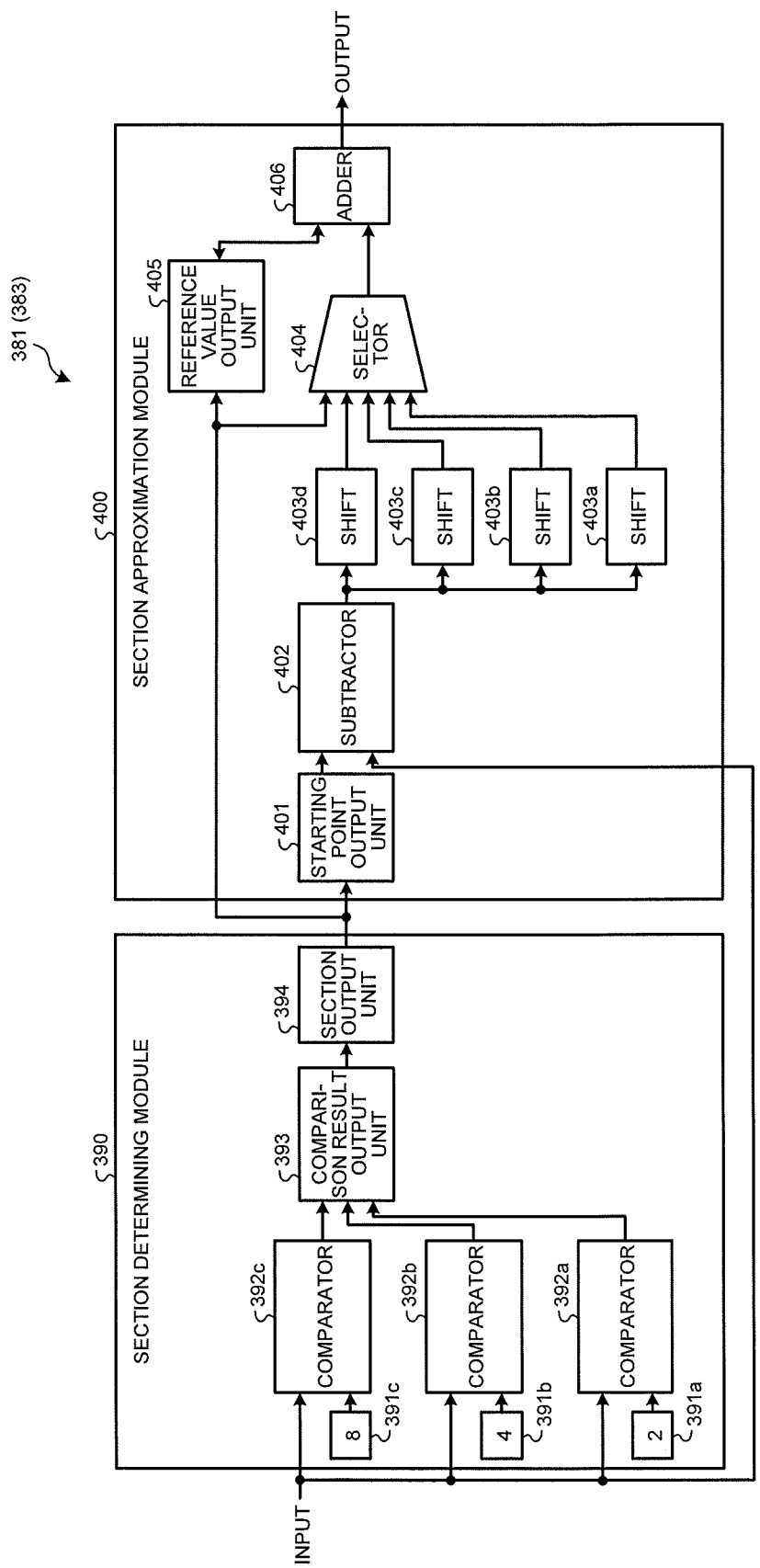
FIG. 33 is a diagram for explaining an example of a module configuration of a logarithmic approximation module of the approximation module according to the third embodiment.
Figure 34:
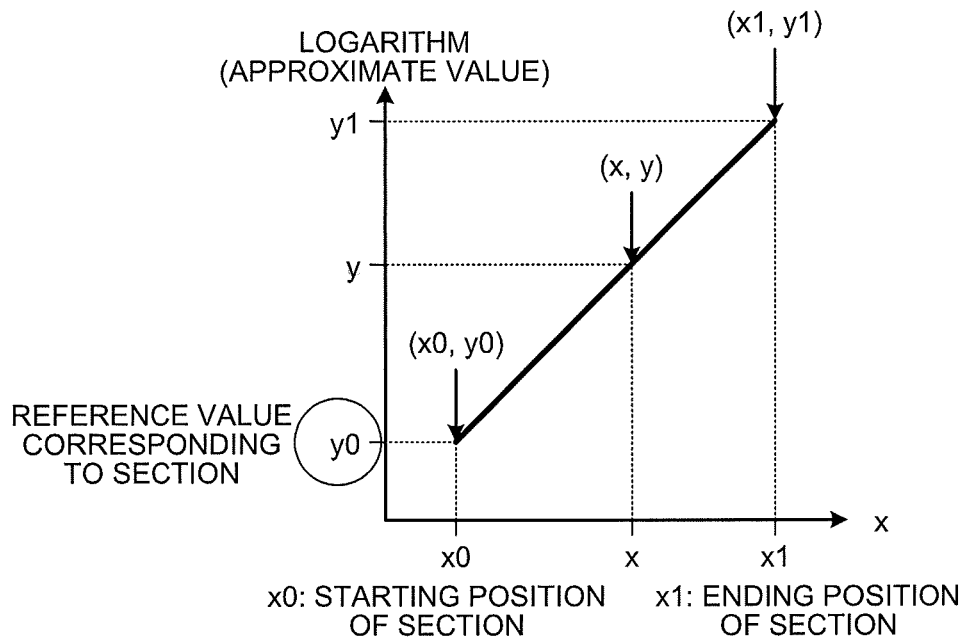
FIG. 34 is a diagram for explaining a reference value of linear interpolation.

FIG. 33 is a diagram for explaining an example of a module configuration of the logarithmic approximation module of the approximation module according to the third embodiment. FIG. 34 is a diagram for explaining a reference value of linear interpolation. With reference to FIG. 33 and FIG. 34, the following describes a configuration and an operation of the logarithmic approximation modules 381 and 383 illustrated in FIG. 31. The following exemplifies the configuration of the logarithmic approximation module 381, but the same applies to the configuration of the logarithmic approximation module 383.

As described above, the logarithmic approximation module 381 is a module that calculates the approximate value of the logarithm log($G_L$) of the sum $G_L$ of the gradient information. The logarithmic approximation module 381 includes a section determining module 390 and a section approximation module 400.

The section determining module 390 is a module that determines a section to which the sum $G_L$ of the gradient information that is actually input belongs among a plurality of sections that are divided with respect to the input of the logarithm log($G_L$) (in this case, $G_L$). In this case, the divided sections include four sections, that is, a section of 1 to 2, a section of 2 to 4, a section of 4 to 8, and a section of 8 or more. The section determining module 390 includes constant output units 391a to 391c, comparators 392a to 392c, a comparison result output unit 393, and a section output unit 394.

The constant output unit 391a is a circuit that outputs, to the comparator 392a, an x-coordinate "2" of a boundary point between the section of 1 to 2 and the section of 2 to 4. The constant output unit 391b is a circuit that outputs, to the comparator 392b, the x-coordinate "4" of a boundary point between the section of 2 to 4 and the section of 4 to 8. The constant output unit 391c is a circuit that outputs, to the comparator 392c, the x-coordinate "8" of a boundary point between the section of 4 to 8 and the section of 8 or more.

The comparator 392a is an arithmetic circuit that compares the input value (the sum $G_L$ of the gradient information) with "2" output from the constant output unit 391a, and outputs information indicating whether the input value is equal to or larger than "2" (for example, bit information of 0 or 1). The comparator 392b is an arithmetic circuit that compares the input value (the sum $G_L$ of the gradient information) with "4" output from the constant output unit 391b, and outputs information indicating whether the input value is equal to or larger than "4" (for example, the bit information of 0 or 1). The comparator 392c is an arithmetic circuit that compares the input value (the sum $G_L$ of the gradient information) with "8" output from the constant output unit 391c, and outputs information indicating whether the input value is equal to or larger than "8" (for example, the bit information of 0 or 1).

The comparison result output unit 393 is an arithmetic circuit that integrates output values from the respective comparators 392a to 392c to output information indicating each output value. For example, in a case in which the output from the comparator 392a is "1" (equal to or larger than 2), the output from the comparator 392b is "0" (smaller than 4), and the output from the comparator 392c is "0" (smaller than 8), the comparison result output unit 393 outputs the bit information such as "001".

The section output unit 394 is an arithmetic circuit that determines the section to which the input value (the sum $G_L$ of the gradient information) belongs based on the bit information output from the comparison result output unit 393, and outputs information indicating the section. For example, it is assumed that the output from the comparators 392a to 392c (that is, the output from the comparison result output unit 393) is associated with the information indicating the respective sections in a form represented by the following Table 5.

TABLE 5

| Equal to or larger than 8 | Equal to or larger than 4 | Equal to or larger than 2 | Relevant section |
|---|---|---|---|
| 0 | 0 | 0 | 0 |
| 0 | 0 | 1 | 1 |
| 0 | 1 | 1 | 2 |
| 1 | 1 | 1 | 3 |

For example, in a case in which the input value (the sum $G_L$ of the gradient information) is "5", the section output unit 394 determines that the input value (the sum $G_L$ of the gradient information) belongs to the section indicated by the value "2" (section of 4 to 8) based on the output "011" from the comparison result output unit 393, and outputs information indicating the section (for example, the bit information indicating "2"). The output information from the section output unit 394 is input to each of a starting point output unit 401, a reference value output unit 405, and an adder 406 (described later).

The section approximation module 400 is a module that calculates the approximate value of the logarithm log($G_L$) of the sum $G_L$ of the gradient information based on the section to which the sum $G_L$ of the gradient information belongs that is determined by the section determining module 390. The section approximation module 400 includes the starting point output unit 401, a subtractor 402, shifts 403a to 403d, a selector 404, the reference value output unit 405, and the adder 406.

The starting point output unit 401 is an arithmetic circuit that outputs a starting point of the section to which the input value (the sum $G_L$ of the gradient information) belongs, the section indicated by the output from the section determining module 390 (section output unit 394). For example, in a case in which the output from the section determining module 390 is "2", the starting point output unit 401 outputs "4" as the starting point of the section of 4 to 8.

The subtractor 402 is an arithmetic circuit that subtracts the starting point of the section output from the starting point output unit 401 from the input value (the sum $G_L$ of the gradient information). A straight line graph illustrated in FIG. 34 indicates a graph of linear interpolation in a certain section, a horizontal axis x indicates the input value (the sum $G_L$ of the gradient information), and a longitudinal axis y indicates the logarithm $\log(G_L)$ (approximate value) of the sum $G_L$ of the gradient information. The section indicated by the graph illustrated in FIG. 34 is a section from a starting point (starting position) x0 to an ending point (ending position) x1. The logarithm (approximate value) at the starting point (starting position) x0 is y0, and the logarithm (approximate value) at the ending point (ending position) x1 is y1. The graph represents that, in a case in which x=the input value (the sum $G_L$ of the gradient information), the approximate value obtained by performing linear interpolation on the logarithm log(x) is y. In a case of the example illustrated in FIG. 34, x−x0 is calculated by the subtractor 402.

The shift 403a is an arithmetic circuit that multiplies the output value of the subtractor 402 by inclination of the graph of linear interpolation in the section of 1 to 2. The shift 403b is an arithmetic circuit that multiplies the output value of the subtractor 402 by inclination of the graph of linear interpolation in the section of 2 to 4. The shift 403c is an arithmetic circuit that multiplies the output value of the subtractor 402 by inclination of the graph of linear interpolation in the section of 4 to 8. The shift 403d is an arithmetic circuit that multiplies the output value of the subtractor 402 by inclination of the graph of linear interpolation in the section of 8 or more. However, as the inclination in the section of 8 or more, for example, the shift 403d may assume inclination of the graph of linear interpolation in the section of 8 to 16. The inclination of the graph (straight line) of linear interpolation in each section is represented by the power of 2 as described above, so that arithmetic processing performed by the shifts 403a to 403d can be implemented by bit shift.

The selector 404 is an arithmetic circuit that receives an input of the output value of each of the shifts 403a to 403d, and outputs, to the adder 406, an output value corresponding to the section to which the input value (the sum $G_L$ of the gradient information) input from the section output unit 394 belongs. For example, in a case in which the output from the section output unit 394 is the section of 1 to 2, the selector 404 outputs the output value from the shift 403a, that is, the value obtained by multiplying the output value of the subtractor 402 by the inclination of the graph of linear interpolation in the section of 1 to 2.

The reference value output unit 405 is an arithmetic circuit that outputs, to the adder 406, a reference value corresponding to the section to which the input value (the sum $G_L$ of the gradient information) input from the section output unit 394 belongs. Specifically, in a case in which the section is a section corresponding to the graph of linear interpolation illustrated in FIG. 34, y0 is a reference value corresponding to the section.

The adder 406 is an arithmetic unit that adds the output value from the selector 404 to the reference value from the reference value output unit 405. By way of example, in the graph of linear interpolation illustrated in FIG. 34, the adder 406 adds the reference value y0 to a value obtained by multiplying a value of x−x0 by the inclination of the graph (that is, y−y0) to calculate y as the approximate value obtained by performing linear interpolation on the logarithm log(x). The output from the adder 406 is the approximate value of the logarithm $\log(G_L)$ of the sum $G_L$ of the gradient information as the output from the logarithmic approximation module 381.

With the configuration of the calculating module 73, the configurations of the approximation modules 362, 364, and 366, and the configurations of the logarithmic approximation modules 381 and 383 as described above, the approximate value of the logarithm of the branch score can be obtained. Thus, the optimum condition deriving module 22 derives a number of the feature amount (feature amount number) and a threshold with which the approximate value of the logarithm of the branch score output from the calculating module 73 is the largest.

FIG. 33 exemplifies a case of dividing the section into four sections, but the embodiment is not limited thereto. Approximation may be performed by linear interpolation by dividing the section into five or more sections so long as the circuit scale allows, and the section may also be divided into three or less sections to reduce the circuit scale so long as there is no problem in recognition accuracy.

As described above, the calculating module 73 calculates the logarithm of the branch score represented by the expression (23) described above in place of the branch score itself calculated by the expression (19) described above based on the sums ($G_L$, $G_R$, $H_L$, $H_R$) of the gradient information calculated by the accumulated gradient calculating module 72. Additionally, in calculating the logarithm of the branch score, the calculating module 73 obtains the approximate value of the logarithm by performing linear interpolation on the graph of the logarithm instead of a strict value of the logarithm. Due to this, instead of comparing the branch score itself at each threshold and each feature amount number, the optimum condition deriving module 22 may perform equivalent comparison processing for the large/small relation by using the approximate value of the logarithm of the branch score. Due to this, the circuit configuration can be implemented without the divider that performs division included in the expression (19), so that the circuit scale for calculating the branch score in gradient boosting can be prevented from being increased.

It is assumed that the approximate value of the logarithm is obtained by linear interpolation, and the section is divided so that the inclination of the graph (straight line) in each section to be subjected to linear interpolation is represented by a power of 2. Due to this, the arithmetic operation of multiplying the inclination of the straight line subjected to linear interpolation is implemented by a circuit having a small circuit scale that performs bit shift processing instead of an arithmetic circuit that performs multiplication itself.

Various modules for operating the approximate value of the logarithm of the branch score described above are present within the calculating module 73. In a case in which the feature amount has a plurality of dimensions, the calculating module 73 is arranged for each feature amount, so that the various modules are also arranged for each calculating module 73. Thus, operations are performed without a problem even when the feature amount has a plurality of dimensions.

In the above description, the calculating module 73 performs the operation of obtaining the logarithm of the branch score represented by the expression (19) described above and calculating the approximate value thereof. In this case, the logarithm of the branch score represented by the expression (19) can be considered to be the "branch score", and the approximate value of the logarithm of the branch score represented by the expression (19) can also be considered to be the "branch score".

The calculating module 73 according to the present embodiment is assumed to receive the input of the sums ($G_L$, $G_R$, $H_L$, $H_R$) of the gradient information output from the accumulated gradient calculating module 72, and calculate the branch score (correctly, the approximate value of the logarithm of the branch score). However, the embodiment is not limited thereto. For example, the calculating module 73 may receive an input of the sums ($G_L$, $G_R$, $H_L$, $H_R$) of the gradient information from the accumulated gradient calculating module 62 (an example of a gradient output unit) illustrated in FIG. 19 described above, and calculate the branch score.

The calculating module 73 according to the present embodiment is described as a module included in the learning module 20a, but obviously, the calculating module 73 may also be a module included in the learning module 20b supporting a plurality of feature amounts illustrated in FIG. 25.

FIRST EXAMPLE

The following describes a prediction result of speed of learning processing performed by the learning and discrimination device 1 according to the first embodiment described above.

First, learning speed of XGBoost and LightGBM described above as a representative library of GBDT was evaluated for comparison. In December 2017, the learning speed of LightGBM using a GPU was high, and this speed was measured.

Processing time was calculated from a clock of a hardware configuration. In logic of hardware that is implemented in this case, the processing mainly includes three pieces of processing, that is, learning processing performed by the learning module 20, discrimination processing performed by the classification module 50 (in units of a node), and discrimination processing performed by the classification module 50 (in units of a tree).

Regarding processing performed by learning module In this case, predominant processing is to calculate a branch score and create a gradient histogram from each feature amount of the sample data. In creating the gradient histogram from each feature amount of the sample data, all pieces of sample data need to be read for each depth (hierarchical level). Learning on some pieces of the sample data ends at a shallow depth of the tree, so that this estimation is a maximum value. To calculate the branch score, all the bins of the gradient histogram are referred to, so that clocks corresponding to the number of bins (dimensions of the feature amount) are required. Accordingly, the number of clocks $C_{learning}$ of the processing performed by the learning module 20 is represented by the following expression (24).

$$C_{learning}=(n_{sample\_train}*\text{maxdepth})*(n_{feature}*n_{node}) \quad (24)$$

In this case, $n_{sample\_train}$ is the number of pieces of sample data used for learning of the decision tree, which is typically a set subsampled from all the pieces of sample data. Additionally, maxdepth is a maximum depth of the decision tree, $n_{feature}$ is the number of bins (dimensions of the feature amount), and $n_{node}$ is the number of nodes.

Regarding Processing Performed by Classification Module (In Units of Node)

In this case, processing is performed to determine whether the sample data is assigned to a lower node on the left or the right using a result of a learned node. The total number of pieces of sample data processed for each depth is constant, so that the number of clocks $C_{classification\_node}$ is represented by the following expression (25). Actually, learning of some nodes is ended in the middle of processing, so that the following estimation is a maximum value.

$$C_{Classification\_node}=n_{sample\_train}*\text{maxdepth} \quad (25)$$

Regarding Processing Performed by Classification Module (In Units of Tree)

In this case, after learning of one decision tree is ended, the gradient information is updated for each piece of the sample data for learning of the next decision tree. Thus, prediction needs to be made for all pieces of the sample data using the learned decision tree. In processing in units of a tree, a delay is caused corresponding to the depth. In this case, the number of clocks $C_{Classification\_tree}$ is represented by the following expression (26).

$$C_{Classification\_tree}=n_{sample\_all}+\text{maxdepth} \quad (26)$$

In this case, all pieces of the sample data means the total number of all pieces of learning sample data before subsampling and all pieces of validation sample data.

Accordingly, the number of clocks $C_{tree}$ (maximum value) for learning processing for one decision tree is represented by the following expression (27).

$$C_{tree}=C_{learning}+C_{Classification\ node}+C_{Classification\ tree} \quad (27)$$

GBDT includes a large number of decision trees, so that, assuming that the number of decision trees is $n_{tree}$, the number of clocks $C_{gbdt}$ of the entire GBDT model is represented by the following expression (28).

$$C_{gbdt}=C_{tree}*n_{tree} \quad (28)$$

Described above is a test calculation in the case of Feature Parallel described above. In what is called Data Parallel in a case of arranging a large number of modules in parallel and dividing the modules for each piece of data, the speed can be basically increased corresponding to the number of modules in a case in which the number of pieces of data at each node is balanced for each module. A degree of imbalance depends on the sample data and a method of dividing the sample data for each module, so that this overhead will be examined using real data hereinafter. According to prediction, efficiency is estimated to be improved 50% or more even if this overhead is taken into consideration.

Regarding Used Data

As the sample data for testing, learning data and discrimination data (data for evaluation) are randomly selected from about a hundred thousand of pieces of data. The following represents an outline of a data set.

Number of classes: 2
Dimensions of feature amount: 129
Number of pieces of learning data: 63415
Number of pieces of data for evaluation: 31707

A measurement condition for speed is represented by the following (Table 6). A clock frequency of FPGA in operation is assumed to be 100 [MHz] (actually, the clock frequency may be a higher value with high possibility).

TABLE 6

| Description | Parameter |
|---|---|
| Number of whole samples | 95122 |
| Number of arithmetic samples | 63415 |
| Number of feature amounts | 256 |
| Maximum depth of tree | 6 |
| Number of trees in boosting | 100 |

TABLE 6-continued

| Description | Parameter |
|---|---|
| Data subsampling rate | 0.5 |
| Feature subsampling rate | 1 |
| Clock frequency (logic) | 100 Mhz |

Test Calculation of Hardware Logic

The following (Table 7) represents a test calculation of the learning speed with the architecture described above using the expression for calculating the speed described above. However, this test calculation is a test calculation in a case in which all pieces of the sample data reach a branch at the end, and represents a worst value.

TABLE 7

| Clock | Time [msec] | Description |
|---|---|---|
| 206629 | 2.07 | Time for learning in units of node |
| 190245 | 1.90 | Time for discrimination in units of node |
| 95128 | 0.95 | Time for discrimination in units of tree |
| 492002 | 4.92 | Learning time in units of tree |
| 49200200 | 492.00 | Total learning time |

Comparison Result Including Actual Measurement by CPU and GPU

The following (Table 8) represents an actual measurement result by the CPU and the GPU. For comparison, a test calculation result of hard logic is also included therein. Up to this point, the test calculation has been performed only using Feature Parallel, so that a test calculation result in a case of using Data Parallel at the same time is added for reference.

TABLE 8

| Processing system | Learning speed [msec] | Maximum speed ratio with respect to PC | PC |
|---|---|---|---|
| CPU (XGBoost) | 7423 | 0.15 | *1 |
| CPU (LightGBM) | 1130 | 1.00 | *1 |
| GPU (LightGBM) | 4828 | 0.23 | *2 |
| FPGA (Feature Parallel) | 492 | 2.30 | — |
| FPGA (Feature + Data Parallel) *3 | 44 | 25.84 | — |
| FPGA (Feature + Data Parallel) *4 | 4 | 275.61 | — |

*1 core i7-5930K (6C12T 3.5 GHz)
*2 GPU GTX1080Ti/CPU core i7 intel core i7 7700 (4C8T 3.6 GHz)
*3 test calculation is performed under a condition that data parallel is 15-parallel and data parallel efficiency is 75% (KC705 substrate is assumed)
*4 test calculation is performed under a condition that data parallel is 240-parallel and data parallel efficiency is 50% (AWS f1.16 xlarge instance is assumed)

It can be found that the learning speed of the present data is reduced even in a case of using the GPU as compared with the case of using the CPU. Microsoft Corporation as a developer of LightGBM states that the learning speed is increased about 3 to 10 times in a case of using the GPU, but the learning speed largely depends on data. It can be found that the learning speed for the present data cannot be successfully increased by the GPU. This result also represents that the learning speed by the GPU is not easily increased with the algorithm of the GBDT as compared with the CNN. As a result of using the CPU, the learning speed with LightGBM as a latecomer is increased about 10 times as compared with XGBoost as the most basic library. With hard logic using only Feature Parallel, the learning speed is increased about 2.3 times as compared with the CPU (LightGBM) that is the fastest for a personal computer (PC). Based on the test calculation, in a case of also using Data Parallel of 15-parallel, the learning speed is increased 25 times or more even if efficiency of Data Parallel is assumed to be 75%, and increased 275 times or more if the efficiency is assumed to be 50% in a case of 240-parallel and considering AWS f1.16×large instance. However, this test calculation is a test calculation in a case in which a memory band reaches a limit.

From a viewpoint that power consumption is predicted to be several [W] for the FPGA, and is equal to or larger than 100 [W] for the CPU and the GPU, the power consumption is different therebetween by two digits in addition to the speed, so that power efficiency may be different therebetween by three or more digits.

SECOND EXAMPLE

In the following description, regarding the learning and discrimination device according to the third embodiment described above, for example, a circuit scale for implementing the divider 373 illustrated in FIG. 28 is compared with a circuit scale in a case of using the approximation module 362 illustrated in FIG. 29 in place of the divider 373. The following considers a case of using a chip called virtex UltraScale+ VU9P as a high-end FPGA manufactured by Xilinx Inc.

In a case of the divider 373 using an 8-bit radix2 having the smallest resource, the required number of look-up tables (LUTs) and flip-flops (FFs) is as follows.

LUTs: 67
FFs: 134

In a case of the divider, it takes much time until an arithmetic result for an input is obtained. In the case described above, it takes 8 clocks. To increase the processing speed, the calculating module 73 according to the third embodiment for increasing the speed needs to calculate the branch score for one condition in 1 clock, so that eight dividers are required for calculating the branch score for one condition in 1 clock. Thus, in this case, the circuit scale of the divider is as follows.

LUTs: 67×8=536
FFs: 134×8=1072

On the other hand, in a case of using the approximation module 362 in place of the divider 373 to configure the circuit assuming a case in which the section is divided into four sections as described above, and implementing the circuit by a Vivado system generator, the circuit scale is as follows.

(Logarithm Arithmetic Portion: Logarithmic Approximation Modules 381 and 383)
LUTs: 53
FFs: 54
(Subtractor 385)
LUTs: 55
FFs: 14
(Bit Shift 382)
LUTs: 0
LUTs: 0

Accordingly, in a case of using approximation by linear interpolation, the total circuit scale is as follows.

LUTs: 53×2+55=161
FFs: 54×2+14=122

Thus, in a case of using the approximation module 362, it is confirmed that the circuit scale can be reduced to be about ¼ of LUTs and about ⅕ of FFs as compared with the case of the divider 373. The comparison between the circuit scales described above is performed assuming the divider having a small circuit scale, but a divider having a large circuit scale is required depending on the number of input bits or required accuracy in division, so that a reduction effect is increased in such a case.

THIRD EXAMPLE

In the following description, accuracy is compared between the case of using the divider and the case of using the logarithmic approximation module for the learning and discrimination device according to the third embodiment described above. A calculation environment is such that a variable for GBDT learning is operated with a fixed point using a fixed point designer of MATLAB.

An HIGGS data set of a data set UCI repository was used. The HIGGS data set is a data set for 2-class discrimination including eleven million samples and the feature amount having 28 dimensions.

This data set includes a large number of samples, so that 10000 samples of lower-order data numbers were used. Among these, 5000 samples were used as the learning data, and remaining 5000 samples were used as the discrimination data (data for evaluation). It was assumed that a learning rate was 1, the regularization term γ was 0, the regularization term λ was 1, a maximum depth of the tree was 2, the number of trees in boosting was 100, a data sampling rate was 1, and a feature subsampling rate was 1.

Figure 35:
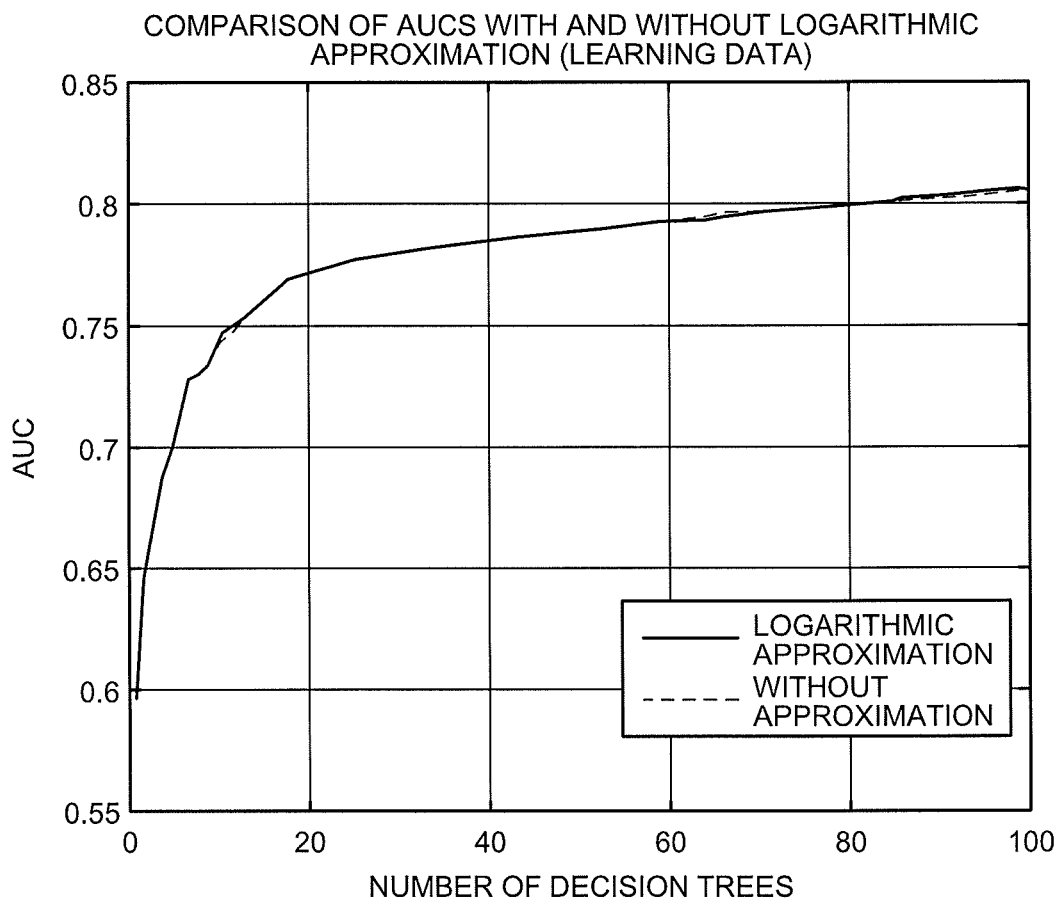
FIG. 35 is a graph representing a comparison result of AUCs with and without logarithmic approximation on learning data.
Figure 36:
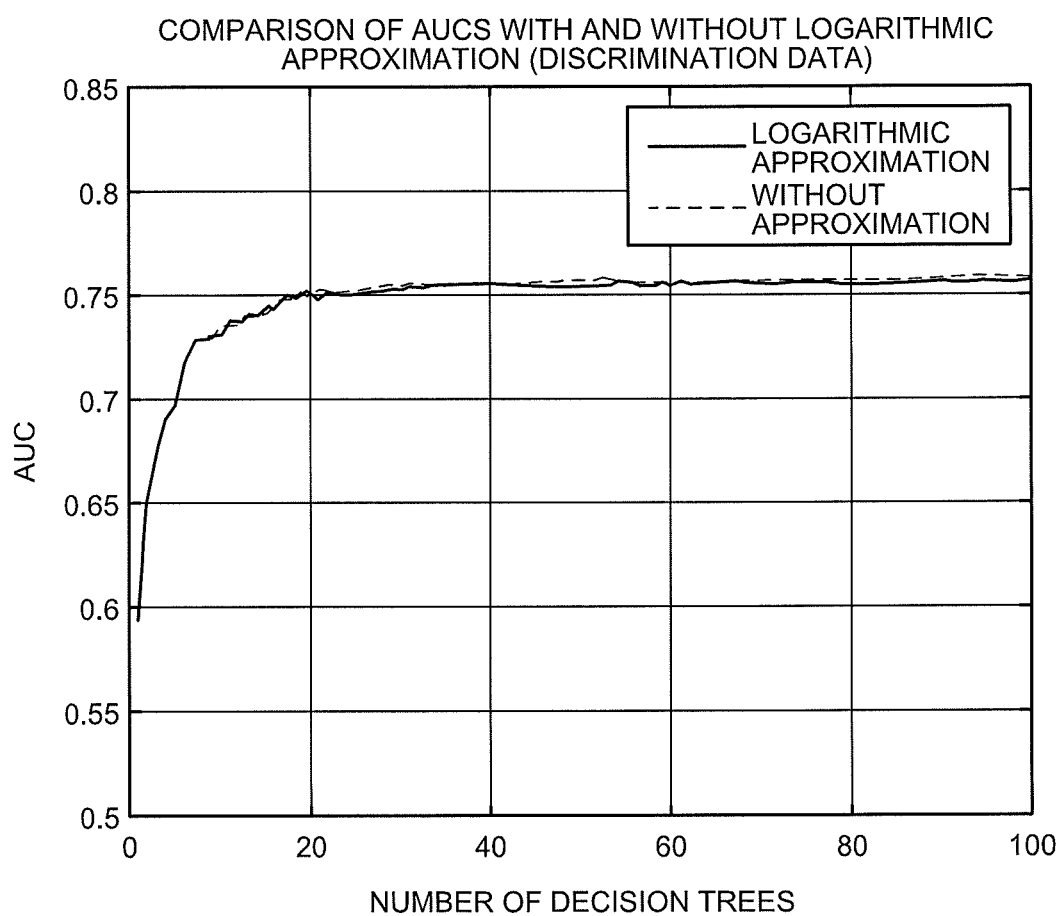
FIG. 36 is a graph representing a comparison result of AUCs with and without logarithmic approximation on discrimination data.

FIG. 35 and FIG. 36 illustrate a result of recognition performance (discrimination performance) in a case in which learning is performed under the condition described above. As the recognition performance, Area Under the Curve (AUC) generally used for representing goodness of 2-class classification is used. The AUC is a graph representing a shifting state in a case in which a shape of a Receiver Operating Characteristic (ROC) curve shifts in an upper left direction with an area of the curve. FIG. 35 illustrates the AUC in a case of using the learning data, and FIG. 36 illustrates the AUC in a case of using the discrimination data.

As represented by both AUCs, a result is obtained such that, even in a case of using logarithmic approximation, learning was performed on both of the learning data and the discrimination data without deteriorating recognition performance in a normal case not using logarithmic approximation. Due to this, it is confirmed that the circuit scale for calculating the branch score can be greatly reduced while maintaining recognition performance.

According to an embodiment, the circuit scale for calculating the branch score in gradient boosting can be prevented from being increased.

The above-described embodiments are illustrative and do not limit the present invention. Thus, numerous additional modifications and variations are possible in light of the above teachings. For example, at least one element of different illustrative and exemplary embodiments herein may be combined with each other or substituted for each other within the scope of this disclosure and appended claims. Further, features of components of the embodiments, such as the number, the position, and the shape are not limited the embodiments and thus may be preferably set. It is therefore to be understood that within the scope of the appended claims, the disclosure of the present invention may be practiced otherwise than as specifically described herein.

The method steps, processes, or operations described herein are not to be construed as necessarily requiring their performance in the particular order discussed or illustrated, unless specifically identified as an order of performance or clearly identified through the context. It is also to be understood that additional or alternative steps may be employed.

Further, any of the above-described apparatus, devices or units can be implemented as a hardware apparatus, such as a special-purpose circuit or device, or as a hardware/software combination, such as a processor executing a software program.

Further, as described above, any one of the above-described and other methods of the present invention may be embodied in the form of a computer program stored in any kind of storage medium. Examples of storage mediums include, but are not limited to, flexible disk, hard disk, optical discs, magneto-optical discs, magnetic tapes, non-volatile memory, semiconductor memory, read-only-memory (ROM), etc.

Alternatively, any one of the above-described and other methods of the present invention may be implemented by an application specific integrated circuit (ASIC), a digital signal processor (DSP) or a field programmable gate array (FPGA), prepared by interconnecting an appropriate network of conventional component circuits or by a combination thereof with one or more conventional general purpose microprocessors or signal processors programmed accordingly.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA) and conventional circuit components arranged to perform the recited functions.

What is claimed is:
1. A learning device, comprising:
a data memory including feature memory and state memory; and
circuitry configured to utilize the data memory to learn a decision tree, wherein to learn the decision tree the circuitry is configured to:
output a cumulative sum of gradient information corresponding to each value of a feature amount of learning data in the feature memory;
calculate a branch score, of a branch of a hierarchical level of the decision tree, used for determining a branch condition for a node of the decision tree, wherein calculation of the branch score is based on the cumulative sum without using a dividing circuit, the branch score is a logarithm of an index value representing goodness in a case in which branching is performed and used for determining the branch condition, and to calculate the branch score, the circuitry is configured to:
calculate a first value of a logarithm of a first order of the cumulative sum of the gradient information;
bit shift the first value;
calculate a second value of a logarithm of a second order of the cumulative sum of the gradient information;

subtract the second value from the bit shifted first value to generate an output value; and output the output value as the branch score;

advance to a next hierarchical level of the decision tree based on the branch score and the branch condition, wherein advancement through all hierarchical levels of the decision tree updates node weights of the decision tree and completes learning of the decision tree; and after completion of the learning of the decision tree, calculate a leaf weight corresponding to each piece of the learning data, and calculate state information for the leaf weight which is written back to an original address of the state memory, wherein a next learning of the decision tree updates the node weights by utilizing the state information in the state memory.

2. The learning device according to claim 1, wherein the circuitry is configured to:

divide a graph of the logarithm into a plurality of sections with respect to the cumulative sum as an input; and calculate a value corresponding to the cumulative sum output on a straight line obtained by performing linear interpolation for each of the sections to use as the branch score.

3. The learning device according to claim 2, wherein the circuitry is configured to perform division into the plurality of sections such that inclination of a straight line obtained by performing linear interpolation on the graph of the logarithm is represented by a power of 2.

4. The learning device according to claim 3, wherein the circuitry is configured to perform multiplication processing of the inclination by bit shift processing to calculate the value indicated by a point on the straight line obtained by performing linear interpolation on the graph of the logarithm.

5. The learning device according to claim 2, wherein the circuitry is configured to derive the branch condition by comparing values corresponding to the feature amount calculated by the branch score calculator with each other in magnitude.

6. The learning device according to claim 1, wherein the circuitry is configured to calculate Gain as the index value by expression (1):

$$\text{Gain} = \frac{1}{2}\left[\frac{G_L^2}{H_L+\lambda} + \frac{G_R^2}{H_R+\lambda} - \frac{(G_L+G_R)^2}{H_L+H_R+\lambda}\right] - \gamma \quad (1)$$

where $G_L$ is a sum of gradient information (first order gradients) of samples branched to a left node, $G_R$ is a sum of gradient information (first order gradients) of samples branched to a right node, $H_L$ is a sum of gradient information (second order gradients) of samples branched to the left node, $H_R$ is a sum of gradient information (second order gradients) of samples branched to the right node, and $\gamma$ and $\lambda$ are regularization terms.

7. The learning device according to claim 1, wherein the learning of the decision tree is performed by gradient boosting.

8. The learning device according to claim 1, wherein the circuitry is configured to calculate the leaf weight as an output with respect to an input to the decision tree using the dividing circuit in a case in which a node of the decision tree is a terminal node.

9. A learning method, comprising:

learning, utilizing a data memory including feature memory and state memory, a decision tree by:

outputting a cumulative sum of gradient information corresponding to each value of a feature amount of learning data in the feature memory;

calculating a branch score, of a hierarchical level of the decision tree, used for determining a branch condition for a node of the decision tree, wherein the calculating the branch score is based on the cumulative sum without using a dividing circuit, the branch score is a logarithm of an index value representing goodness in a case in which branching is performed and used for determining the branch condition, and the calculating the branch score includes:

calculating a first value of a logarithm of a first order of the cumulative sum of the gradient information;

bit shifting the first value;

calculating a second value of a logarithm of a second order of the cumulative sum of the gradient information;

subtracting second value from the bit shifted first value to generate an output value; and outputting the output value as the branch score;

advancing to a next hierarchical level of the decision tree based on the branch score and the branch condition, wherein advancement through all hierarchical levels of the decision tree updates node weights of the decision tree and completes learning of the decision tree; and after completion of the learning of the decision tree, calculating a leaf weight corresponding to each piece of the learning data, and calculating state information for the leaf weight which is written back to an original address of the state memory, wherein a next learning of the decision tree updates the node weights by utilizing the state information in the state memory.

10. The learning device according to claim 1, wherein the circuitry calculates the first value and the second value simultaneously, and after calculation of the second value, the circuitry delays output of the second value until the first value is bit shifted.

11. A learning device configured to perform learning of a decision tree, the learning device comprising:

a data memory including feature memory and state memory; and circuitry configured to utilize the data memory to:

output a cumulative sum of gradient information corresponding to each value of a feature amount of learning data in the feature memory for the learning of the decision tree;

calculate a branch score, of a branch of the decision tree, used for determining a branch condition for a node of the decision tree, wherein the circuitry calculates the branch score based on the cumulative sum without using a dividing circuit, the branch score is a logarithm of an index value representing goodness in a case in which branching is performed and used for determining the branch condition, and the index value is Gain, which is calculated by expression (1):

$$\text{Gain} = \frac{1}{2}\left[\frac{G_L^2}{H_L+\lambda} + \frac{G_R^2}{H_R+\lambda} - \frac{(G_L+G_R)^2}{H_L+H_R+\lambda}\right] - \gamma, \quad (1)$$

where
- $G_L$ is a sum of gradient information (first order gradients) of samples branched to a left node,
- $G_R$ is a sum of gradient information (first order gradients) of samples branched to a right node,
- $H_L$ is a sum of gradient information (second order gradients) of samples branched to the left node,
- $H_R$ is a sum of gradient information (second order gradients) of samples branched to the right node, and
- $\gamma$ and $\lambda$ are regularization terms, to calculate the branch score, the circuitry is configured to calculate a first value of a logarithm of a first order of the cumulative sum of the gradient information;

bit shift the first value;

calculate a second value of a logarithm of a second order of the cumulative sum of the gradient information;

subtract the second value from the bit shifted first value to generate an output value; and output the output value as the branch score, wherein advancement through all hierarchical levels of the decision tree updates node weights of the decision tree and completes learning of the decision tree, after completion of the learning of the decision tree, the circuitry is further configured to calculate a leaf weight corresponding to each piece of the learning data, and calculate state information for the leaf weight which is written back to an original address of the state memory, and a next learning of the decision tree updates the node weights by utilizing the state information in the state memory.

* * * * *